United States Patent
Ichitani

(10) Patent No.: US 7,633,646 B2
(45) Date of Patent: Dec. 15, 2009

(54) IMAGE FORMING METHOD AND APPARATUS

(75) Inventor: Shuji Ichitani, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1060 days.

(21) Appl. No.: 10/918,185

(22) Filed: Aug. 13, 2004

(65) Prior Publication Data

US 2005/0094170 A1 May 5, 2005

(30) Foreign Application Priority Data

Oct. 30, 2003 (JP) ............................ 2003-371231
Oct. 30, 2003 (JP) ............................ 2003-371232
Oct. 30, 2003 (JP) ............................ 2003-371233

(51) Int. Cl.
*G06F 15/00* (2006.01)
*G06K 1/00* (2006.01)
*G03F 3/08* (2006.01)
*H04N 1/46* (2006.01)

(52) U.S. Cl. ...................... 358/1.9; 358/518; 358/519; 358/2.1; 358/504; 358/521; 358/520; 358/530; 358/534; 358/536; 382/167; 382/162

(58) Field of Classification Search ................ 358/1.9, 358/519, 521, 3.23, 504–518; 382/164–165
See application file for complete search history.

(56) References Cited

U.S. PATENT DOCUMENTS 5,982,990 A * 11/1999 Gondek ..................... 358/1.9
6,026,216 A 2/2000 Ohtsuka et al.
6,344,900 B1 * 2/2002 Hidaka ...................... 358/1.9
6,411,318 B1 * 6/2002 Sawano et al. .............. 347/188
6,441,923 B1 * 8/2002 Balasubramanian et al. ......................... 358/3.23
6,522,778 B1 * 2/2003 Tamagawa .................. 382/167
6,556,793 B2 * 4/2003 Nakamura ................... 399/15
6,560,358 B1 * 5/2003 Tsukada ..................... 382/167
6,853,815 B2 * 2/2005 Tezuka et al. ................. 399/39
7,027,187 B1 * 4/2006 Zuber ........................ 358/1.9

(Continued)

FOREIGN PATENT DOCUMENTS

JP 08-292616 11/1996

(Continued)

*Primary Examiner*—David K Moore
*Assistant Examiner*—Hilina S Kassa
(74) *Attorney, Agent, or Firm*—Cohen Pontani Lieberman & Pavane LLP

(57) ABSTRACT

This invention is directed to an image forming apparatus which forms a color image on the basis of image information and includes an image forming unit which forms a color reference image on an image forming member on the basis of reference image information for color correction, a colorimetric unit which measures the color of the color reference image formed by the image forming unit and outputs color information, an image processing unit which generates a gray level correction table on the basis of the color information output from the colorimetric unit, and a control unit which corrects the image information on the basis of the gray level correction table generated by the image processing unit and controls the image forming unit so as to form a color image on the image forming member on the basis of the corrected image information, and an image forming method using the image forming apparatus.

5 Claims, 37 Drawing Sheets

U.S. PATENT DOCUMENTS

| | | | |
|---|---|---|---|
| 7,097,270 B2 * | 8/2006 | Yamazaki | 347/19 |
| 7,365,890 B2 * | 4/2008 | Saito et al. | 358/523 |
| 2003/0085941 A1 * | 5/2003 | Tezuka et al. | 347/19 |
| 2004/0028421 A1 * | 2/2004 | Shiratori | 399/49 |

FOREIGN PATENT DOCUMENTS

| | | |
|---|---|---|
| JP | 9-284577 | 10/1997 |
| JP | 2000-338742 | 12/2000 |
| JP | 2001-144982 | 5/2001 |
| JP | 2002-287271 | 10/2002 |

* cited by examiner

FIG. 6

| PATCH No. | Y COLOR | M COLOR | C COLOR |
|---|---|---|---|
| 0 | 0 | 0 | 0 |
| 1 | 0 | 0 | 64 |
| 2 | 0 | 0 | 128 |
| 3 | 0 | 0 | 191 |
| 4 | 0 | 0 | 255 |
| 5 | 0 | 64 | 0 |
| 6 | 0 | 64 | 128 |
| ⋮ | ⋮ | ⋮ | ⋮ |
| 9 | 0 | 64 | 255 |
| 10 | 0 | 128 | 0 |
| ⋮ | | | 64 |
| | | | ⋮ |
| 14 | 0 | 128 | 255 |
| ⋮ | ⋮ | ⋮ | ⋮ |
| 24 | 0 | 255 | 255 |
| 25 | 64 | 0 | 0 |
| ⋮ | ⋮ | ⋮ | ⋮ |
| 123 | ⋮ | ⋮ | ⋮ |
| 124 | 255 | 255 | 255 |

FIG. 7

| GRAY VALUE | X VALUE | Y VALUE | Z VALUE |
|---|---|---|---|
| D65 | 0.9504 | 1.0 | 0.10889 |
| D50 | 0.9642 | 1.0 | 0.8249 |
| A | 0.1095 | 1.0 | 0.3558 |
| B | 0.9909 | 1.0 | 0.8531 |
| C | 0.9807 | 1.0 | 1.1823 |
| ⋮ | ⋮ | ⋮ | ⋮ |
| CUSTOM | — | — | — |

Y COLOR

MAIN SCANNING DIRECTION
SUB-SCANNING DIRECTION

M COLOR

C COLOR

BK COLOR

MAIN SCANNING DIRECTION →
SUB-SCANNING DIRECTION ↓

Y COLOR

M COLOR

C COLOR

BK COLOR

MAIN SCANNING DIRECTION →
SUB-SCANNING DIRECTION ↓

Y COLOR

M COLOR

C COLOR

BK COLOR

Y COLOR

MAIN SCANNING DIRECTION
SUB-SCANNING DIRECTION

M COLOR

C COLOR

BK COLOR

IMAGE FORMING METHOD AND APPARATUS

BACKGROUND OF THE INVENTION

1. Field of the Invention

The present invention relates to an image forming apparatus and image forming method which can be suitably applied to a color facsimile apparatus, a color printer, a color copying machine, and a multifunction apparatus having functions equivalent to those thereof, which form a plurality of reference patches with different densities on an image forming member, detect the colors or densities of the patches, and execute desired gray level correction processing on the basis of the detected color information (hue information or density detection information).

2. Description of the Related Art

Recently, a tandem type color printer, a copying machine, a multifunction apparatus having functions equivalent to those thereof, and the like have been increasingly used. These image forming apparatuses include exposure units, developing devices, photosensitive drums, intermediate transfer belts, and fixing devices for yellow (Y), magenta (M), cyan (C), and black (BK).

For example, the exposure unit for the color Y is designed to draw an electrostatic latent image on the photosensitive drum on the basis of arbitrary image information. The developing device forms a color toner image by adhering Y toner to the electrostatic latent image drawn on the photosensitive drum. The photosensitive drum transfers the toner image onto the intermediate transfer belt. The same processing is performed for the remaining colors M, C, and BK. The color toner images transferred onto the intermediate transfer belt are transferred onto an image recording sheet, and then fixed by the fixing device.

Conventional image forming apparatuses often incorporate an image processing unit with a gray level correction function of performing color matching of the densities of secondary and tertiary colors obtained by combining the respective colors C, M, Y, and K on the basis of the density detection information obtained by a density sensor. This is because an image forming unit is configured to operate on the basis of image information based on a YMCK signal processing system. In this case, gray level correction tables are used in the image processing unit.

FIGS. 1A and 1B are spectral characteristic graphs showing examples of the relationship between the reflectances and the wavelengths of the colors C, M, and Y according to the prior art. Referring to each of FIGS. 1A and 1B, the ordinate represents the reflectances of the three colors C, M, and Y; and the abscissa, the wavelengths of the three colors C, M, and Y. According to the gray level correction function of the image processing unit using gray level correction tables according to the prior art, when a material such as toner or a photosensitive member which is different from the previously used one upon replacement thereof or the like is used, and the three colors C, M, and Y are superimposed on each other, the gray hue tends to vary.

The following is the reason why the gray hue varies when a material such as toner or a photosensitive member which is different from the previously used one is used, and the three colors C, M, and Y are superimposed on each other.

Assume that the graph of FIG. 1A shows the spectral characteristics of the colors C, M, and Y of toner before replacement. When a different material or a different manufacturing method is used for toner in its manufacturing stage, for example, the spectral characteristics of the color M may change as indicated by the solid curve in FIG. 1B.

In such a case, even if image data is corrected to stabilize the lightness (L*) of each of the three colors C, M, and Y in a color solid coordinate (L*-C* coordinate) system, when the colors C., M, and Y are superimposed on each other, the resultant spectral characteristics change as shown in FIG. 1B. In the example shown in FIG. 1B, the reflectance of the color M increases near a wavelength of 430 μm as compared with that in FIG. 1A.

FIG. 2 is a graph showing an example of how the gray hue changes with environmental changes of the image forming system, and is an ab-chromaticity diagram obtained by extracting a two-dimensional C* coordinate system from the L*-C* coordinate system. The ab-chromaticity diagram shown in FIG. 2 is a graph obtained by correcting image data using a one-dimensional gray level correction table, outputting a patch to the intermediate transfer member on the basis of the image data, and measuring the patch with a colorimeter. Referring to FIG. 2, the abscissa represents a saturation a* of red or the like; and the ordinate, a saturation b* of the color Y or the like. Referring to FIG. 2, the solid curve represents the locus of white (W) which represents the upper limit of gray, and the solid curve with circles represents the locus of the color BK which represents the lower limit of gray. As is obvious from this graph, the gray balances differ from each other in the saturation a*-b* plane.

Note that patent reference 1 (refer to Japanese Unexamined Patent Publication No. 2000-338742, FIG. 3 and p. 10 in particular) discloses an image forming apparatus associated with a color printer using the above gray level correction table. According to this image forming apparatus, when an exposure system forms a plurality of test pattern latent images on a photosensitive member with laser beams, a developing device develops the test pattern latent images with toner. The developed toner images are held on an intermediate transfer member. The densities of the secondary and tertiary colors formed by properly combining the respective colors C, M, Y, and K are detected by a density sensor. The density detection information obtained by the density sensors is output to an image processing unit. The image processing unit performs color matching on the basis of the density detection information. This makes it possible to always maintain good color balance.

According to an image forming apparatus using a gray level correction table based on the conventional scheme, when toner, an image forming member, or the like which is a consumable is replaced, image data is corrected by using a one-dimensional (density-lightness) gray level correction table which makes the lightnesses (L*) of the three colors C, M, and Y uniform. For this reason, as indicated by an example of the gray hue change in FIG. 2, the gray hue changes in the saturation a*-b* plane, resulting in different gray balances in the respective three colors C, M, and Y. This hinders color image forming with good gray balance.

The recent years allow the advent of an image forming apparatus which can print out color images with a plurality of types of image structures. An image forming apparatus of this type has, for example, five image structures #1 to #5. With image structure #1, although the resolution is high, it is difficult to realize good highlight tone reproducibility, and moiré tends to occur due to overlapping of the respective colors C, M, Y, and K. With image structure #2, although the overall grayscale characteristics are excellent, the resolution is low, and it is difficult to realize good highlight tone reproducibility, resulting in a lot of moiré. With image structure #3, although the resolution is high and the highlight tone reproducibility is excellent, a lot of moiré is produced. With image structure #4, although the resolution is high and the overall grayscale characteristics are excellent, the image structure produces a sense of noise. With image structure #5, since the resolution is high and toner is transferred in dots, the overall grayscale characteristics are good, and no moiré occurs. However, a sense of noise is left.

The image forming apparatus capable of printing out color images with five image structures #1 to #5 described above has the above merits and demerits concerning the respective image structures, and is designed to calculate a gray level correction table for gamma correction of image data for each image structure. A gray level correction table is calculated for each image structure and is formed dependently on the ease of adjustment concerning each image structure. If, for example, adjustment results on the colors C, M, and Y differ for each image structure, lightnesses are set as follows in correspondence with the respective gray levels:

|  | Color C (%) | Color M (%) | Color Y (%) | Characteristics |
|---|---|---|---|---|
| Image Structure #1 | 60 | 60 | 60 | normal |
| Image Structure #2 | 55 | 55 | 60 | yellowish |
| Image Structure #3 | 65 | 60 | 65 | greenish |
| Image Structure #4 | 65 | 65 | 65 | dark overall |
| Image Structure #5 | 55 | 55 | 55 | light overall |

In association with a color printer using the above gray level correction table, an image forming apparatus is disclosed in patent reference 2 (refer to Japanese Unexamined Patent Publication No. 08-292616, FIG. 1 and p. 4 in particular).

The image forming apparatus disclosed in patent reference 2 includes a gray level correction data generating unit and is designed to input and set a highlight gray level correction condition from an input unit to the gray level correction data generating unit and generate gray level correction data on the basis of both the input highlight gray level correction condition values and the density values actually measured from reference patch generated on an image carrier. This makes it possible to generate gray level correction data in accordance with gray level variations at a highlight portion over time, thereby correcting the highlight tone reproducibility with high precision.

The image forming apparatus capable of printing out color images with five image structures #1 to #5 in the conventional scheme has merits and demerits concerning the respective image structures. Such merits and demerits occur in different manners depending on the patterns of image data.

An image forming apparatus of this type is configured to select an image structure in accordance with user's needs, and individually performs gray level correction for each image structure. For this reason, there are both adjustable and unadjustable portions. If adjustment results on the colors C, M, and Y differ for each image structure, brightnesses corresponding to the respective gray levels become those described above, the adjustment balance among the colors C, M, and Y deteriorates. As a consequence, the color appearance of gray obtained by superimposing C, M, and Y toner layers becomes yellowish or greenish, resulting in different hues.

Even if, therefore, the technique of the image forming apparatus disclosed in patent reference 2 is used without any change, when the image structure is changed, an output color image may differ in appearance (gray level) from the previous image. This hinders an improvement in image forming quality in a color printer and the like.

In addition, the above conventional gray level correction table is designed to make calculation in accordance with "grayscale-characteristic-oriented", "gray-level-oriented", and "reproducibility-oriented" in order to eliminate variations in characteristics between a plurality of image forming apparatuses. Such a table has the following characteristic features.

According to a "grayscale-characteristic-oriented" calculation method, although a gray level correction table can be calculated by making the most of dynamic ranges, different gray balances may occur among the apparatuses. According to the "gray-oriented" calculation method, the ratios between the three colors C, M, and Y are set in advance, and a table is calculated such that the ratios between the respective colors become equal. This can hold the gray levels among apparatuses constant. In one image forming apparatus, however, dynamic ranges that can be originally reproduced may be wasted. In addition, if there is a color with an extremely low dynamic range, since ratios are set with reference to this color, image forming outputs may differ from each other among the apparatuses.

According to the "reproducibility-oriented" calculation method, since a table is generated so as to set densities equal to the preset densities of the three colors C, M, and Y, even if a color with an extremely low dynamic range is produced, it does not become too light. If, however, the dynamic range is low, a table for a portion with a high density is always set to the maximum value. This results in poor grayscale characteristics of a printout and may not guarantee gray balance in this region.

An image forming apparatus which handles a gray level correction table of this type and color balance is disclosed in patent reference 3 (refer to Japanese Unexamined Patent Publication No. 2002-287271, and FIGS. 2 and 3 in particular). This image forming apparatus detects a temperature and humidity in the apparatus and the time during which a recording material is exposed to air when performing exposure processing with respect to the recording material, and corrects an exposure amount for the recording material so as to cancel out the influences imposed on image forming operation on the basis of the detection information. This makes it possible to prevent variations in color density and color balance in visible images after image forming processing.

A method of setting gray balance is disclosed in patent reference 4 (refer to Japanese Unexamined Patent Publication No. 9-284577, and FIGS. 1 and p. 3 in particular). According to this gray balance setting method, a reference chart is generated by a reference output apparatus whose gray balance is adjusted in advance, and the characteristic data of the reference output apparatus is acquired from the measurement value based on this reference chart, thereby adjusting the gray balance of the target output apparatus by using the characteristic data. This makes it possible to set gray balances with high precision in a plurality of target output apparatuses.

A calibration method in a color image forming apparatus is disclosed in patent reference 5 (refer to Japanese Unexamined Patent Publication No. 2001-144982, and FIGS. 2 and p. 3 in particular). According to this calibration method, the density of each patch of the test chart output from the image forming apparatus is compared with the density of a reference patch of a reference chart prepared in advance in conjunction with one of the three colors C, M, and Y or the color BK, and density adjustment is performed by using density data on the test chart that matches the reference chart. With regard to the remaining colors of the three colors C, M, and Y, density adjustment is performed on the basis of the density data of gray patches selected from gray balance charts. This makes it possible to comprehensively determine adjustment values from a plurality of results concerning gray balances.

According to the image forming apparatus which handles gray level correction tables based on the conventional scheme and color balances and the image forming apparatus in patent reference 3, however, in order to eliminate variations in characteristics between image forming apparatuses, "grayscale-characteristic-oriented", "gray-oriented", and "reproducibility-oriented" calculation methods are often determined in the design stage. This is based on the premise that the densities of the three colors C, M, and Y do not change over time.

For this reason, in the conventional scheme, according to the present circumstances, when the densities of the three colors C, M, and Y change over time, the user cannot arbitrarily select an intended one of the "grayscale-characteristic-oriented", "gray-oriented", and "reproducibility-oriented" calculation methods. When, therefore, the densities of the three colors C, M, and Y change over time, even if the gray balance setting method in patent reference 4 or the calibration method in patent reference 5 can be used, the inability of selecting the "grayscale-characteristic-oriented", "gray-oriented", or "reproducibility-oriented" calculation method hinders a stable color image from being printed out.

SUMMARY OF THE INVENTION

The present invention has been made to solve the above problems, and has for its first object to provide an image forming apparatus and image forming method which can optimally adjust gray hue and print a color image with excellent gray balance even if an image forming environment changes.

It is the second object of the present invention to provide an image forming apparatus and image forming method which can easily generate a gray level correction table of an arbitrary selected image structure and equally adjust hue between a plurality of types of image structures regardless of the image structure selected.

It is the third object of the present invention to provide an image forming apparatus and image forming method which can print a stable color image even if the densities of three colors C, M, and Y change over time.

In order to achieve the above objects, according to the first aspect of the present invention, there is provided an image forming apparatus which forms a color image on an image forming member on the basis of image information, comprising an image forming unit which forms a color reference image on the image forming member on the basis of reference image information for color correction, a colorimetric unit which measures a color of the color reference image formed by the image forming unit and outputs color information, an image processing unit which generates a gray level correction table on the basis of the color information output from the colorimetric unit, and a control unit which corrects the image information on the basis of the gray level correction table generated by the image processing unit and controls the image forming unit to form a color image on the image forming member on the basis of the corrected image information.

According to the image forming apparatus of the first aspect, in printing a color image by superimposing colors on the basis of arbitrary image information, when, for example, toner, an image forming member, or the like which is a consumable, is replaced, the image forming unit forms color reference images on the image forming member on the basis of reference image information for color correction under the control of the control unit. The colorimetric unit measures the colors of the color reference images formed on the image forming member by the image forming unit and outputs color information. The image processing unit generates gray level correction tables on the basis of the color information of each color reference image output from the colorimetric unit. On the assumption of the above operation, the control unit corrects the image information on the basis of the gray level correction tables generated by the image processing unit, and controls the image forming unit to form color images on the image forming member on the basis of the corrected image information.

Therefore, since gray hue can be optimally adjusted, an arbitrary color image can be formed on the image forming member with optimal hue on the basis of the hue-adjusted image information. This makes it possible to print a color image with excellent gray balance by using arbitrary image information corrected on the basis of gray level correction tables even if toner, an image forming member, or the like which is consumable is replaced, and the image forming environment changes as compared with that before the replacement of the consumable.

According to the second aspect of the present invention, there is provided an image forming method of forming a color image on an image forming member by superimposing colors on the basis of image information, comprising the steps of forming a color reference image on the image forming member on the basis of reference image information for color correction, acquiring color information by measuring a color of the color reference image formed on the image forming member, generating a gray level correction table on the basis of the acquired color information, correcting the image information on the basis of the generated gray level correction table, and forming a color image on the image forming member on the basis of the corrected image information.

According to the image forming method of the second aspect, in forming color images on the image forming member by superimposing colors on the basis of arbitrary image information, since gray hue can be optimally adjusted, an arbitrary color image can be formed on the image forming member with optimal hue on the basis of the hue-adjusted image information. This makes it possible to print a color image with excellent gray balance by using arbitrary image information corrected on the basis of gray level correction tables even if toner, an image forming member, or the like which is consumable is replaced, and the image forming environment changes as compared with that before the replacement of the consumable.

As described above, the present invention can be very suitably applied to a color facsimile apparatus, a color printer, a color copying machine, and a multifunctional apparatus having functions equivalent to those thereof, which form a plurality of reference patches having different densities on an image forming member, detect the colors or densities of the patches, and execute desired gray level correction processing on the basis of the detected color information.

The present invention is also directed to an image forming apparatus with a gray level correction function which has a plurality of image structures, and can be very suitably applied to a color facsimile apparatus, a color printer, a color copying machine, and a multifunctional apparatus having functions equivalent to those thereof, which prints a color image by color-converting color image information based on an RGB signal processing system into color image information based on a YMCK signal processing system by using a three-dimensional color conversion table.

BRIEF DESCRIPTION OF THE DRAWINGS

FIG. 6 is a table showing an example of a patch table used when reference patches are formed;

FIG. 7 is a table showing an example of the relationship between the gray values and X, Y, and Z values in the embodiment shown in FIG. 3;

FIGS. 9-1 and 9-2 are flowcharts (main routine) showing examples of image forming operation (first and second examples) in the embodiment shown in FIG. 3;

FIGS. 19-1 and 19-2 are flowcharts (main routine) showing examples of image forming operation (first and second examples) in the embodiment shown in FIG. 3;

DETAILED DESCRIPTION OF THE PREFERRED EMBODIMENTS

Several preferred embodiments of the image forming apparatus and image forming method of the present invention will be described in detail below with reference to the accompanying drawings.

Figure 3:
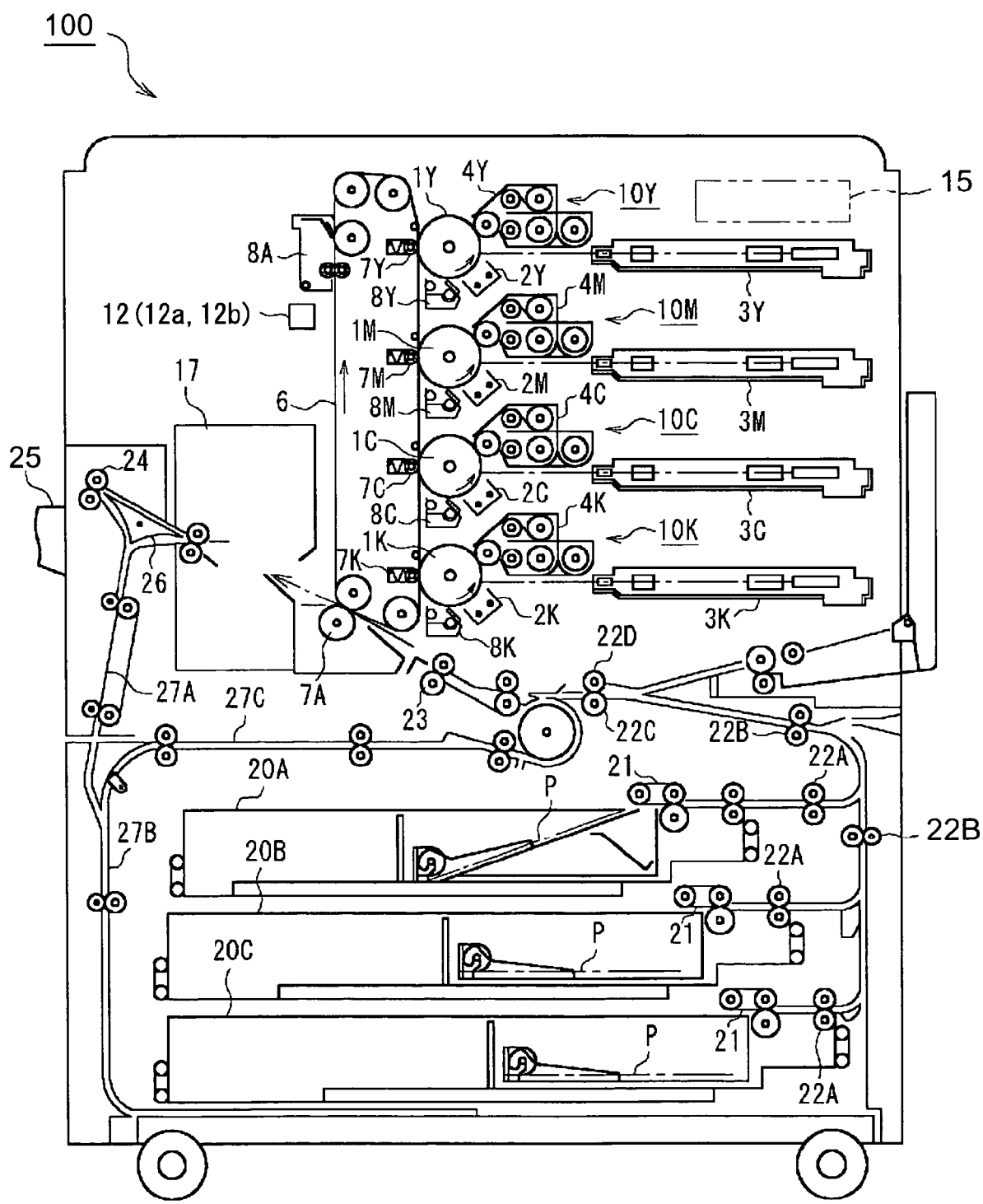
FIG. 3 is a sectional view conceptually showing the arrangement of an embodiment of the image forming apparatus according to the present invention.

The following description will exemplify a color printer 100 as an embodiment of the image forming apparatus according to the present invention as shown in FIG. 3. Obviously, the image forming apparatus of the present invention is not limited to a color printer.

As for image structures in the printer 100, five image structures are prepared, including a small line screen (to be referred to as image structure #1 hereinafter), big line screen (to be referred to as image structure #2 hereinafter), small dot screen (to be referred to as image structure #3 hereinafter), small dot screen (to be referred to as image structure #4 hereinafter), and error diffusion (to be referred to as image structure #5 hereinafter). A "grayscale-characteristic-oriented" mode to be described later is the operation of attaching importance to the grayscale characteristics of a color image formed on an image forming member by superimposing colors. A "gray-oriented" mode is the operation of attaching importance to the gray of a color image formed on the image forming member by superimposing colors. The "reproducibility-oriented" mode is the operation of attaching importance to the reproducibility of a color image formed on the image forming member by superimposing colors.

The arrangement of the color printer 100 will be described first. The color printer 100 shown in FIG. 3 is an apparatus which prints a color image by superimposing colors on the basis of arbitrary image information. This image forming apparatus is an apparatus which reproduces gray levels by using 8-bit (or more) grayscale characteristic tables, and can be suitably applied to a color facsimile apparatus, a color copying machine, and a multifunctional apparatus having functions equivalent to those thereof in addition to the printer 100.

The printer 100 forms a plurality of reference patches with different densities on the image forming member, measures the colors of the reference patches, and executes desired gray level correction processing on the basis of the color detection information. The color printer 100 forms a tandem type color image forming apparatus and includes an image forming device. The image forming device includes a plurality of image forming units 10Y, 10M, 10C, and 10K having image forming members for the respective colors, an endless intermediate transfer belt, a paper feed/convey unit including a paper re-feed mechanism (ADU mechanism), and a fixing device 17 for fixing toner images.

In this case, the image forming unit 10Y which prints a yellow (to be referred to as Y color hereinafter) includes a photosensitive drum 1Y serving as an image forming member on which a Y color toner image is formed, a Y color charging unit 2Y placed around the photosensitive drum 1Y, a laser writing unit (exposure unit) 3Y, a developing unit 4Y, and a cleaning unit 8Y for the image forming member. When a gray level correction table is to be generated, the image forming unit 10Y forms a Y color toner image on the photosensitive drum 1Y on the basis of reference image information for color correction, and transfers a color reference image for color correction (to be also simply referred to as a reference patch PR hereinafter) onto the intermediate transfer belt 6.

The color reference images are comprised of reference patches PR based on cyan (to be referred to C color hereinafter), magenta (to be referred to as M color hereinafter), and Y color, and reference patches PR formed by combining C color, M color, and Y color. This makes it possible to adjust the hues of reproduced colors associated with the three colors C, M, and Y. In this case, the reference patches PR include a reference patch PR based on black (BK). The hues of reproduced colors associated with the four colors C, M, Y, and K can be adjusted.

The image forming unit 10M which prints an M color image includes a photosensitive drum 1M serving as an image forming member on which an M color toner image is formed, an M color charging unit 2M, a laser writing unit 3M, a developing device 4M, and a cleaning unit 8M for the image forming member. When a gray level correction table is to be generated, the image forming unit 10M forms an M color toner image on the photosensitive drum 1M on the basis of reference image information for color correction, and transfers a reference PR onto the intermediate transfer belt 6.

The image forming unit 10C which prints a C color image includes a photosensitive drum 1C serving as an image forming member on which a C color toner image is formed, a C color charging unit 2C, a laser writing unit 3C, a developing device 4C, and a cleaning unit 8C for the image forming member. When a gray level correction table is to be generated, the image forming unit 10C forms a C color toner image on the photosensitive drum 1C on the basis of reference image information for color correction, and transfers a reference PR onto the intermediate transfer belt 6.

The image forming unit 10K which prints a BK color image includes a photosensitive drum 1K serving as an image forming member on which a BK color toner image is formed, a BK color charging unit 2K, a laser writing unit 3K, a developing device 4K, and a cleaning unit 8K for the image forming member. When a gray level correction table is to be generated, the image forming unit 10K forms a BK color toner image on the photosensitive drum 1K on the basis of reference image information for color correction, and transfers a reference PR onto the intermediate transfer belt 6.

The charging unit 2Y and laser writing unit 3Y, the charging unit 2M and laser writing unit 3M, the charging unit 2C and laser writing unit 3C, and the charging unit 2K and laser writing unit 3K constitute latent image forming units, respectively. Each of the developing units 4Y, 4M, 4C, and 4K performs reversal development by applying a developing bias which is obtained by superimposing an AC voltage on a DC voltage having the same polarity (negative polarity in this embodiment) as that of toner to be used. The intermediate transfer belt 6 is wound around a plurality of rollers and is pivotally supported to transfer Y color, M color, C color, and BK color toner images formed on the photosensitive drums 1Y, 1M, 1C, and 1K.

An outline of an image forming process will be described below. The images of the respective colors formed by the image forming units 10Y, 10M, 10C, and 10K are sequentially transferred onto the pivoting intermediate transfer belt 6 (primary transfer) by primary transfer rollers 7Y, 7M, 7C, and 7K to which primary transfer biases (not shown) having the opposite polarity (positive polarity in this embodiment) to that of the toner to be used are applied, thereby forming a composite color image (color toner image). The color image is transferred from the intermediate transfer belt 6 onto an image recording sheet P.

Image recording sheets P stored in paper feed cassettes 20A, 20B and 20C are fed by pickup rollers 21 and feed rollers 22A provided for the paper feed cassettes 20A, 20B, and 20C, respectively, and are conveyed to secondary transfer rollers 7A via convey rollers 22B, 22C, and 22D, registration rollers 23, and the like. A color image is then transferred in block onto one surface (upper surface) of the image recording sheet P (secondary transfer).

The image recording sheet P onto which the color image is transferred is subjected to fixing processing by the fixing device 17, and is clamped by delivery rollers 24 to be placed on a delivery tray 25 located outside the apparatus. The residual transfer toner left on the outer surfaces of the photosensitive drums 1Y, 1M, 1C, and 1K after the transfer is cleaned by the cleaning units 8Y, 8M, 8C, and 8K. The next image forming cycle is then started.

In double-sided image forming, the image recording sheet P which has an image printed on one surface (upper surface) and is delivered from the fixing device 17 is branched from a sheet delivery path by a branching unit 26. The image recording sheet P is then inversed by an inversion convey path 27B and merges with the above path at the convey roller 22D via a re-feed convey unit 27C.

The inversed/conveyed image recording sheet P is conveyed to the secondary transfer roller 7A through the registration rollers 23, and a color image (color toner image) is transferred in block onto the other surface (lower surface) of the image recording sheet P. The image recording sheet P onto which the color image is transferred is subjected to fixing processing by the fixing device 17, and is clamped by the delivery rollers 24 to be placed on the delivery tray 25 located outside the apparatus.

After the color image is transferred onto the image recording sheet P by the secondary transfer roller 7A, residual toner is removed from the intermediate transfer belt 6, which has curvature-separated the image recording sheet P, by the cleaning unit 8A for the intermediate transfer belt. When these image forming operations are performed, the following are used as image recording sheets P: thin paper of about 52.3 to 63.9 kg/m$^2$ (1,000 sheets), plain paper of about 64.0 to 81.4 kg/m$^2$ (1,000 sheets), thick paper of about 83.0 to 130.0 kg/m$^2$ (1,000 sheets), and very thick paper of about 150.0 kg/m$^2$ (1,000 sheets). As image recording sheets P, sheets having thicknesses (paper thicknesses) of about 0.05 to 0.15 mm are used.

A colorimetric unit 12 (including, for example, a color measurement sensor 12a or color detection sensor 12b (to be described later)) is provided upstream of the cleaning unit 8A described above on the left side of the intermediate transfer belt 6. The colorimetric unit 12 detects the colors of the reference patches PR formed on the intermediate transfer belt 6 by the image forming units 10Y, 10M 10C, and 10K, and generates a color measurement signal (color information) S1. A CCD image sensing device, color detector, or the like is used for the colorimetric unit 12.

The printer body incorporates a control unit 15 to execute a gray level correction mode on the basis of the color measurement signal S1 obtained from the colorimetric unit 12. In this case, the gray level correction mode is the operation of forming reference patches PR for color correction at predetermined positions on the intermediate transfer belt 6, reading the colors of the reference patches PR, and generating a gray level correction table. The gray level correction table is used to correct color images in a color superimposing process.

Figure 4:
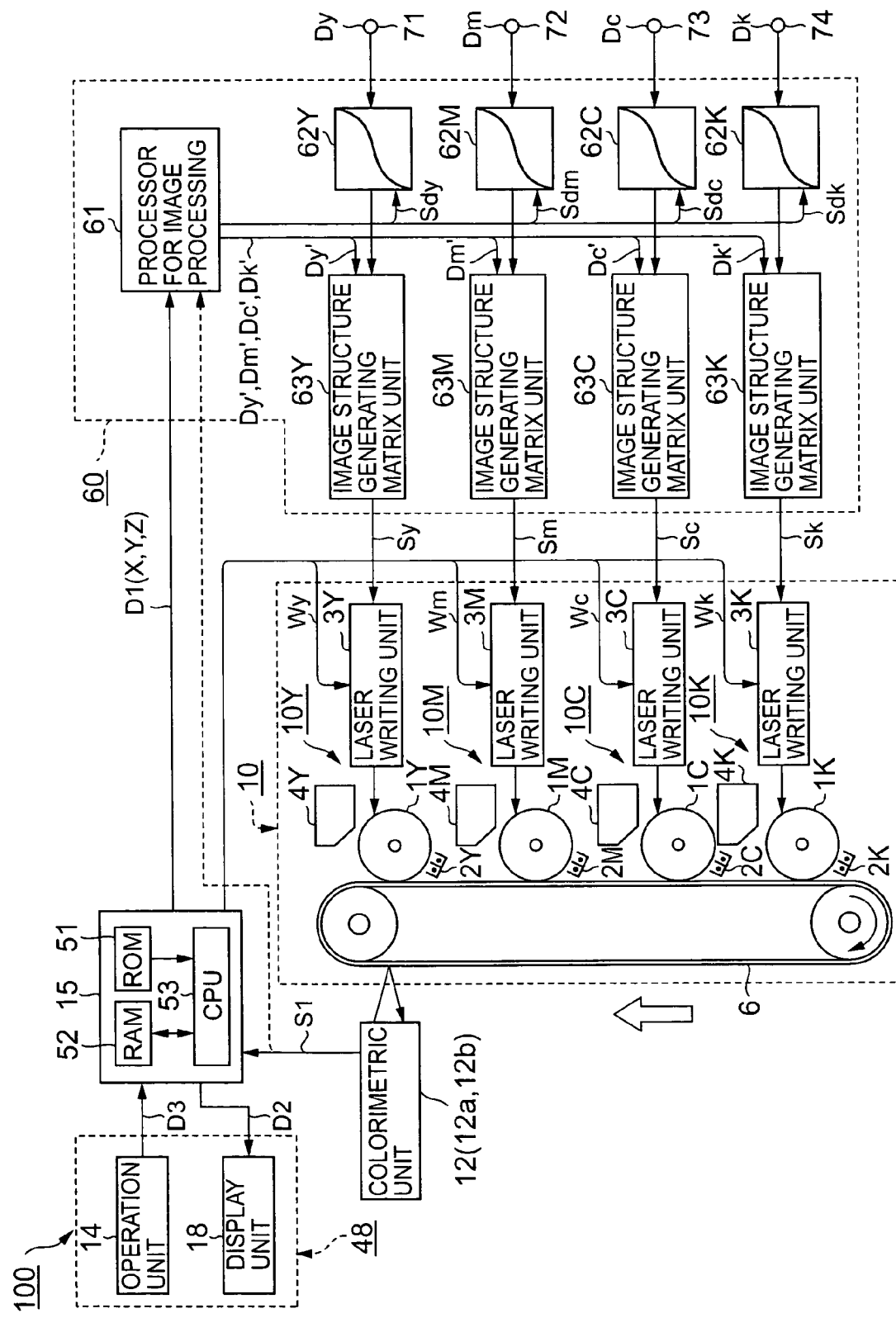
FIG. 4 is a block diagram showing the arrangement of a control system in the embodiment shown in FIG. 3.

FIG. 4 is a block diagram showing an example of the arrangement of the control system of the color printer 100. The color printer 100 shown in FIG. 4 is an apparatus which reproduces gray levels (prints a color image by superimposing colors) by using a gray level reproduction table made of at least eight or more bits. This printer includes an image forming device 10, an operation unit 14 (including an operation setting unit 14a or operation selection unit 14b (to be described later)), the control unit 15, a display unit 18, and an image processing unit 60.

The image forming device 10 is comprised of the image forming units 10Y, 10M, 10C, and 10K shown in FIG. 3, and forms a plurality of reference patches PR of image structures with different densities on the intermediate transfer belt 6 through the photosensitive drums 1Y, 1M, 1C, and 1K. The laser writing units 3Y, 3M, 3C, and 3K in the image forming device 10 are connected to the control unit 15 to be subjected to write control.

For example, when generating a gray level correction table, the laser writing unit 3Y operates to receive a write control signal Wy from the control unit 15 and write a reference patch PR for color correction on the photosensitive drum 1Y. The reference patch PR written on the photosensitive drum 1Y is developed by the developing unit 4Y shown in FIG. 3 with Y color toner and is transferred onto the intermediate transfer belt 6.

When generating a gray level correction table, the laser writing unit 3M operates to receive a write control signal Wm from the control unit 15 and write a reference patch PR for color correction on the photosensitive drum 1M. The reference patch PR written on the photosensitive drum 1M is developed by the developing unit 4M with M color toner and is transferred onto the intermediate transfer belt 6.

When generating a gray level correction table, the laser writing unit 3C operates to receive a write control signal Wc from the control unit 15 and write a reference patch PR for color correction on the photosensitive drum 1C. The reference patch PR written on the photosensitive drum 1C is developed by the developing unit 4C with C color toner and is transferred onto the intermediate transfer belt 6.

When generating a gray level correction table, the laser writing unit 3K operates to receive a write control signal Wk from the control unit 15 and write a reference patch PR for color correction on the photosensitive drum 1K. The reference patch PR written on the photosensitive drum 1K is developed by the developing unit 4K with BK color toner and is transferred onto the intermediate transfer belt 6.

In addition to the image forming device 10, the colorimetric unit 12 is connected to the control unit 15 to measure the colors of the reference patches PR, which are respectively written on the photosensitive drums 1Y, 1M, 1C, and 1K by the image forming units 10Y, 10M, 10C, and 10K and transferred onto the intermediate transfer belt 6, and outputs the color measurement signal S1 to the control unit 15. The control unit 15 then analog/digital (A/D)-converts the color measurement signal S1 to obtain colorimetric data (Lab value) D1. When, for example, 8-bit red (R), 8-bit green (G), and 8-bit blue (B) are to be reproduced by using the colorimetric data D1, each of X, Y, and Z (luminance) values corresponding to R, G, and B colors is expressed by an input gray level value 0 to 255.

Note that when the colorimetric unit 12 or a processor 61 incorporates an A/D conversion function, the color measurement signal S1 may be directly supplied to the processor 61 in the image processing unit, as indicated by the broken line in FIG. 4. This can reduce the control load on a CPU 53 in the control unit 15.

The control unit 15 includes a ROM (Read Only Memory) 51, RAM (Random Access Memory) 52, and CPU (Central Processing Unit) 53. The ROM 51 stores system program data for controlling the overall printer. The RAM 52 is used as a work memory, in which, for example, a control command or the like is temporarily stored. When the power is turned on, the CPU 53 reads out the system program data from the ROM 51 to start the system, and controls the overall printer on the basis of operation data D3 from the operation unit 14.

The image processing unit 60 generates a gray level correction table on the basis of the colorimetric data D1 of the reference patches PR which is obtained from the colorimetric unit 12. The image processing unit 60 includes, for example, the processor 61 for image processing, a memory 62Y for Y color gray level correction table setting, a memory 62M for M color gray level correction table setting, a memory 62C for C color gray level correction table setting, a memory 62K for BK color gray level correction table setting, a Y color image structure generating matrix unit 63Y, an M color image structure generating matrix unit 63M, a C color image structure generating matrix unit 63C, and a BK color image structure generating matrix unit 63K.

The processor 61 is connected to the control unit 15 and generates gray level correction tables by calculating gray level correction values in a CMY coordinate system so as to match the colorimetric data D1 based on the reference patches PR, which is measured by the colorimetric unit 12, with preset color information (Lab value). When the "grayscale-characteristic-oriented" mode is selected, the processor 61 calculates gray level correction tables which smoothly express the dynamic ranges of C color, M color, and Y color. When the "gray-oriented" mode is selected, the processor 61 calculates gray level correction tables which make the ratios in grayscale characteristics between C color, M color, and Y color equal to preset ratios throughout the gray levels. When the "reproducibility-oriented" mode is selected, the processor 61 calculates gray level correction tables which make the densities of C color, M color, and Y color equal to preset densities.

The processor 61 is comprised of a DSP (Digital Signal Processor), a memory, and the like. For example, the processor 61 retrieves preset color information from the colorimetric data D1 based on the reference patches PR, which is obtained by the colorimetric unit 12, and calculates gray level correction (CMY) values from the retrieved colorimetric data D1 based on the reference patches PR by linear interpolation, thereby generating gray level correction tables. The gray level correction tables are used to correct image data Dy, Dm, Dc, and Dk.

The color printer 100 includes data input terminals 71 to 74. The terminal 71 is connected to the memory 62Y to output the externally input image data Dy to the memory 62Y. The terminal 72 is connected to the memory 62M to output the externally input image data Dm to the memory 62M. The terminal 73 is connected to the memory 62C to output the externally input image data Dc to the memory 62C. The terminal 74 is connected to the memory 62K to output the externally input image data Dk to the memory 62K.

A gray level correction table is set in the memory 62Y under the data set control of the control unit 15. In this case, data set control is the control of setting gray level correction tables in the memories 62Y, 62M, 62C, and 62K for each color on the basis of the gray level correction method designated from the operation unit 14. In this case, the control unit 15 outputs a control signal Sdy for data setting to set the Y color gray level correction table in the memory 62Y.

An M color gray level correction table is set in the memory 62M upon reception of a similar control signal Sdm. A C color gray level correction table is set in the memory 62C upon reception of a similar control signal Sdc. A BK color gray level correction table is set in the memory 62K upon reception of a similar control signal Sdk. Nonvolatile memories such as EEPROMs are used for the memories 62Y, 62M, 62C, and 62K. A nonvolatile memory is a read-only memory whose stored data is not lost even in the absence of power.

The control unit 15 corrects the image data Dy, Dm, Dc, and Dk on the basis of the gray level correction tables generated by the processor 61 for image processing, and controls the image forming units 10Y, 10M, 10C, and 10K to form color images on the intermediate transfer belt 6 through the photosensitive drums 1Y, 1M, 1C, and 1K on the basis of the corrected image data Dy, Dm, Dc, and Dk.

In this case, the Y color image structure generating matrix unit 63Y is connected to the memory 62Y, and a Y color image structure signal Sy is generated on the basis of the corrected image data Dy. The M color image structure generating matrix unit 63M is connected to the memory 62M, and an M color image structure signal Sm is generated on the basis of the corrected image data Dm. The C color image structure generating matrix unit 63C is connected to the memory 62C, and a C color image structure signal Sc is generated on the basis of the corrected image data Dc. The BK color image structure generating matrix unit 63K is connected to the memory 62K, and a BK color image structure signal Sk is generated on the basis of the corrected image data Dk.

The operation unit 14 is connected to the control unit 15.

In the first control example, the operation unit 14 is the operation setting unit 14a which is operated through the control unit 15 to set color information for the processor 61. The color information that can be set includes at least a color temperature D65, color temperature D50, and custom gray. In this case, custom gray indicates that a user or the like directly sets a gray level correction table. The operation setting unit 14a is used for the selection of a gray level correction method and the setting of image forming conditions such as a paper size and image density, in addition to the setting of color information.

In the second control example, the operation unit 14 is the operation selection unit 14b which is operated to select one image structure #i (i=1 to 5) of a plurality of types of image structures #i for color images formed on the intermediate transfer belt 6 through the photosensitive drums 1Y, 1M, 1C, and 1K. The operation selection unit 14b is an image structure selection window P1 (see FIG. 11). In this case, the operation selection unit 14b has a function of selecting whether or not color matching is performed among the plurality of types of image structures #i. This function can make settings in the control unit 15 to determine whether or not to equalize gray level correction among image structures #i. The control unit 15 sets gray level correction tables corresponding to the image structure selected by the operation selection unit 14b in the image forming units 10Y, 10M, 10C, and 10K.

In the third control example, the operation unit 14 is the operation selection unit 14b which is operated to select one of the "grayscale-characteristic-oriented", "gray-oriented", and "reproducibility-oriented" modes in relation to the gray level correction method. In the third control example, the operation selection unit 14b has a function of selecting one of the "grayscale-characteristic-oriented", "gray-oriented", and "reproducibility-oriented" modes for each of C color, M color, and Y color. Obviously, the operation setting unit 14a may be provided with a function of selecting one of the "grayscale-characteristic-oriented", "gray-oriented", and "repro-ducibility-oriented" modes in common to C color, M color, and Y color.

Setting information of image forming conditions and gray level correction method, selection information of image structure #i and mode, or the like is output as the operation data D3 to the control unit 15.

Figure 22A:
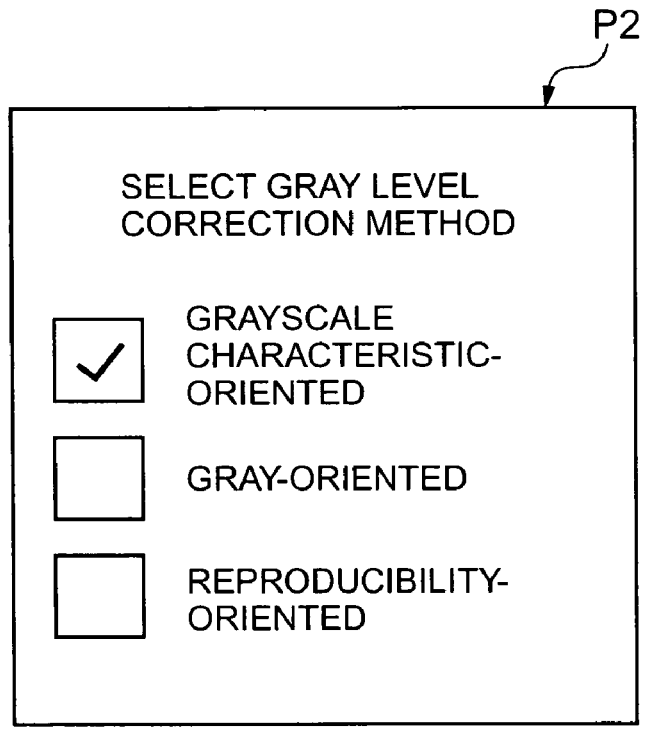
FIGS. 22A and 22B are views each showing an example of a gray level correction method selection window.

The display unit 18 is connected to the control unit 15 in addition to the operation unit 14 to display a gray level correction method selection window P2 like the one shown in FIG. 22A. The operation unit 14 is formed from a touch panel. The display unit 18 is formed from a liquid crystal display panel. In this case, the touch panel forming the operation unit 14 is provided on the liquid crystal display panel forming the display unit 18 to form a GUI (Graphical User Interface)-based operation panel 48. The control unit 15 controls the display unit 18, the image forming device 10, and the image processing unit 60 on the basis of the operation data D3 obtained from the operation unit 14.

The first to third gray level correction processes of the present invention which are applied to the color printer 100 having the above arrangement will be sequentially described below.

First Gray Level Correction Process:

In the first gray level correction process, first of all, color reference images (reference patches for color correction) PT are formed on an image forming member, and a gray level correction table is then generated on the basis of color information obtained by measuring the colors of the color reference images. In addition, image information is corrected on the basis of the gray level correction table.

Figure 5:
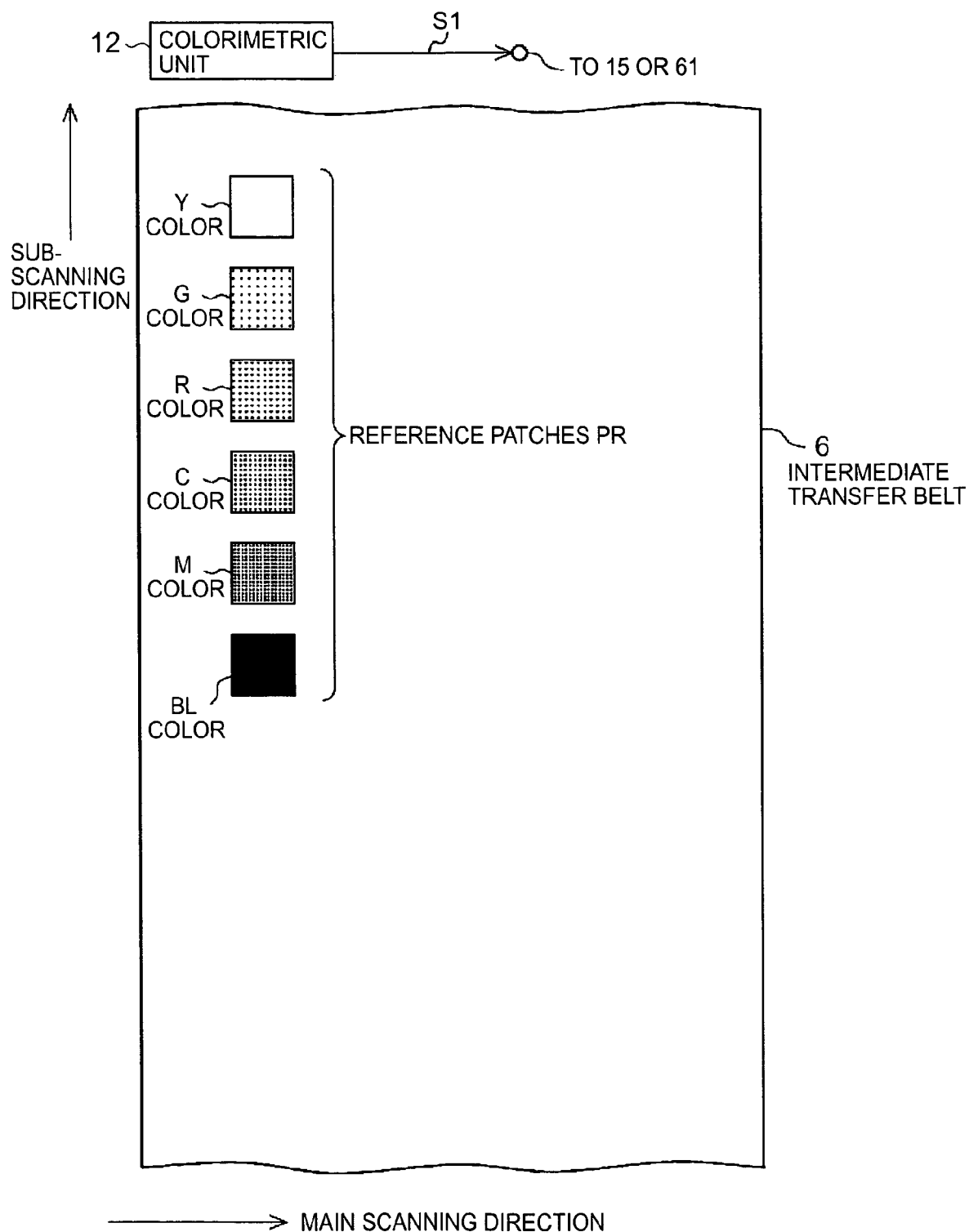
FIG. 5 is a view showing an example of how reference patches for color correction are formed.

FIG. 5 is a view showing an example of how reference patches PR for color correction are formed. In this example, the reference patches PR include the reference patches PR based on C color, M color, and Y color, and the reference patches PR based on combinations of C color, M color, and Y color. This makes it possible to adjust colors of reproduced colors associated with the three colors C, M, and Y. Obviously, the above reference patches PR may include the reference patch PR based on BK color. This makes it possible to adjust colors of reproduced colors based on the four colors C, M, Y, and K.

The reference patches PR shown in FIG. 5 are formed when the gray level correction mode is executed. The CPU 53 shown in FIG. 4 controls the image forming units 10Y, 10M, 10C, and 10K so as to form the reference patches PR for color correction on the intermediate transfer belt 6. In this example, the rectangular Y color reference patch PR for color correction is formed on the intermediate transfer belt 6 in the sub-scanning direction coinciding with the moving direction of the intermediate transfer belt 6.

A green (to be referred to as G color hereinafter) reference patch PR is formed following the above reference patch. The G color reference patch PR is formed by superimposing Y color and C color. The order of color superimposition is assumed such that a Y color layer becomes a lower layer, and a C color layer becomes an upper layer, and the other way around.

Successively, a red (to be referred to as R color hereinafter) reference patch PR is formed. The R color reference patch PR is formed by superimposing Y color and M color. The order of color superimposition is assumed such that a Y color layer becomes a lower layer, and an M color layer becomes an upper layer, and the other way around. A C color reference patch PR is formed following the R color reference patch PR.

Figure 16:
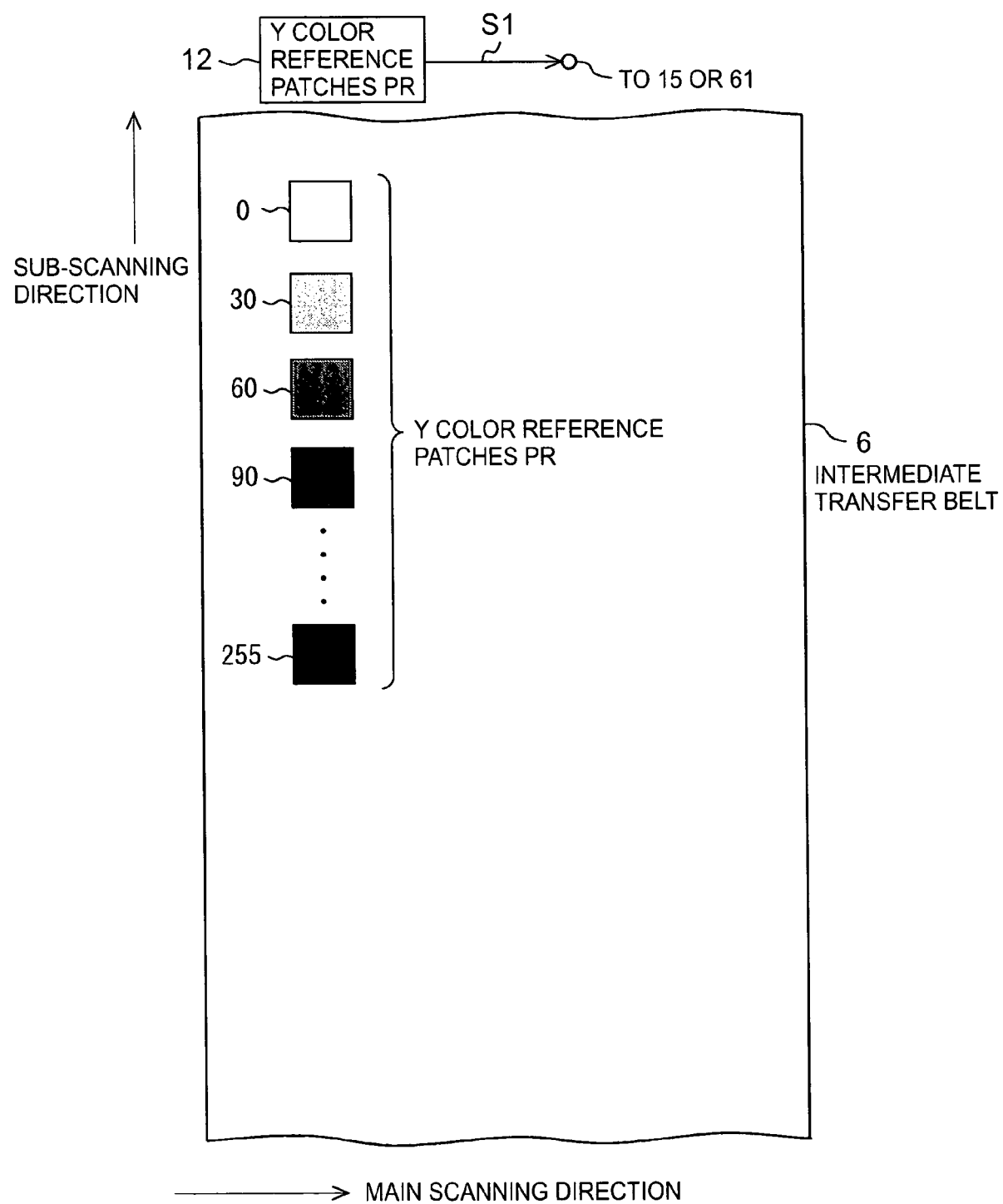
FIG. 16 is a view showing an example of how reference patches PR for color correction are formed.

Successively, an M reference patch PR is formed. Furthermore, a BK color reference patch PR is formed successively. As shown in FIG. 16 (to be described later), a plurality of reference patches PR are formed for each color as indicated by gray level values 0, 30, 90, . . . , 255 and the like.

The reference patches PR for color correction are detected by the colorimetric unit 12, and the Lab values (grayscale characteristic data) of the reference patches PR of the respective colors are calculated, thus controlling the image forming units 10Y, 10M, 10C, and 10K so as to adjust grays (hues). This control is performed to allow the image forming system to superimpose color images based on arbitrary image data Dy, Dm, Dc, and Dk with good color reproducibility after the execution of the gray level correction mode.

FIG. 6 is a view showing a patch table to be used when reference patches are to be formed. The printer 100 forms, for example, reference patches PR of 125 colors on the intermediate transfer belt 6. In the table shown in FIG. 6, the gray levels of Y color, M color, and C color are respectively assigned to 125 ($5^3$=125) patches, i.e., patch No. 0 to No. 124. The respective gray levels of Y color, M color, and C color are stored as color correction data in a memory (not shown), and are read out therefrom when the gray level correction mode is executed. Reference patches PR of Y color, M color, and C color are formed on the basis of these color correction data.

According to the table shown in FIG. 6, with regard to the Y color reference patches PR, gray level "0" is assigned to patch No. 0 to patch No. 24; gray level "64", to patch No. 25 to patch No. 123; and gray level "255", to patch No. 124. With regard to the M color reference patches PR, gray level "0"is assigned to patch No. 0 to patch No. 4; gray level "64", to patch No. 5 to patch No. 9; gray level "128", to patch No. 10 to patch No. 23; gray level "255", to patch No. 24; gray level "0", to patch No. 25 to patch No. 123; and gray level "255", to patch No. 124.

With regard to the C color reference patches PR, gray level "0", is assigned to patch No. 0; gray level "64", to patch No. 1; gray level "128", to patch No. 2; gray level "191", to patch No. 3; gray level "255", to patch No. 4; gray level "0", to patch No. 5; gray level "128", to patch No. 6 to patch No. 8; gray level "255", to patch No. 9; gray level "0", to patch No. 10 to patch No. 13; gray level "255", to patch No. 14 to patch No. 24; gray level "0", to patch No. 25 to patch No. 123; and gray level "255", to patch No. 124.

When gray levels are set in the above manner, the reference patch PR of patch No. 0 is achromatic (white), and the reference patch PR of patch No. 1 is lightest C color. According to the hues of the reference patches PR of patch No. 2 to patch No. 4, C color becomes darker. The reference patch PR of patch No. 5 is lightest M color. According to the hues of the reference patches PR of patch No. 6 to patch No. 9, blue (BL) obtained by superimposing C color on M color becomes darker.

The reference patch PR of patch No. 10 is M color darker than the reference patch PR of patch No. 5. Likewise, the reference patch PR of patch No. 14 is BL color darker than the reference patch PR of patch No. 9. The reference patch PR of patch No. 24 is BL color much darker than reference patch PR of patch No. 14. The reference patch PR of patch No. 25 is lightest Y color. The reference patch PR of patch No. 124 is darkest BK color.

The gray level values of patch No. 0 to patch No. 124 associated with Y color are color correction reference image data Dy'. The gray level values of patch No. 0 to patch No. 124 associated with M color are color correction reference image data Dm'. The gray level values of patch No. 0 to patch No. 124 associated with color C are color correction reference image data Dc'. The reference image data Dy', Dm', and Dc' are stored in an HDD or the like because they are used in the color correction mode. The reference patches PR of a total of 125 colors obtained by combining C, M, and Y colors based on the reference image data Dy', Dm', and Dc' in five steps in this manner are formed (arranged) on the intermediate transfer belt 6, and pieces of color information (XYZ values) are sequentially read by the colorimetric unit 12. The resultant data are used as XYZ characteristic data representing the tone reproducibility of the printer 100.

FIG. 7 is a table showing an example of the relationship between the gray values and the X, Y, and Z values in the printer 100. In this example, in order to calculate a gray level correction table, a gray level correction type can be selected and color information can be set by using the operation setting unit 14*a*. For example, as gray level correction types, optional items including color temperature D65, color temperature D50, color temperatures A, B, C, . . . , custom gray, and the like are prepared. The user selects a gray level correction type and sets a gray value (hue information) in the printer 100. Setting color temperature D65, D50, or the like by using the operation setting unit 14*a* in this manner can facilitate controlling gray balance when an image is to be printed out.

According to the gray level correction type shown in FIG. 7, the gray values in the printer 100 are made to correspond to XYZ characteristic data (to be referred to as X, Y, and Z values hereinafter) representing the tone reproducibility of the printer. In this example, the Y value "1.0" is set as a reference for color temperature D65, color temperature D50, and color temperatures A, B, C, . . . . With this value being set as a setting condition, for example, with respect to color temperature D65 as a gray value, the X value is 0.9504 and the Z value is 0.10889.

With respect to color temperature D50 as a gray value, the X value is 0.9642 and the Z value is 0.8249. With respect to color temperature A as a gray value, the X value is 0.1095 and the Z value is 0.3558. With respect to color temperature B as a gray value, the X value is 0.9909 and the Z value is 0.8531. With respect to color temperature C as a gray value, the X value is 0.9807 and the Z value is 1.1823. Since each custom value is arbitrarily set by the user, "–" indicating "undecided" is set in each corresponding field.

In this manner, when a gray level correction table is calculated, a gray level correction type can be set by using the operation setting unit 14a. Consider, for example, a gray level correction table of 256 gray levels. In this case, the whitest portion corresponds to the X, Y, and Z values shown in FIG. 7, and the XYZ value of the darkest portion is expressed by "0.0". The gray levels between the white portion and the dark portion are linearly interpolated. The interpolated gray level correction values are used as target XYZ data for reproducing target colors.

Subsequently, the XYZ characteristic data of the printer 100 and target XYZ data for target color reproduction are converted into LAB values (chromatic data) in the L*a*b* coordinate system (color solid coordinate system) by using preset XYZ values (to be referred to as Xn, Yn, and Zn hereinafter) for an image recording sheet according to equations (1). The respective data are used as XYZ characteristic data of 125 colors of the printer 100 and target XYZ data of 256 gray levels.

$$L = 116 \times (Y/Yn)^{1/3} - 16$$

$$A = 500 \times \{(X/Xn)^{1/3} - (Y/Yn)^{1/3}\}$$

$$B = 200 \times \{(Y/Yn)^{1/3} - (Z/Zn)^{1/3}\} \quad (1)$$

Figure 8A:
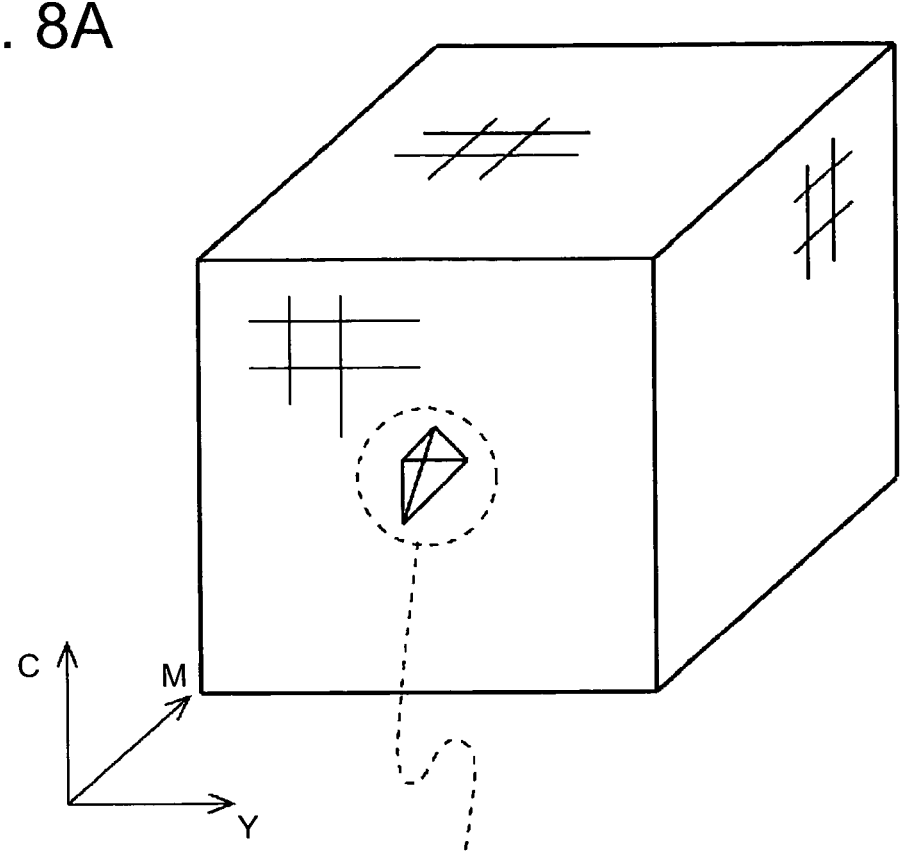
FIGS. 8A and 8B are views showing an example of how target XYZ data in a CMY color coordinate system is calculated.
Figure 8B:
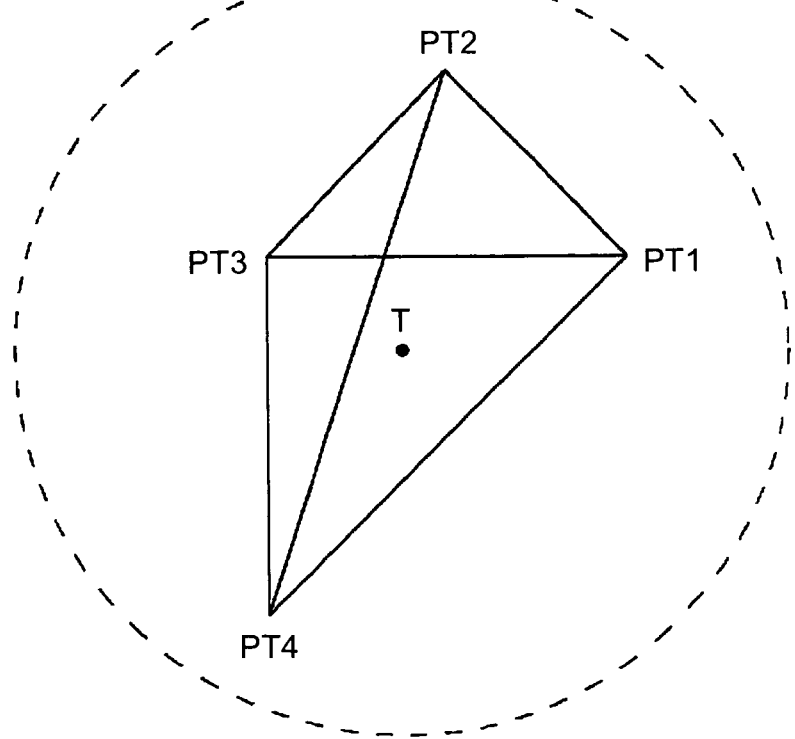

FIGS. 8A and 8B are views showing an example of how target XYZ data in the CMY color coordinate system are calculated. In this example, in order to reproduce a target color, the reference patches PR formed by the color printer 100 are retrieved. A retrieval method will be described below.

Of the target gray levels calculated by equations (1), the LAB value of a target which is to be retrieved is set in the processor 61. In this case, if the target is described as T and the target T is described in the L*a*b* coordinate system (color solid coordinate system), T(1, a, b) is obtained. Four arbitrary points are then extracted from the XYZ characteristic data of 125 colors of the color printer 100, and the color coordinate positions of the respective points are expressed as PT1, PT2, PT3, and PT4. The respective LAB values are represented by PT1(1, a, b), PT2(1, a, b), PT3(1, a, b), and PT4(1, a, b), and the coefficients are represented By a, b, and c. In this case, this color coordinate positional relationship can be expressed by a three-dimensional vector as follows:

$$T - PT1 = a \times (PT2 - PT1) + b \times (PT3 - PT1) + c \times (PT4 - PT1) \quad (2)$$

The coefficients a, b, and c can be computed by the processor 61. In this case, a, b, and c are computed under the following conditions:

$$a \square 0, b \square 0, c \square 0, a+b+c \square 1 \quad (3)$$

As is obvious, when these conditions are satisfied, the target T exists in the tetrahedron defined by the color coordinate positions PT1, PT2, PT3, and PT4 shown within the broken line circle in FIG. 8B in the CMY coordinate system shown in FIG. 8A. If, therefore, conditional expression (3) is satisfied, a CMY value (T'(c, m, y)) for reproducing the target T can be computed by $$T' = a \times (PT2' - PT1') + b \times (PT3' - PT1') + c \times (PT4' - PT1') + PT1' \quad (4)$$

This computation is executed by the processor 61. The color coordinate positions PT1'(c, m, y), PT2'(c, m, y), PT3'(c, m, y), and PT4'(c, m, y) obtained here are CMY values in a patch table in the CMY color coordinate system shown in FIG. 7.

By performing the above computation for all the gray levels (256 gray levels), CMY values of 256 gray levels which reproduce the LAB value of the target T can be obtained. Such gray level correction tables are set in the memories 62Y, 62M, 62C, and 62K shown in FIG. 4. When a color image is formed by using the corrected image data Dy, Dm, Dc, and Dk, the LAB value of gray obtained when C color, M color, and Y color are superimposed on the intermediate transfer belt 6 can be made equal to the value set by the user on the gray level correction method selection window P2.

The first image forming method according to the present invention will be described next.

Figure 1A:
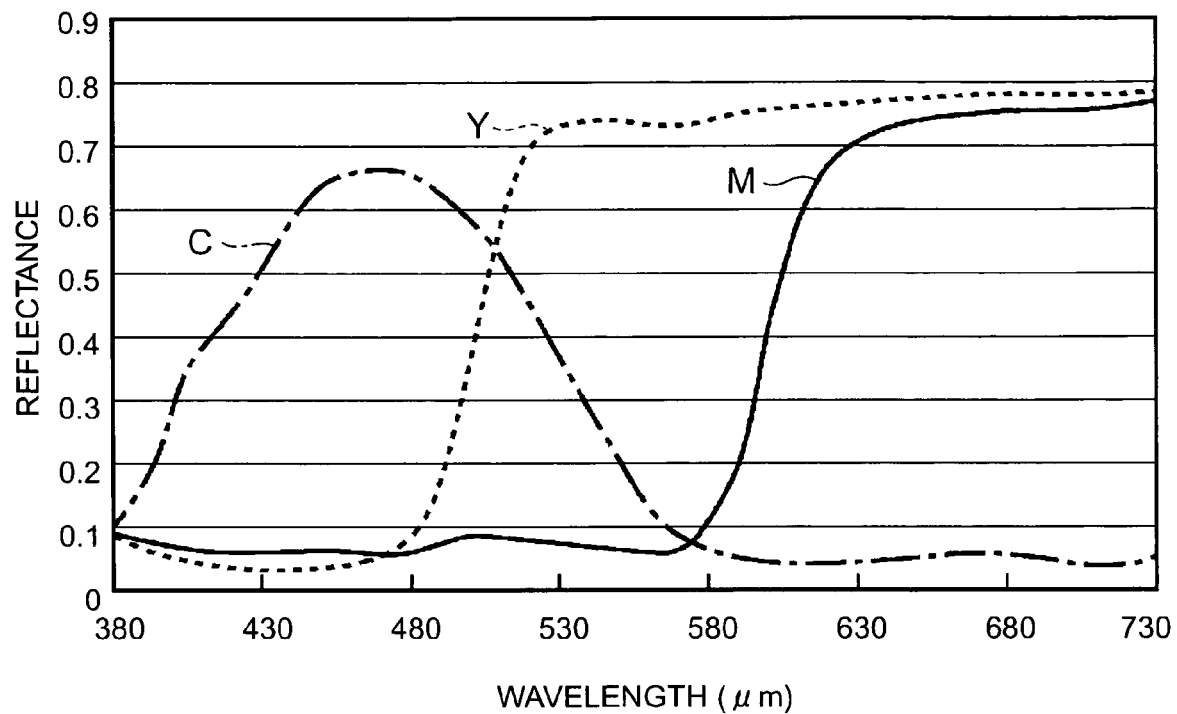
FIGS. 1A and 1B are graphs each showing an example of the relationship between the reflectances and wavelengths of C, M, and Y colors according to the prior art.
Figure 1B:
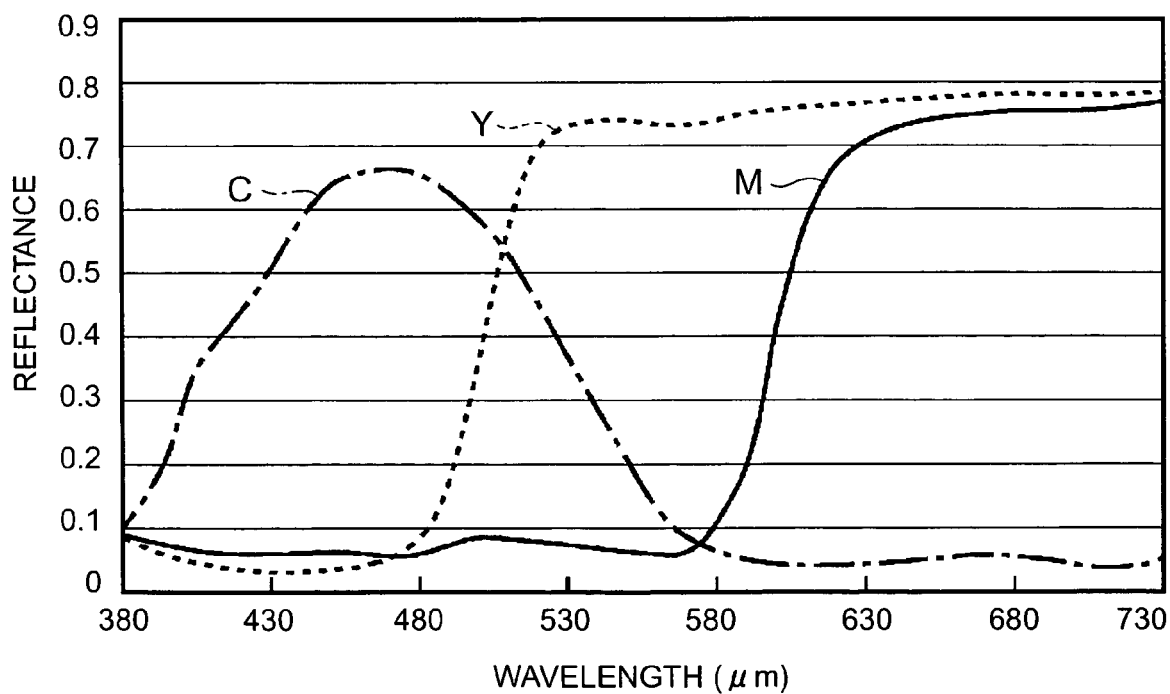
Figure 2:
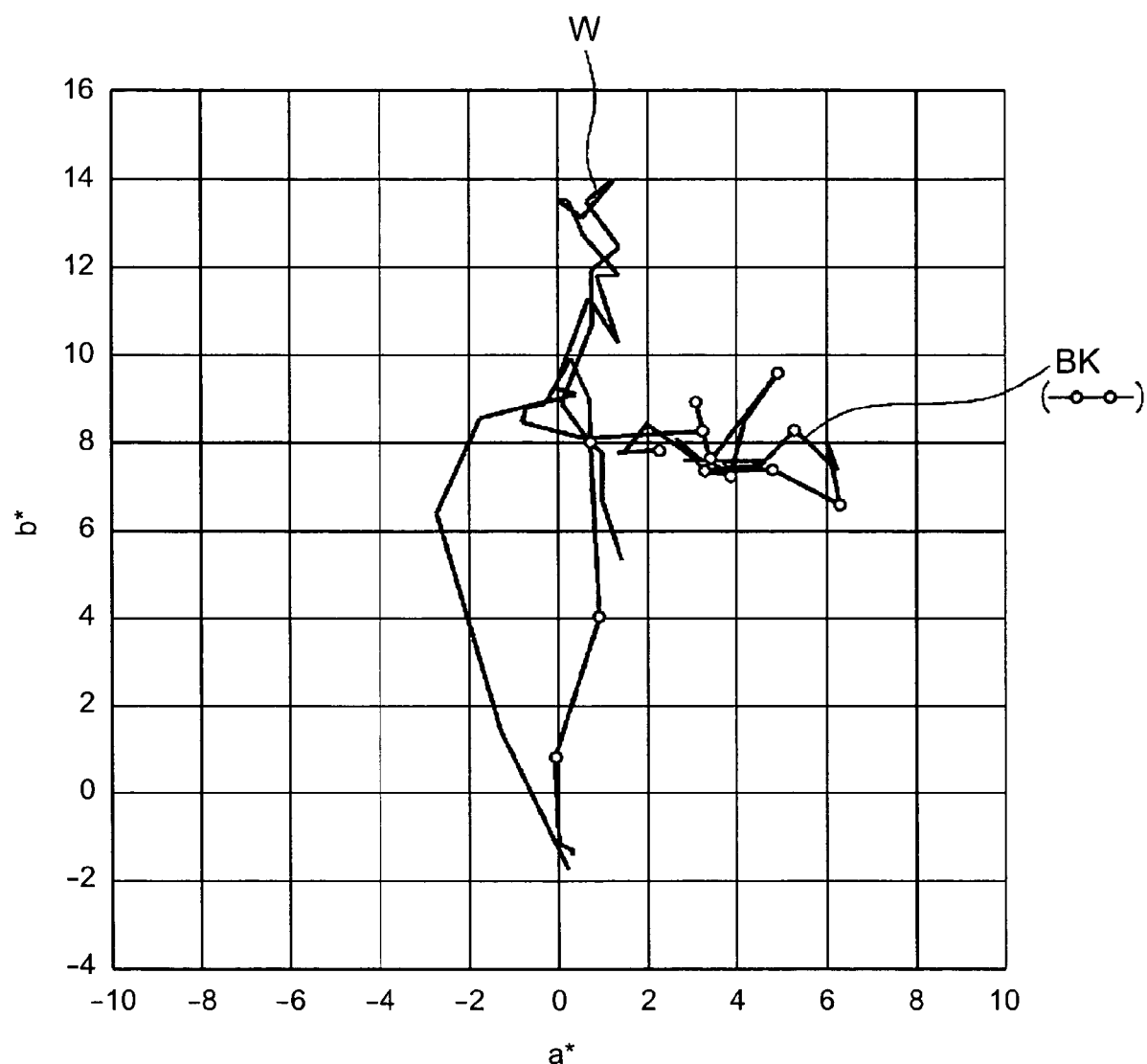
FIG. 2 is a graph showing an example of gray hue changes with environmental changes of an image forming apparatus according to the present invention.
Figures 1, 9:
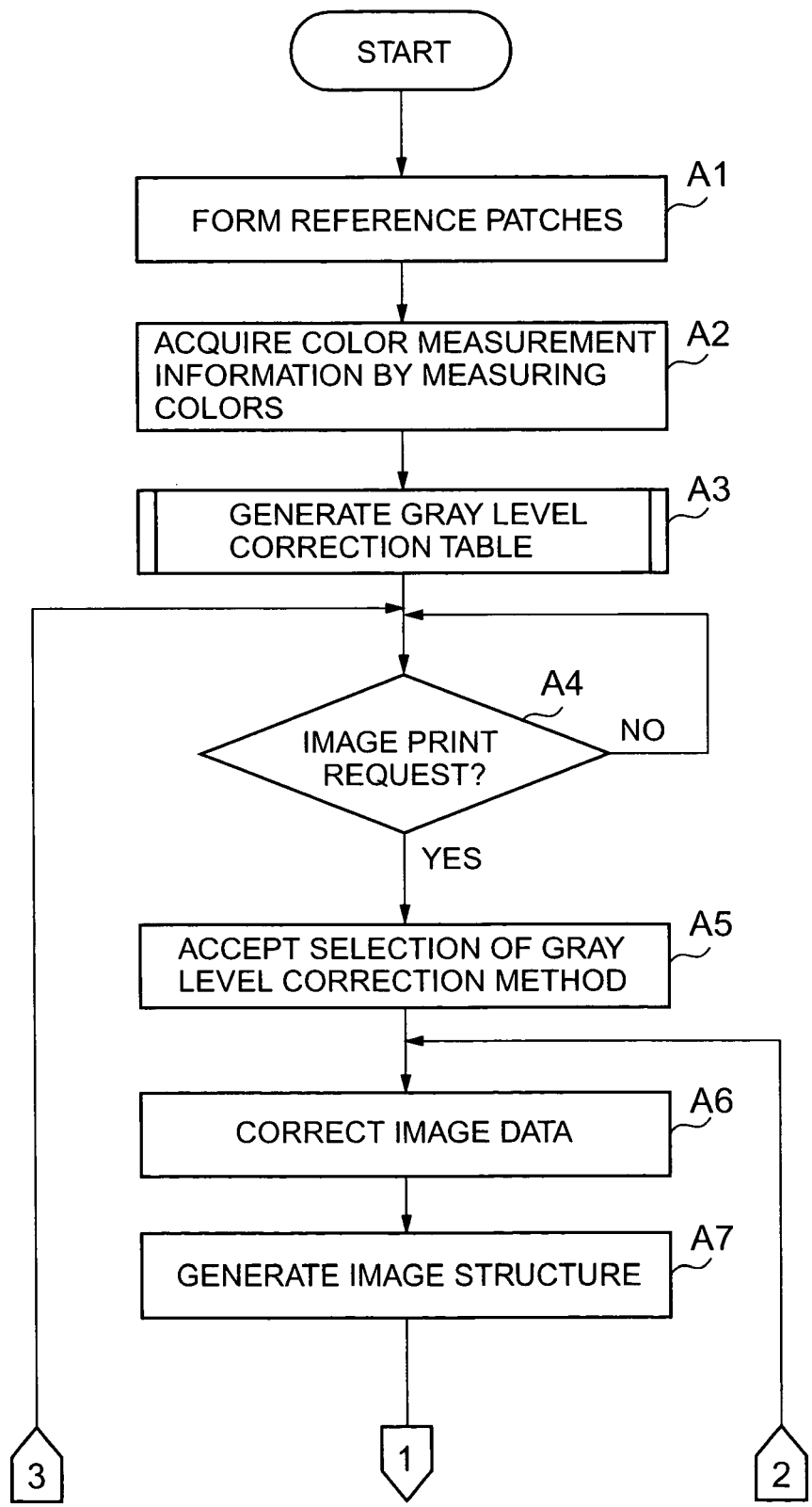
Figures 2, 9:
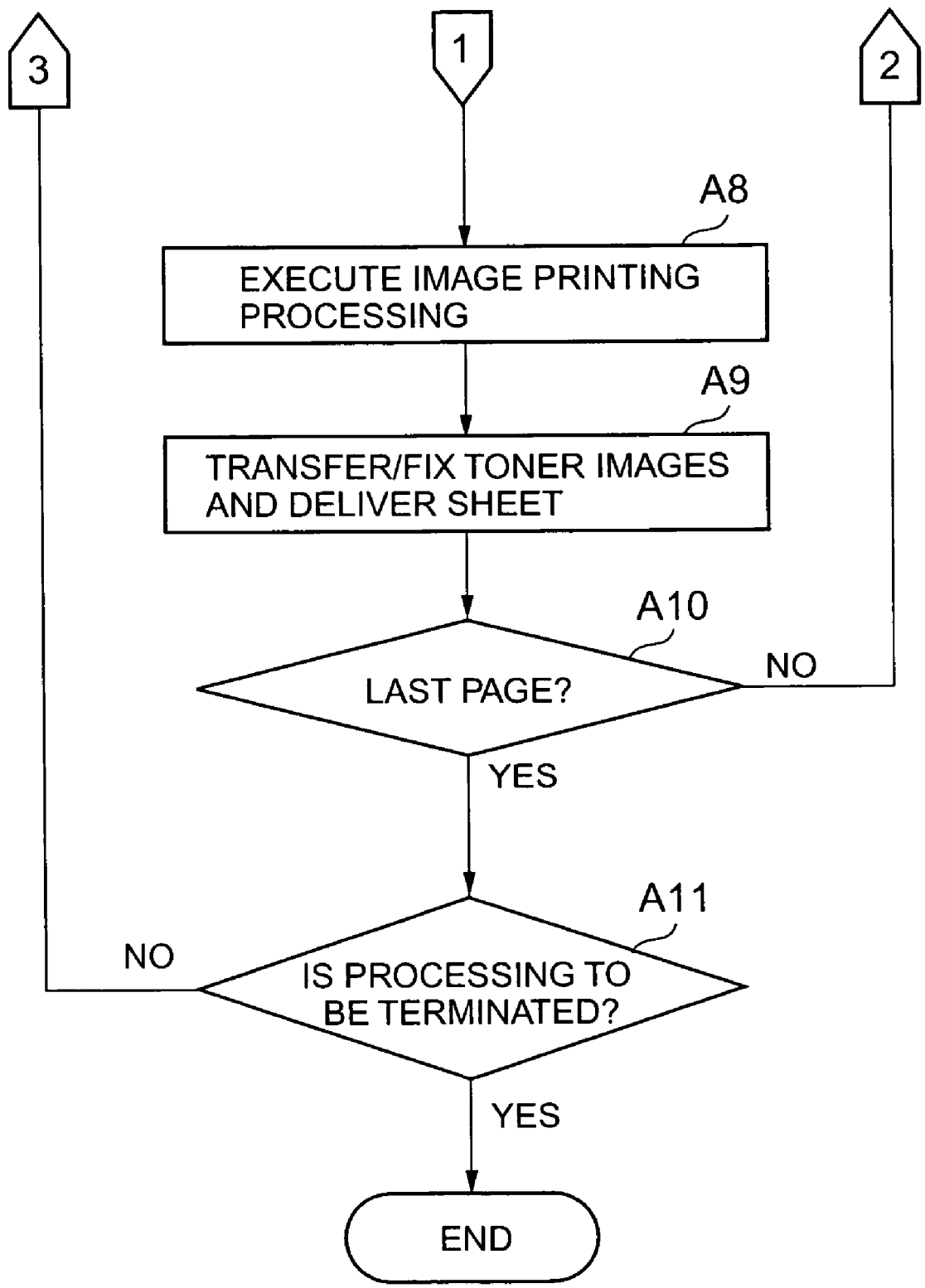
Figure 10:
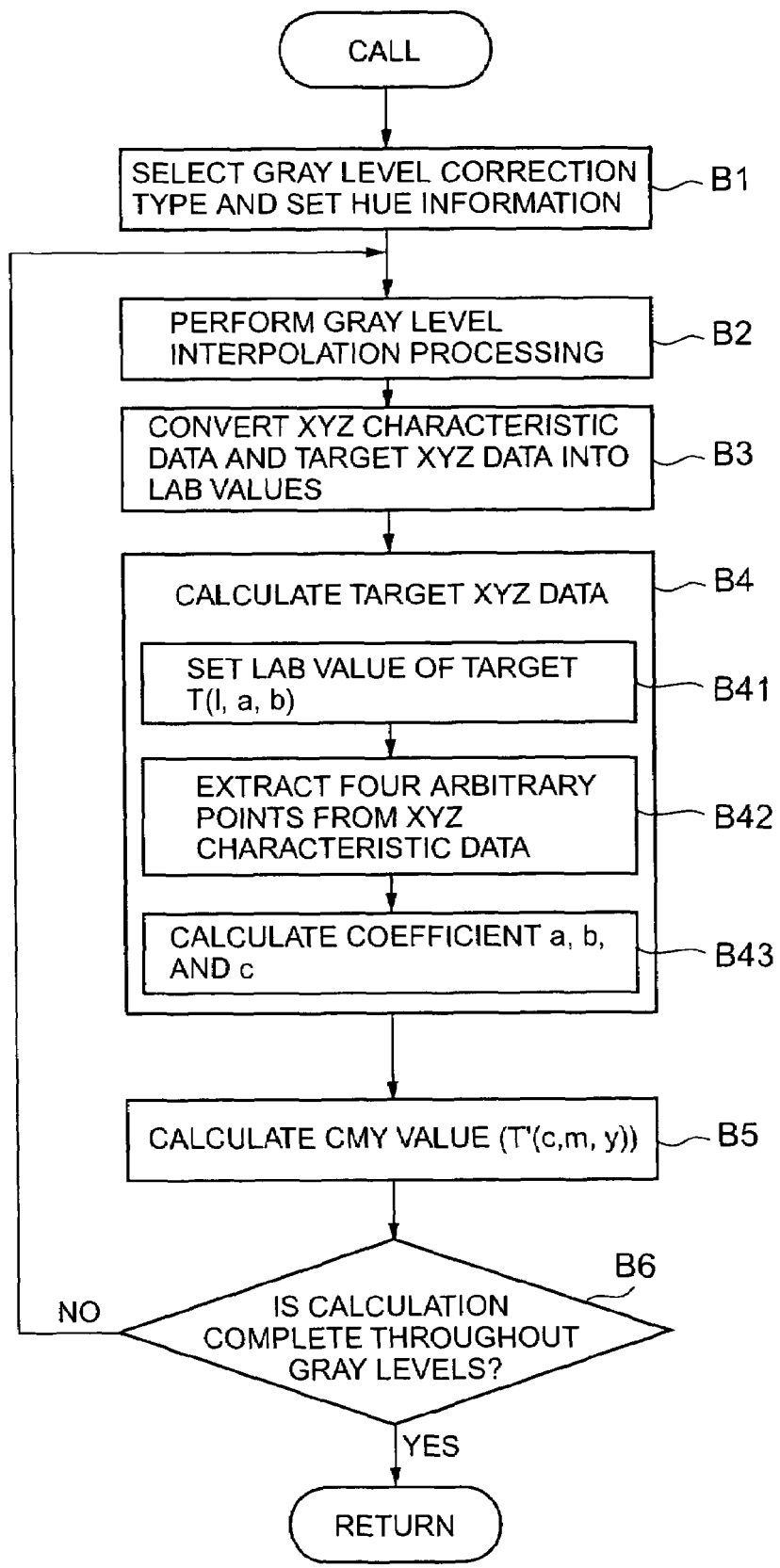
FIG. 10 is a flowchart (subroutine) showing a sequence for generating a gray level correction table in the embodiment shown in FIG. 3.

FIGS. 9-1 and 9-2 are flowcharts (main routine) showing examples of image forming operation (first and second examples) in the color printer 100. FIG. 10 is a flowchart (subroutine) showing an example of how a gray level correction table is generated in the printer 100.

In this embodiment, on the assumption that color images are printed by superimposing colors on the basis of arbitrary image data Dy, Dm, Dc, and Dk, the printer 100 incorporates the colorimetric unit 12, a plurality of reference patches PR with different gray levels are generated on the intermediate transfer belt 6 by combining C, M, Y, and K colors through the photosensitive drums 1Y, 1M, 1C, and 1K, and the colors of the reference patches PR are measured, thereby performing desired gray level correction (color correction mode).

This example exemplifies a case wherein when toner, the photosensitive drum 1Y, 1M, 1C, or 1K, or the like which is a consumable is replaced, the above color correction mode is executed, and the color correction mode then changes to the normal operation mode. It is assumed that "grayscale-characteristic-oriented" is selected with regard to a gray level correction table. In the normal operation mode, for example, 8-bit image data Dy, Dm, Dc, and Dk are input from an external device.

Under these conditions as image forming conditions, reference patches PR based on reference image data Dy', Dm', Dc', and Dk' for color correction are formed on the intermediate transfer belt 6 through the photosensitive drums 1Y, 1M, 1C, and 1K in step A1 in the flowchart of FIG. 9-1. For the reference image data Dy', Dm', and Dc', the patch table (slew gray level value y) shown in FIG. 6 is looked up. At this time, the image forming unit 10Y supplies the image structure signal Sy based on the color correction reference image data Dy' to the laser writing unit 3Y. The remaining image forming units 10M, 10C, and 10K supply the image structure signals Sm, Sc, and Sk based on the color correction reference image data Dm', Dc', and Dk' to the laser writing units 3M, 3C, and 3K.

In the units 3Y, 3M, 3C, and 3K, electrostatic latent images for reference patches are formed on the respective photosensitive drums 1y, 1M, 1C, and 1K. These electrostatic latent images are developed by the developing units 4Y, 4M, 4C, and 4K. In this case, reversal development is performed by applying a developing bias which is obtained by superimposing an AC voltage on a DC voltage having the same polarity (negative polarity in this embodiment) as that of toner to be used.

The image forming unit 10Y prints a Y color toner image serving as a reference patch PR. The image forming unit 10M prints an M color toner image serving as a reference patch PR. The image forming unit 10C prints a C color toner image serving as a reference patch PR. The image forming unit 10K prints a BK color toner image serving as a reference patch PR. The toner images as reference patches formed on the photosensitive drums 1Y, 1M, 1C, and 1K are transferred onto the intermediate transfer belt 6 (primary transfer). With this operation, reference patches PR like those shown in FIG. 5 can be formed on the intermediate transfer belt 6. Note that in the color correction mode, no color image is actually printed on the image recording sheet P.

The 125 colors based on the reference patches PR formed on the intermediate transfer belt 6 are measured by the colorimetric unit 12 to acquire the color measurement signal S1 in step A2. The color measurement signal S1 is, for example, A/D-converted by the control unit 15 to become XYZ characteristic data (patch data) for the printer 100. The XYZ characteristic data is transferred to the image processing unit 60.

In step A3, the processor 61 for image processing calculates the gray level correction value Y on the basis of the XYZ characteristic data associated with the reference patches PR and generates a gray level correction table. In this case, before the calculation of the gray level correction value Y is performed, the subroutine shown in FIG. 10 is called, and the user selects a gray level correction type and sets color information by using the operation setting unit 14a in step B1 in the flowchart. For example, the user selects one of color temperature D65, color temperature D50, color temperatures A, B, C, . . . , custom gray, or the like from the gray level correction types, and sets a gray value (hue information) in the printer 100 (see FIG. 7).

With regard to the selected gray level correction type, the processor 61 linearly interpolates gray levels between the X, Y, and Z values of the whitest portion and the XYZ value of the darkest portion in the gray level correction table in step B2. The gray level correction value Y obtained by the gray level interpolation processing is used as target XYZ data for reproducing the color of a target.

In step B3, the processor 61 converts the XYZ characteristic data of the printer 100 and the target XYZ data at the time of reproduction of the target color into LAB values (chromatic data) in the L*a*b* coordinate system (color solid coordinate system) by using the preset XYZ values (to be referred to as Xn, Yn, and Zn hereinafter) of the image recording sheet according to equations (1) given above, and uses the LAB values after conversion as the 125-color XYZ characteristic data of the printer 100 and 256-gray-level target XYZ data.

The flow then shifts to step B4, in which the processor 61 calculates target XYZ data in the CMY color coordinate system. At this time, as shown in FIG. 8A, in order to reproduce the color of the target, the processor 61 retrieves a reference patch PR in the printer color printer 100. In this case, before retrieval of a reference patch PR, the LAB value of a target T(1, a, b) to be retrieved in step B41 is set in the processor 61 from the target gray level calculated by equations (1).

In step B42, four arbitrary points are extracted from the XYZ characteristic data of the 125-color color printer 100. The color coordinate positions of these four points are represented by PT1, PT2, PT3, and PT4, the respective LAB values are represented by PT1(1, a, b), PT2(1, a, b), PT3(1, a, b), and PT4(1, a, b), and the coefficients are represented by a, b, and c. In this case, this color coordinate positional relationship is expressed by the three-dimensional vector indicated by equation (2).

The processor 61 computes the coefficients a, b, and c in the three-dimensional vector in step B43. Since the conditions for a, b, and c are given by inequalities (3), when the conditions are satisfied, it is known that the target T exists in the tetrahedral defined by the color coordinate positions PT1, PT2, PT3, and PT4 shown within the broken-like circle in FIG. 8B in the CMY coordinate system shown in FIG. 8A.

When conditional inequalities (3) are satisfied, the flow shifts to step B5, in which the processor 61 computes the CMY value (T'(c, m, y)) for reproducing the target T. The color coordinate positions PT1'(c, m, y), PT2'(c, m, y), PT3' (c, m, y), and PT4'(c, m, y) obtained here are CMY values in a patch table in the CMY color coordinate system shown in FIG. 7.

It is checked in step B6 whether the above computation is executed for all the gray levels (256 gray levels). If NO in step B6, the flow returns to step B2 to repeat the above processing. This makes it possible to obtain 256-gray-level CMY values for reproducing the LAB values of the target T and generate gray level correction tables for the respective colors, i.e., C color, M color, and Y color.

The gray level correction tables generated for the respective colors are set in the memories 62Y, 62M, 62C, and 62K shown in FIG. 4 under the data set control of the control unit 15. At this time, the control unit 15 sets the Y color gray level correction table in the memory 62Y. The M color gray level correction table is set in the memory 62M. The C color gray level correction table is set in the memory 62C. The BK color gray level correction table is set in the memory 62K. These gray level correction tables may be stored in a nonvolatile memory such as an HDD instead of the memories 62Y, 62M, 62C, and 62K. This makes it possible to increase the number of optical items in the next gray level correction method.

The flow returns to the flowchart shown in FIG. 9-1, and the color correction mode changes to the normal operation mode. In step A4, the control unit 15 waits for an image print request. In the normal operation mode, for example, the image data Dy, Dm, Dc, and Dk filed on a page basis are input. An end flag is added to the last page. Whether an image print request is input is determined by, for example, detecting the input of the image data Dy, Dm, Dc, and Dk.

If an image print request is input, the flow shifts to step A5 to accept the selection of a gray level correction method. A gray level correction method is set on the gray level correction method selection window P2 shown in FIG. 22A. In this case, the user selects, for example, "grayscale-characteristic-oriented". The flow then advances to step A6 to correct the image data Dy, Dm, Dc, and Dk in the normal operation mode. In this case, the image data Dy, Dm, Dc, and Dk are subjected to Y conversion processing on the basis of the gray level correction tables generated and prepared in advance in the color correction mode. When a color image is formed by using the corrected image data Dy, Dm, Dc, and Dk, the LAB value of gray obtained by superimposing C color, M color, and Y color on the intermediate transfer belt 6 becomes equal to the value set on the gray level correction method selection window P2.

The image processing unit 60 generates an image structure of a color image in the normal operation mode on the basis of the corrected image data Dy, Dm, Dc, and Dk in step A7. At this time, the Y color image structure generating matrix unit 63Y generates the Y color image structure signal Sy on the basis of the corrected image data Dy which has undergone Y conversion processing in the memory 62Y. The image structure signal Sy is output from the image structure generating matrix unit 63Y to the laser writing unit 3Y.

The M color image structure generating matrix unit 63M generates the M color image structure signal Sm on the basis of the corrected image data Dm which has undergone Y conversion processing in the memory 62M. The image structure signal Sm is output from the image structure generating matrix unit 63M to the laser writing unit 3M. The C color image structure generating matrix unit 63C generates the C color image structure signal Sc on the basis of the corrected image data Dc which has undergone Y conversion processing in the memory 62C. The image structure signal Sc is output from the image structure generating matrix unit 63C to the laser writing unit 3C. The BK color image structure generating matrix unit 63K generates the BK color image structure signal Sk on the basis of the corrected image data Dk which has undergone Y conversion processing in the memory 62K. The image structure signal Sk is output from the image structure generating matrix unit 63K to the laser writing unit 3K.

The flow then shifts to step A8 in the flowchart shown in FIG. 9-2 to execute image forming processing based on the normal operation mode. The control unit 15 performs paper feed control. For example, the image recording sheets P stored in the paper feed cassettes 20A, 20B, and 20C shown in FIG. 3 are fed by the pickup rollers 21 and feed rollers 22A and conveyed to the secondary transfer roller 7A via the convey rollers 22B, 22C, and 22D, the registration rollers 23, and the like.

Meanwhile, in the image forming unit 10Y, the laser writing unit 3Y forms a Y color image associated with Y color on the intermediate transfer belt 6 through the photosensitive drum 1Y on the basis of the corrected image structure signal Sy. For example, the laser writing unit 3Y forms an electrostatic latent image on the photosensitive drum 1Y on the basis of the normal operation mode. This electrostatic latent image is developed by the developing unit 4Y. In this case, reversal development is performed by applying a developing bias which is obtained by superimposing an AC voltage on a DC voltage having the same polarity (negative polarity) as that of toner to be used.

Likewise, the laser writing units 3M, 3C, and 3K form color images obtained by superimposing C, M, Y, and K colors, based on the normal operation mode, on the intermediate transfer belt 6 through the photosensitive drums 1M, 1C, and 1K on the basis of the corrected image structure signals Sm, Sc, and Sk. As a result, the image forming unit 10M prints an M color toner image in the normal operation mode. The image forming unit 10C prints a C color toner image in the normal operation mode. The image forming unit 10K prints a BK color toner image. The color toner images formed on the photosensitive drums 1Y, 1M, 1C, and 1K are transferred as reference patches PR onto the intermediate transfer belt 6 (primary transfer).

In step A9, the color toner images are transferred and fixed on a predetermined image recording sheet P, and the sheet is delivered. At this time, the color images formed on the intermediate transfer belt 6 are transferred in block onto one surface of the image recording sheet P (secondary transfer). The image recording sheet P onto which the color images are transferred is subjected to fixing processing by the fixing device 17, and is clamped between the delivery rollers 24 to be placed on the delivery tray 25 located outside the apparatus. The transfer residual toner on the outer surfaces of the photosensitive drums 1Y, 1M, 1C, and 1K after the transfer is cleaned by the cleaning units 8Y, 8M, 8C, and 8K, and the next image forming cycle is started.

In step A10, the control unit 15 determines whether the printing operation is complete. Whether printing operation is complete is determined by making the CPU 53 check whether the last page is printed. Whether a given page is the last page is determined by making the CPU 53 detect an end flag. If the last page is not printed, the flow returns to step A6 in the flowchart of FIG. 9-1 to continue image data correction processing.

If the last page is printed, the flow shifts to step A11 to check whether or not to terminate the image forming processing. For example, when power-off information is detected, the image forming processing is terminated. If no power-off information is detected, the flow returns to step A4 to wait for an image print request.

As described above, according to the color printer and image forming method according to an embodiment of the present invention, when a color image is to be printed by superimposing colors on the basis of arbitrary image data Dy, Dm, Dc, and Dk, the printer 100 incorporates the colorimetric unit 12, and forms a plurality of reference patches PR with different gray levels by combining C, M, Y, and K colors on the intermediate transfer belt 6 through the photosensitive drums 1Y, 1M, 1C, and 1K. The colors of the reference patches PR are then measured, and desired gray level correction is performed. Since gray level correction tables are generated on the basis of this assumption, the control unit 15 corrects the image data Dy, Dm, Dc, and Dk on the basis of the gray level correction tables generated by the processor 61, and controls the image forming units 10Y, 10M, 10C, and 10K so as to form color images on the photosensitive drums 1Y, 1M, 1C, and 1K on the basis of the corrected image data Dy, Dm, Dc, and Dk.

Since the tone of gray can be optimally adjusted, arbitrary color images with optical hues can be formed on the photosensitive drums 1Y, 1M, 1C, and 1K on the basis of the hue-adjusted image data Dy, Dm, Dc, and Dk. Even if, therefore, toner, a photosensitive drum 1Y, 1M, 1C, or 1K, or the like which is a consumable is replaced and the image forming environment before the replacement of the consumable changes, color images with excellent gray balance can be printed by using the arbitrary image data Dy, Dm, Dc, and Dk corrected on the basis of the gray level correction tables.

The above embodiment has exemplified the case wherein three-dimensional data such as LAB values and XYZ values are handled in association with the color coordinate system. However, the present invention is not limited to this, and gray level correction can be executed in consideration of hue even by using Lch values associated with an LCH color coordinate system.

In addition, in the above case, the image data Dy, Dm, Dc, and Dk are externally input from an external device or the like. However, the present invention is not limited to this, and can also be applied to a case wherein an RGB signal associated with a digital color image is received from a scanner or the like which can be mounted as an option in the color printer 100, and the signal is color-converted to print a color image based on a KCMY signal.

Second Gray Level Correction Process:

In the second gray level correction process, a gray level correction table is generated for each image structure on the basis of density detection information, and on the basis of a gray level correction table for one image structure, a gray level correction table for another image structure is generated.

Figure 11:
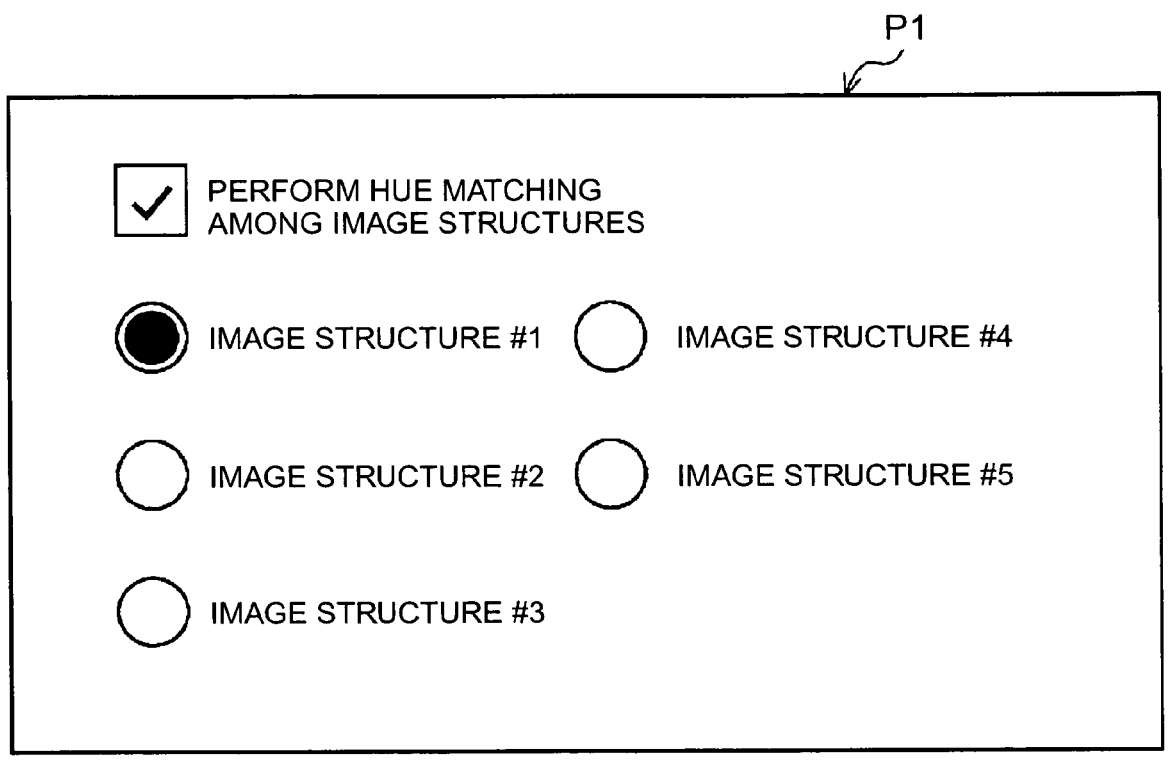
FIG. 11 is a view showing a display example of an image structure selection window in the embodiment shown in FIG. 3.

FIG. 11 is a view showing a display example of the image structure selection window P1 of the printer 100. The image structure selection window P1 shown in FIG. 11 is displayed on the display unit 18 of the operation panel 48. In the image structure selection window P1, the message "perform hue matching among image structures" is displayed. A rectangular space is provided in the start area of this display area. The five optional items "image structure #1", "image structure #2", "image structure #3", "image structure #4", and "image structure #5" are provided below this display area, with circular spaces for check marks being provided in the start areas of the respective pieces of character information.

In this example, on the image structure selection window P1, image structure #i is selected from the five optional items. With regard to image structure #i in the printer 100, the user performs operation to check "perform hue matching among image structures" and optical items such as "image structure #1" to "image structure #5". When, for example, "perform hue matching among image structures" is to be set and "image structure #1" is to be selected, the user makes a check mark in the rectangular space in the start area of "perform hue matching among image structures" and clicks the circular space in the start area of "image structure #1" by using the cursor function of the operation selection unit 14b.

Each image structure #i in the printer 100 will be described next with reference to FIGS. 12A to 12D, 13A to 13D, 14A to 14D, and 15A to 15D. FIGS. 12A to 12D are views showing an example of a small line screen of each of Y, M, C, and BK colors which is associated with image structure #1.

Figure 12A:
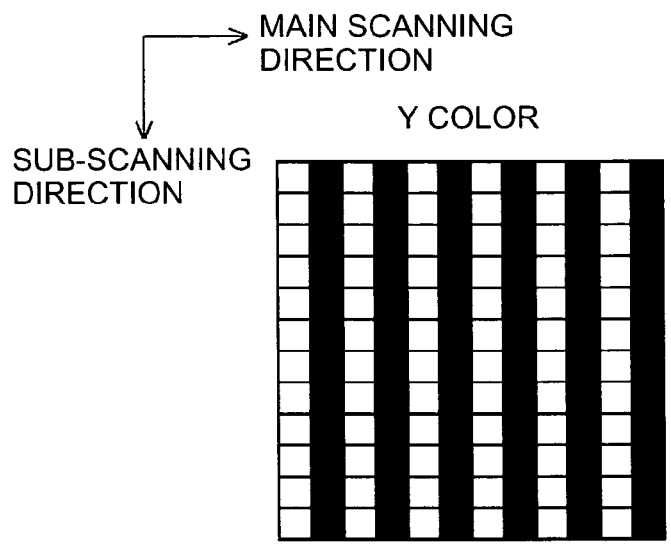
FIGS. 12A to 12D are views showing examples of small line screens of the respective colors Y, M, C, and BK according to image structure #1.
Figure 12B:
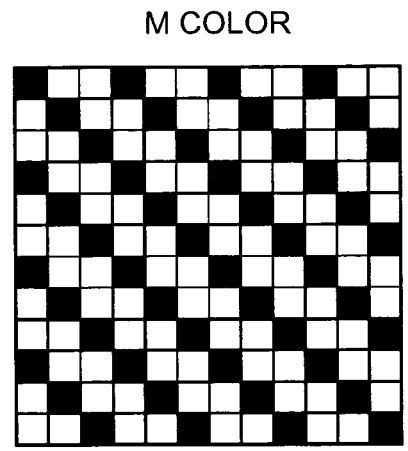

As shown in FIG. 12A, in this example, the Y color small line screen is produced by assigning six thin lines (black filled-in portions; small lines) to a matrix (12 rows×12 columns) comprised of 12 dots in the main scanning direction and 12 dots in the sub-scanning direction. The respective thin lines are arranged at 1-dot intervals in the main scanning direction, and each thin line is comprised of row×column=1 dot×12 dots. The M color small line screen is produced by assigning to a similar matrix seven oblique lines slanting to the right (black filled-in portions; small lines), as shown in FIG. 12B. There are held 2-dot intervals in the main scanning direction and 2-dot intervals in the sub-scanning direction between the respective oblique lines.

Figure 12C:
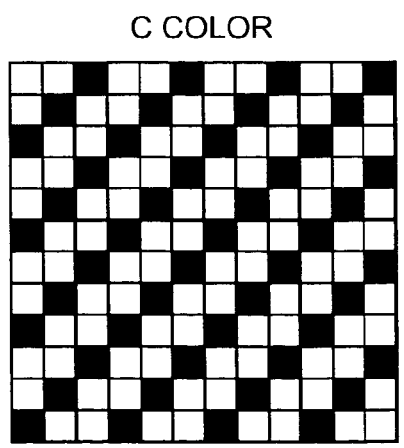
Figure 12D:
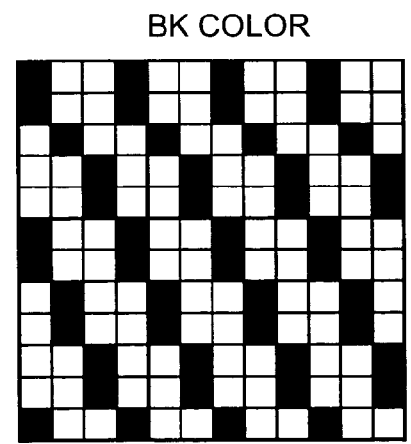

The C color small line screen is produced symmetrically to the M color small line screen. For example, the C color small line screen is produced by assigning to a similar matrix seven oblique lines slanting to the left (black filled-in portions; small lines), as shown in FIG. 12C. There are held 2-dot intervals in the main scanning direction and 2-dot intervals in the sub-scanning direction between the respective oblique lines as in the case of the M color small line screen. The BK color small line screen is produced by assigning to a similar matrix dotted lines (small lines), filled in black every three dots in the main scanning direction, and dotted lines (small lines), filled in black every four or five dots in the sub-scanning direction.

Image structure #1 described above provides a high resolution because the matrix size of each small line is small. With image structure #1, in a highlight portion, since the data amount is small, a toner member does not stably adhere, resulting in poor grayscale characteristics. Since the matrix size is small, the overall grayscale characteristics become poor. Since each small line screen is arranged on periodic lines, a sense of noise is small. In addition, with image structure #1, when colors overlap, moiré is caused.

FIGS. 13A to 13D are views showing an example of a big line screen of each of Y, M, C, and BK colors which is associated with image structure #2.

Figure 13A:
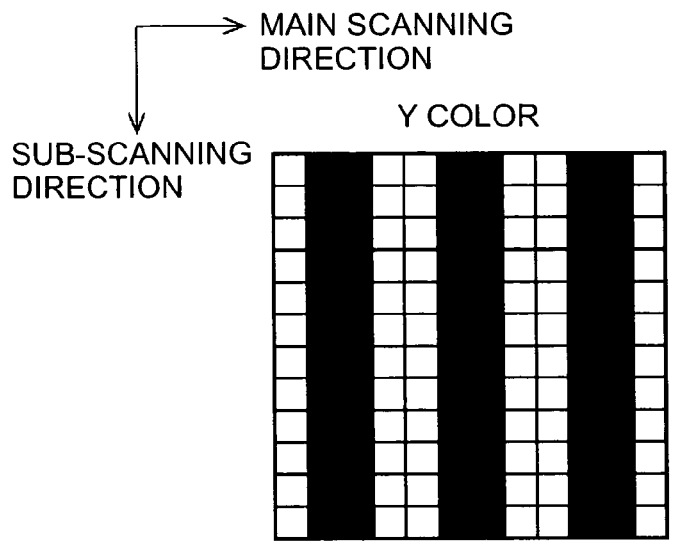
FIGS. 13A to 13D are views showing examples of big line screens of the respective colors Y, M, C, and BK according to image structure #2.
Figure 13B:
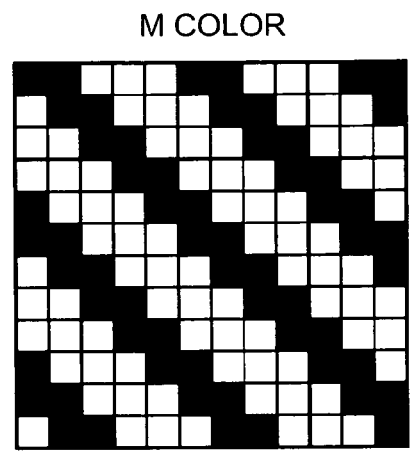

As shown in FIG. 13A, in this example, the Y color big line screen is produced by assigning three thick lines (2-dot black filled-in portions; big lines) to a matrix (12 rows×12 columns) comprised of 12 dots in the main scanning direction and 12 dots in the sub-scanning direction. The respective thick lines are arranged at 2-dot intervals in the main scanning direction, and each thick line is comprised of row×column=2 dot×12 dots. The M color big line screen is produced by assigning to a similar matrix five oblique lines slanting to the right (2-dot black filled-in portions; big lines), as shown in FIG. 13B. There are held 3-dot intervals in the main scanning direction and 3-dot intervals in the sub-scanning direction between the respective oblique lines.

Figure 13C:
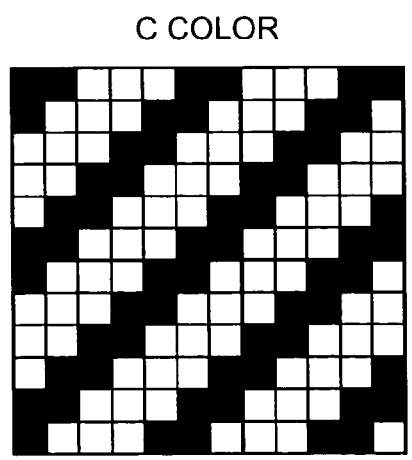
Figure 13D:
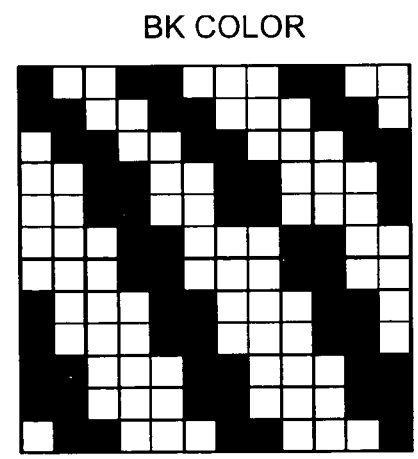

The C color big line screen is produced symmetrically to the M color big line screen. For example, the C color big line screen is produced by assigning to a similar matrix five oblique lines slanting to the left (2-dot black filled-in portions; big lines), as shown in FIG. 13C. There are held 3-dot intervals in the main scanning direction and 3-dot intervals in the sub-scanning direction between the respective oblique lines as in the case of the M color big line screen.

The BK color big line screen is produced by assigning to a similar matrix dotted lines (big lines), filled in black every three or four dots in the main scanning direction, and dotted lines (big lines), filled in black every four or five dots in the sub-scanning direction.

Image structure #2 described above provides a low resolution because the matrix size of each big line is big. With image structure #2, in a highlight portion, since the data amount is big, a toner member does not stably adhere, resulting in poor grayscale characteristics. Since the matrix size is big, the overall grayscale characteristics are good. Since each big line screen is arranged on periodic lines, a sense of noise is small. When colors overlap, moiré tends to occur.

FIGS. 14A to 14D are views showing an example of a small dot screen of each of Y, M, C, and BK colors which is associated with image structure #3.

Figure 14A:
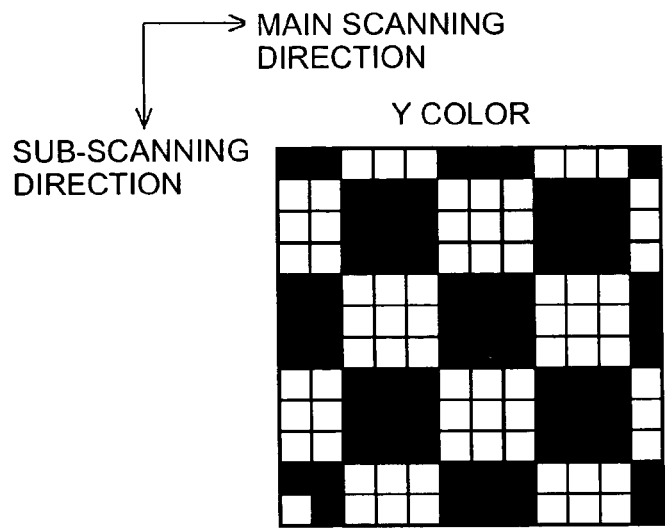
FIGS. 14A to 14D are views showing examples of small dot screens of the respective colors Y, M, C, and BK according to image structure #3.
Figure 14B:
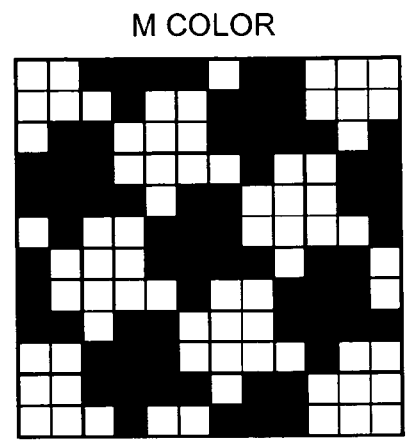

As shown in FIG. 14A, in this example, the Y color small dot screen is produced by assigning five small dot patterns (black filled-in portions; small dots) to a matrix (12 rows×12 columns) comprised of 12 dots in the main scanning direction and 12 dots in the sub-scanning direction. The respective small dots are arranged at 3-dot intervals in the main scanning direction, and each small dot is comprised of row×column=3 dot×3 dots. The M color small dot screen is produced by assigning to a similar matrix five deformed cruciform patterns (black filled-in portions; small dots), as shown in FIG. 14B. There are held 1-dot to 4-dot intervals in the main scanning direction and 1-dot to 4-dot intervals in the sub-scanning direction between the respective patterns, and every one to four dots are filled in black in the main scanning direction and every one to four dots are filled in black in the sub-scanning direction.

Figure 14C:
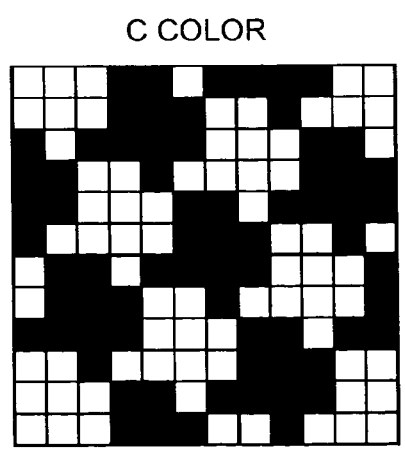
Figure 14D:
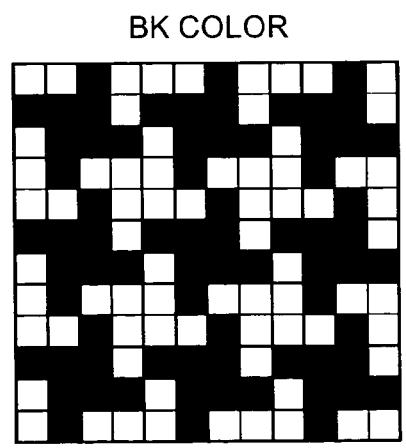

The C color small dot screen is produced symmetrically to the M color small dot screen. For example, the C color small dot screen is produced by assigning to a similar matrix five deformed cruciform patterns (black filled-in portions; small dots), as shown in FIG. 14C. There are held 1-dot to 4-dot intervals in the main scanning direction and 1-dot to 4-dot intervals in the sub-scanning direction between the respective patterns, and every one to four dots are filled in black in the main scanning direction and every one to four dots are filled in black in the sub-scanning direction.

The BK color small dot screen is produced by assigning to a similar matrix nine deformed cruciform patterns (black filled-in portions; small dots), filled in black every two to four dots in the main scanning direction and sub-scanning direction.

Image structure #3 described above provides a high resolution because the matrix size of each small dot is small. With image structure #3, since a toner member grows in the form of dots, the highlight grayscale characteristics become relatively stable. Since the matrix size of a small dot screen is small, the overall grayscale characteristics become poor. With image structure #3, since small dots are arranged on periodic dots, a sense of noise is small. When colors overlap, however, moiré tends to occur.

FIGS. 15A to 15D are views showing an example of a big dot screen of each of Y, M, C, and BK colors which is associated with image structure #4.

Figure 15A:
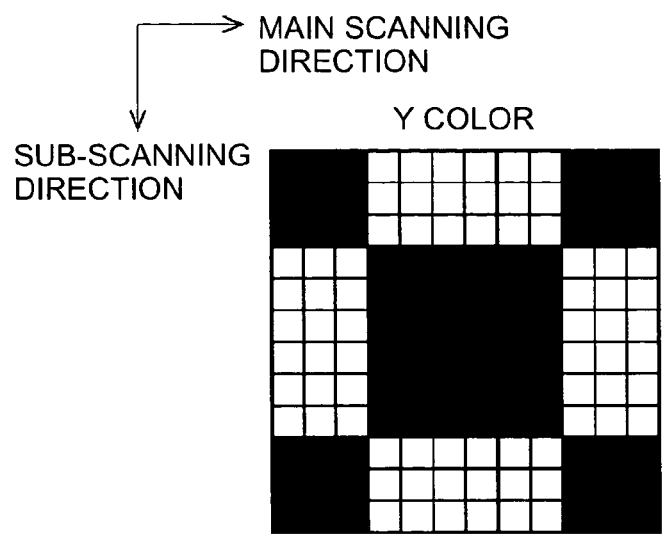
FIGS. 15A to 15D are views showing examples of big dot screens of the respective colors Y, M, C, and BK according to image structure #4.

As shown in FIG. 15A, in this example, the Y color big dot screen is produced by assigning one big dot pattern (a black filled-in portion; a big dot) to a matrix (12 rows×12 columns) comprised of 12 dots in the main scanning direction and 12 dots in the sub-scanning direction. The respective big dot patterns are arranged at 6-dot intervals in the main scanning direction and sub-scanning direction, and each big dot pattern is produced by filling row×column=6 dots×6 dots in black.

Figure 15B:
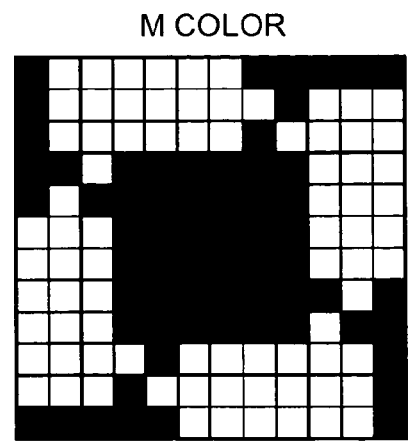

As shown in FIG. 15B, the M color big dot screen is produced by assigning to a similar matrix a big dot pattern with projecting dots (a black filled-in portion; a big dot) having 1-dot projecting dots in the main scanning direction and sub-scanning direction unlike the Y color big dot screen. There are held 6-dot or 7-dot intervals in the main scanning direction and 1-dot to 6-dot intervals in the sub-scanning direction between the respective big dot patterns.

Figure 15C:
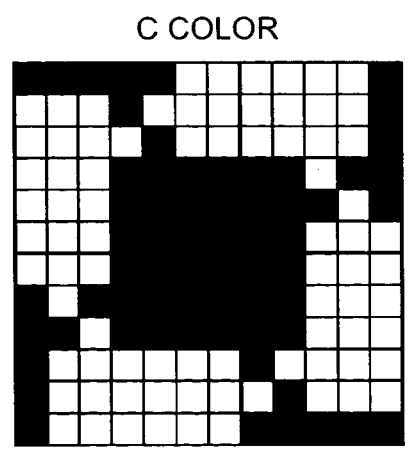

The C color big dot screen is produced symmetrically to the M color big dot screen. For example, as shown in FIG. 15C, the C color big dot screen is produced by assigning to a similar matrix a big dot pattern with projecting dots (a black filled-in portion; a big dot) having 1-dot projecting dots in the main scanning direction and sub-scanning direction unlike the Y color big dot screen. There are held 6-dot or 7-dot intervals in the main scanning direction and 1-dot to 6-dot intervals in the sub-scanning direction between the respective big dot patterns.

Figure 15D:
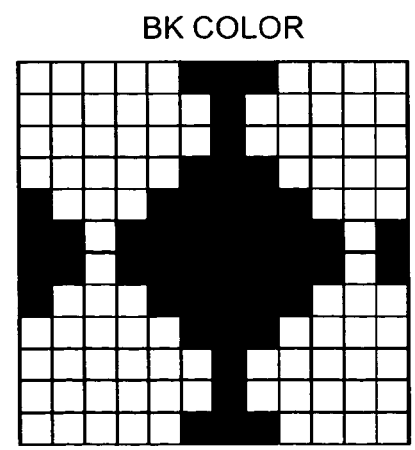

As shown in FIG. 15D, the BK color big dot screen is produced by assigning to a similar matrix a Φ-shaped pattern (a big dot) obtained by filling every second to ninth dots in black in the main scanning direction and continuously filling every one to 12 dots in black in the sub-scanning direction.

Image structure #4 described above provides a low resolution because the matrix size of each big dot is large. With image structure #4, since a toner member grows in the form of dots, the grayscale characteristics at highlight become relatively stable. Since the matrix size is large, the overall grayscale characteristics are good. Since big dot patterns are arranged on periodic dots, a sense of noise is small. With image structure #4, when colors overlap, moiré tends to occur.

In this example, with regard to error diffusion associated with image structure #5, X values are commonly set for the respective colors Y, M, C, and BK. For example, in association with error values set for the first to 12th dots, the X values include ⁷⁄₄₈, ⁵⁄₄₈, ³⁄₄₈, ⁵⁄₄₈, ⁷⁄₄₈, ⁵⁄₄₈, ³⁄₄₈, ¹⁄₄₈, ³⁄₄₈, ⁵⁄₄₈, ³⁄₄₈, ¹⁄₄₈, and the like. Image structure #5 described above provides a high resolution owing to error diffusion. Since a toner member is printed in dots, the overall grayscale characteristics are good. With image structure #5, although a sense of noise is left, no moiré occurs.

FIG. 16 is a view showing an example of how reference patches PR for color correction are formed. In this example, the reference patches PR for color correction are comprised of reference patches PR of four colors based on C color, M color, Y color, and BK color. This makes it possible to adjust the hues of reproduced colors associated with four colors C, M, Y, and K.

For example, Y color reference patches PR like those shown in FIG. 16 are formed when the gray level correction mode is executed. The CPU 53 shown in FIG. 4 controls the image forming unit 10Y to form Y color reference patches PR on the intermediate transfer belt 6. In this example, Y color rectangular reference patches PR for color correction are formed in the sub-scanning direction which is the moving direction of the intermediate transfer belt 6. A plurality of Y color reference patches PR are formed in correspondence with gray level values 0, 30, 60, 90, . . . , 255.

Although not shown, the CPU 53 controls the image forming unit 10M to form M color reference patches PR with gray levels 0 to 255 on the intermediate transfer belt 6, following the Y color reference patches PR. Likewise, the CPU 53 controls the image forming unit 10C to form C color reference patches PR with gray levels 0 to 255 on the intermediate transfer belt 6. Likewise, the CPU 53 controls the image forming unit 10K to form BK color reference patches PR with gray levels 0 to 255 on the intermediate transfer belt 6.

These reference patches PR for color correction are detected by the colorimetric unit 12, and the grayscale characteristic data of the reference patches PR of the respective colors are calculated, thereby controlling the image forming units 10Y, 10M, 10C, and 10K so as to adjust grays (colors). This control is executed to allow the image forming system after the execution of the gray level correction mode to superimpose color images based on arbitrary image data Dy, Dm, Dc, and Dk with good color reproducibility.

The following is an example of how the processor 61 is controlled by the control unit 15 when an image structure is to be selected.

Figure 17A:
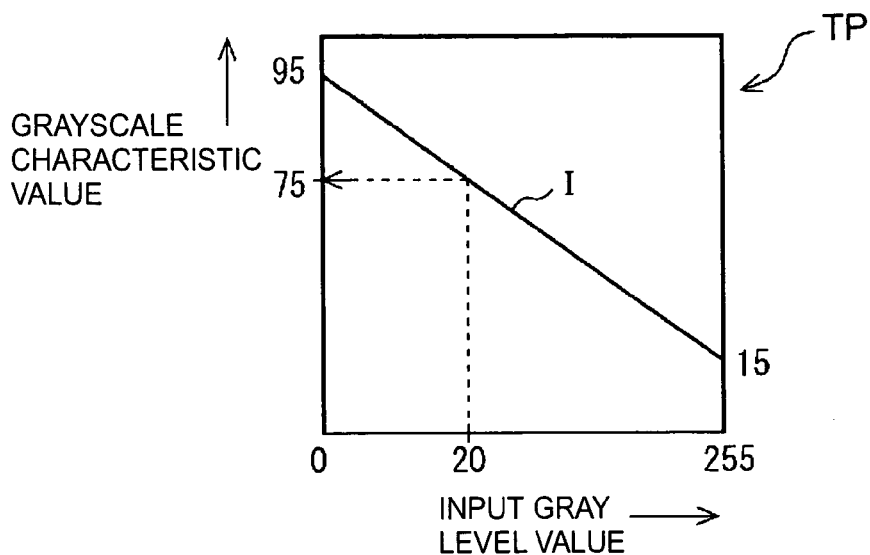
FIGS. 17A to 17C are graphs showing examples of the arrangements of a target table TP, grayscale characteristic table TQ, and gray level correction table TR in a processor 61.
Figure 17B:
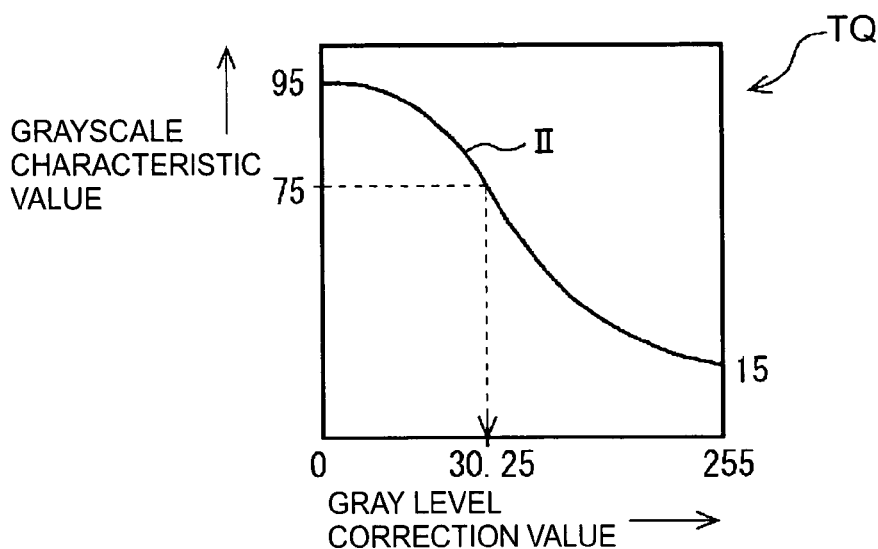
Figure 17C:
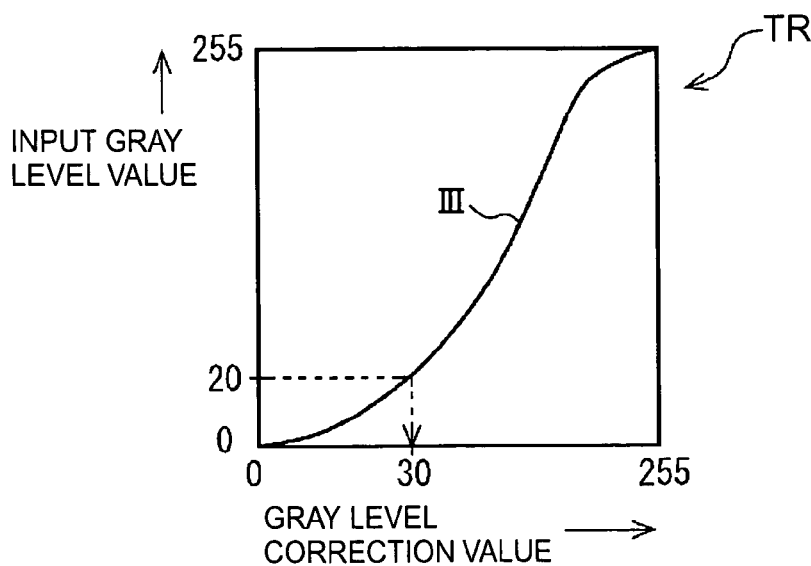

FIGS. 17A to 17C are views showing an example of calculation in the processor 61 for image processing.

FIG. 17A is a graph showing the characteristics of a target table TP of image structure #i. Referring to FIG. 17A, the ordinate represents the grayscale characteristic value (100% display) of a target; and the abscissa, input gray level values 0 to 255 based on the color detection data D1. A solid line I in FIG. 17A is a characteristic straight line for linearly interpolating grayscale characteristic values. This is for linear interpolation of gray levels between the whitest portion and the darkest portion in the gray level correction table TR of image structure #i.

This example shows that when the grayscale characteristic values of the whitest portion and darkest portion in the gray level correction table TR of image structure #i are 95% and 15%, respectively, and the input gray level value based on the color detection data D1 of the target is "20", the grayscale characteristic value of the target is 75%. The grayscale characteristic value of the target is obtained along the direction of the dotted line arrow plotted from the input gray level value "20" based on the color detection data D1 as a start point.

FIG. 17B is a graph showing the characteristics of a grayscale characteristic table TQ of image structure #i. Referring to FIG. 17B, the ordinate represents the grayscale characteristic value (100% display) of a target; and the abscissa, the gray level correction value after Y correction. A solid line II in FIG. 17B is a Y characteristic curve for interpolating grayscale characteristic values. This is for optimal interpolation of gray levels between the whitest portion and the darkest portion in the gray level correction table TR.

This example shows that when the grayscale characteristic values of the whitest portion and darkest portion in the gray level correction table TR are 95% and 15%, respectively, and the grayscale characteristic value of the target is "75%", the gray level correction value for the target is 30.25. The gray level correction value for the target is obtained along the direction of the dotted line arrow plotted from the grayscale characteristic value "75%" as a start point. Since the gray level correction value "30.25" is used to reproduce an 8-bit color, the value is rounded to "30".

FIG. 17C is a graph showing a gray level correction table TR of image structure #i. Referring to FIG. 17C, the ordinate represents the input gray level value based on the color detection data D1 in image structure #i; and the abscissa, the gray level correction value (output gray level value) for the target in image structure #i after Y correction. This shows that in the gray level correction table TR, when the input gray level value based on the color detection data D1 of the target in image structure #i is "20", the gray level correction value for the target is "30". The gray level correction values for other targets are obtained in the same manner. A solid line III in FIG. 17C is a Y correction curve for interpolating an input gray value based on the color detection data D1 in image structure #i calculated in this manner. With the gray level correction table TR, gray levels between the whitest portion and the darkest portion in a color image in image structure #i can be optimally interpolated.

In this example, the control unit 15 shown in FIG. 4 controls the processor 61 for image processing and the image forming units 10Y, 10M, 10C, and 10K to produce a grayscale characteristic table TQ of image structure #i shown in FIG. 17B and a gray level correction table TR.

For example, when a gray level correction table TR of image structure #2 is to be produced with reference to image structure #1, a gray level correction table TR of image structure #1 is generated first. In this case, the control unit 15 controls the image forming units 10Y, 10M, 10C, and 10K to form a plurality of reference patches PR with image structure #1 and different densities on the intermediate transfer belt 6 through the photosensitive drums 1Y, 1M, 1C, and 1K, and controls the colorimetric unit 12 to detect the densities of the reference patches PR formed by the image forming units 10Y, 10M, 10C, and 10 K.

In this example, the image forming units 10Y, 10M, 10C, and 10K and colorimetric unit 12 constitute a gray level detection acquisition unit, which forms a plurality of reference patches with image structure #1 and different densities on the intermediate transfer belt 6 (photosensitive drum) through the photosensitive drums 1Y, 1M, 1C, and 1K in the printer, and detects the densities of the reference patches formed on the intermediate transfer belt 6, thereby obtaining color detection data (input gray level values) D1 of image structure #1.

The control unit 15 acquires the color detection data D1 detected by the colorimetric unit 12, and controls the processor 61 to calculate a grayscale characteristic table TQ of image structure #i like that shown in FIG. 17B. The control unit 15 also controls the processor 61 to read out gray level correction values (image information) for forming reference patches PR of image structure #i from the grayscale characteristic table TQ. For example, the processor 61 has a data calculation function and calculates a grayscale characteristic table TQ from grayscale characteristic values obtained from the gray level detection acquisition unit.

The image forming units 10Y, 10M, 10C, and 10K and colorimetric unit 12 described above constitute a gray level correction value acquisition unit, which generates reference patches again from the calculation result obtained by the processor 61 and detects their densities, thereby acquiring gray level correction values. For example, the control unit 15 controls the image forming units 10Y, 10M, 10C, and 10K to form reference patches PR again on the basis of the gray level correction values read out from the processor 61. The control unit 15 controls the colorimetric unit 12 to detect the densities of the reference patches PR formed by the image forming units 10Y, 10M, 10C, and 10K to acquire the color detection data (gray level correction values) D1 detected by the colorimetric unit 12, and controls the processor 61 to generate a gray level correction table TR of image structure #1 like that shown in FIG. 17C.

The control unit 15 shown in FIG. 4 controls the processor 61 and the image forming units 10Y, 10M, 10C, and 10K to generate a gray level correction table TR of image structure #2 with reference to the grayscale characteristic table TQ (see FIG. 17B) of image structure #1 generated by the processor 61 for image processing.

In the above example, when a gray level correction table TR of image structure #2 is to be generated, the control unit 15 controls the image forming units 10Y, 10M, 10C, and 10K to form a plurality of reference patches PR with image structure #2 and different densities on the intermediate transfer belt 6 through the photosensitive drums 1Y, 1M, 1C, and 1K, and controls the colorimetric unit 12 to detect the densities of the reference patches PR formed by the image forming units 10Y, 10M, 10C, and 10K. The colorimetric unit 12 outputs color detection data D1 of a target of image structure #2 to the control unit 15. The control unit 15 controls the processor 61 to input the color detection data D1 of image structure #2 detected by the colorimetric unit 12, and also controls the processor 61 to obtain the grayscale characteristic value of the target on the basis of the color detection data D1 of image structure #2.

Figure 18A:
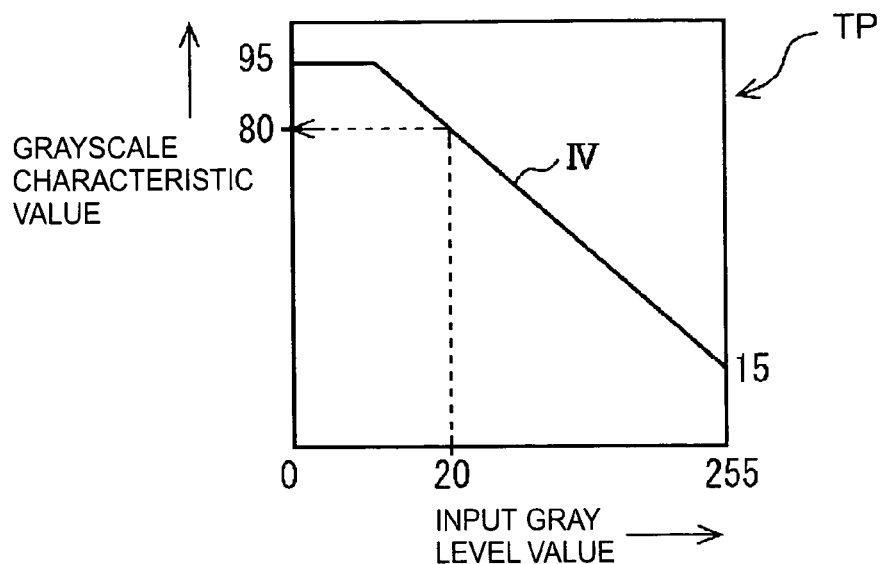
FIGS. 18A and 18B are graphs showing examples of how a target table TP and gray level correction table TR of image structure #2 are generated.

FIG. 18A is a view showing an example of how a target table TP of image structure #2 is generated. Referring to FIG. 18A, the ordinate represents the grayscale characteristic value (100% display) of a target of image structure #2; and the abscissa, the input gray level values 0 to 255 based on the color detection data D1. A solid line IV in FIG. 18A is a characteristic straight line for saturating lower gray levels than the grayscale characteristic value and linearly interpolating the remaining gray levels.

This example shows that when the grayscale characteristic values of the whitest portion and darkest portion in the gray level correction table TR are 95% and 15%, respectively, and the input gray level value of the target based on the color detection data D1 is "20", the grayscale characteristic value of the target is 80%. The grayscale characteristic value of the target is obtained along the direction of the dotted line arrow plotted from the input gray level value "20" based on the color detection data D1 as a start point. In addition, the processor 61 is controlled to obtain a gray level correction value for the grayscale characteristic value of the target based on the color detection data D1 of image structure #2 by using the grayscale characteristic table TQ of image structure #1 which is shown in FIG. 17B. In this example, since the grayscale characteristic value of the target is 80%, a gray level correction value, e.g., "28", for the target is obtained.

Figure 18B:
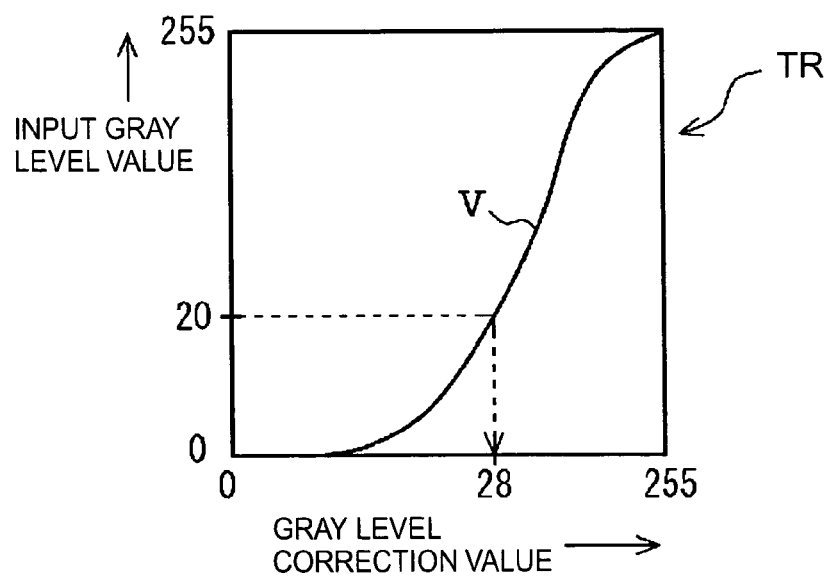

FIG. 18B is a view showing an example of how a gray level correction table TR of image structure #2 is generated. Referring to FIG. 18B, the ordinate represents the input gray level value based on the color detection data D1 of image structure

2; and the abscissa, the gray level correction value (output gray level value) of the target after Y correction of image structure #2. This shows that when the input gray level value of the target based on the color detection data D1 is "20" in the gray level correction table TR, the gray level correction value for the target is "28". The gray level correction values for other targets can be obtained in the same manner. A solid line V in FIG. 18B is a Y correction curve for interpolating the input gray level value based on the color detection data D1 in image structure #2 which is calculated in this manner.

With the gray level correction table TR, gray levels between the whitest portion and the darkest portion of a color image with image structure #2 can be optimally interpolated. Controlling the processor 61 in this manner makes it possible to calculate a gray level correction table TR of image structure #2 like that shown in FIG. 18B, which has a relationship in which the grayscale characteristic table TQ for obtaining gray level correction values for image structure #1 becomes identical to the grayscale characteristic table TQ for obtaining gray level correction values for image structure #2. This makes it possible to predict gray level correction values for image structure #2 from the grayscale characteristic acquisition unit and table calculation unit.

In the above example, when a gray level correction table TR of image structure #3 is to be generated, the control unit 15 controls the image forming units 10Y, 10M, 10C, and 10K to form a plurality of reference patches PR with image structure #3 and different densities on the intermediate transfer belt 6 through the photosensitive drums 1Y, 1M, 1C, and 1K, and controls the colorimetric unit 12 to detect the densities of the reference patches PR formed by the image forming units 10Y, 10M, 10C, and 10K. The colorimetric unit 12 outputs the color detection data D1 associated with a target with image structure #3 to the control unit 15. The control unit 15 controls the processor 61 to input the color detection data D1 with image structure #3 which is detected by the colorimetric unit 12, and also controls the processor 61 to obtain the grayscale characteristic value of the target based on the color detection data D1 with image structure #3.

In addition, the control unit 15 controls the processor 61 to obtain a gray level correction value for the grayscale characteristic value of the target based on the color detection data D1 with image structure #3 by using the grayscale characteristic table TQ of image structure #1 which is shown in FIG. 17B. Gray level correction values for other targets are obtained in the same manner. A Y correction curve like the solid line V in FIG. 18B can be obtained, which interpolates an input gray level value based on the color detection data D1 in image structure #3 which is calculated in this manner.

With the gray level correction table TR, gray levels between the whitest portion and the darkest portion of a color image in image structure #3 can be optimally interpolated. Controlling the processor 61 in this manner makes it possible to calculate a gray level correction table TR of image structure #3 like that shown in FIG. 18B, which has a relationship in which the grayscale characteristic table TQ for obtaining gray level correction values for image structure #1 becomes identical to the grayscale characteristic table TQ for obtaining gray level correction values for image structure #3. This makes it possible to predict gray level correction values for image structure #3 from the grayscale characteristic acquisition unit and table calculation unit.

In the above example, when a gray level correction table TR of image structure #4 is to be generated, the control unit 15 controls the image forming units 10Y, 10M, 10C, and 10K to form a plurality of reference patches PR with image structure #4 and different densities on the intermediate transfer belt 6 through the photosensitive drums 1Y, 1M, 1C, and 1K, and controls the colorimetric unit 12 to detect the densities of the reference patches PR formed by the image forming units 10Y, 10M, 10C, and 10K. The colorimetric unit 12 outputs the color detection data D1 associated with a target with image structure #4 to the control unit 15. The control unit 15 controls the processor 61 to input the color detection data D1 with image structure #4 which is detected by the colorimetric unit 12, and also controls the processor 61 to obtain the grayscale characteristic value of the target based on the color detection data D1 with image structure #4.

In addition, the control unit 15 controls the processor 61 to obtain a gray level correction value for the grayscale characteristic value of the target based on the color detection data D1 with image structure #4 by using the grayscale characteristic table TQ of image structure #1 which is shown in FIG. 17B. Gray level correction values for other targets are obtained in the same manner. A Y correction curve like the solid line V in FIG. 18B can be obtained, which interpolates an input gray level value based on the color detection data D1 in image structure #4 which is calculated in this manner.

With the gray level correction table TR, gray levels between the whitest portion and the darkest portion of a color image in image structure #4 can be optimally interpolated. Controlling the processor 61 in this manner makes it possible to calculate a gray level correction table TR like that shown in FIG. 18B for image structure #4, which has a relationship in which the grayscale characteristic table TQ for obtaining gray level correction values for image structure #1 becomes identical to the grayscale characteristic table TQ for obtaining gray level correction values for image structure #4. This makes it possible to predict gray level correction values for image structure #4 from the grayscale characteristic acquisition unit and table calculation unit.

In the above example, when a gray level correction table TR of image structure #5 is to be generated, the control unit 15 controls the image forming units 10Y, 10M, 10C, and 10K to form a plurality of reference patches PR with image structure #5 and different densities on the intermediate transfer belt 6 through the photosensitive drums 1Y, 1M, 1C, and 1K, and controls the colorimetric unit 12 to detect the densities of the reference patches PR formed by the image forming units 10Y, 10M, 10C, and 10K. The colorimetric unit 12 outputs the color detection data D1 associated with a target with image structure #5 to the control unit 15. The control unit 15 controls the processor 61 to input the color detection data D1 with image structure #5 which is detected by the colorimetric unit 12, and also controls the processor 61 to obtain the grayscale characteristic value of the target based on the color detection data D1 with image structure #5.

In addition, the control unit 15 controls the processor 61 to obtain a gray level correction value for the grayscale characteristic value of the target based on the color detection data D1 with image structure #5 by using the grayscale characteristic table TQ of image structure #1 which is shown in FIG. 17B. Gray level correction values for other targets are obtained in the same manner. A Y correction curve like the solid line V in FIG. 18B can be obtained, which interpolates an input gray level value based on the color detection data D1 in image structure #5 which is calculated in this manner.

With the gray level correction table TR, gray levels between the whitest portion and the darkest portion of a color image in image structure #5 can be optimally interpolated. Controlling the processor 61 in this manner makes it possible to calculate a gray level correction table TR of image structure #5 like that shown in FIG. 18B, which has a relationship in which the grayscale characteristic table TQ for obtaining gray level correction values for image structure #1 becomes identical to the grayscale characteristic table TQ for obtaining gray level correction values for image structure #2. This makes it possible to predict gray level correction values for image structure #5 from the grayscale characteristic acquisition unit and table calculation unit and to generate gray level correction tables TR of other image structures #2 to #5 matching the grayscale characteristic table TQ of image structure #1.

The second image forming method according to the present invention will be described next.

Figures 1, 19:
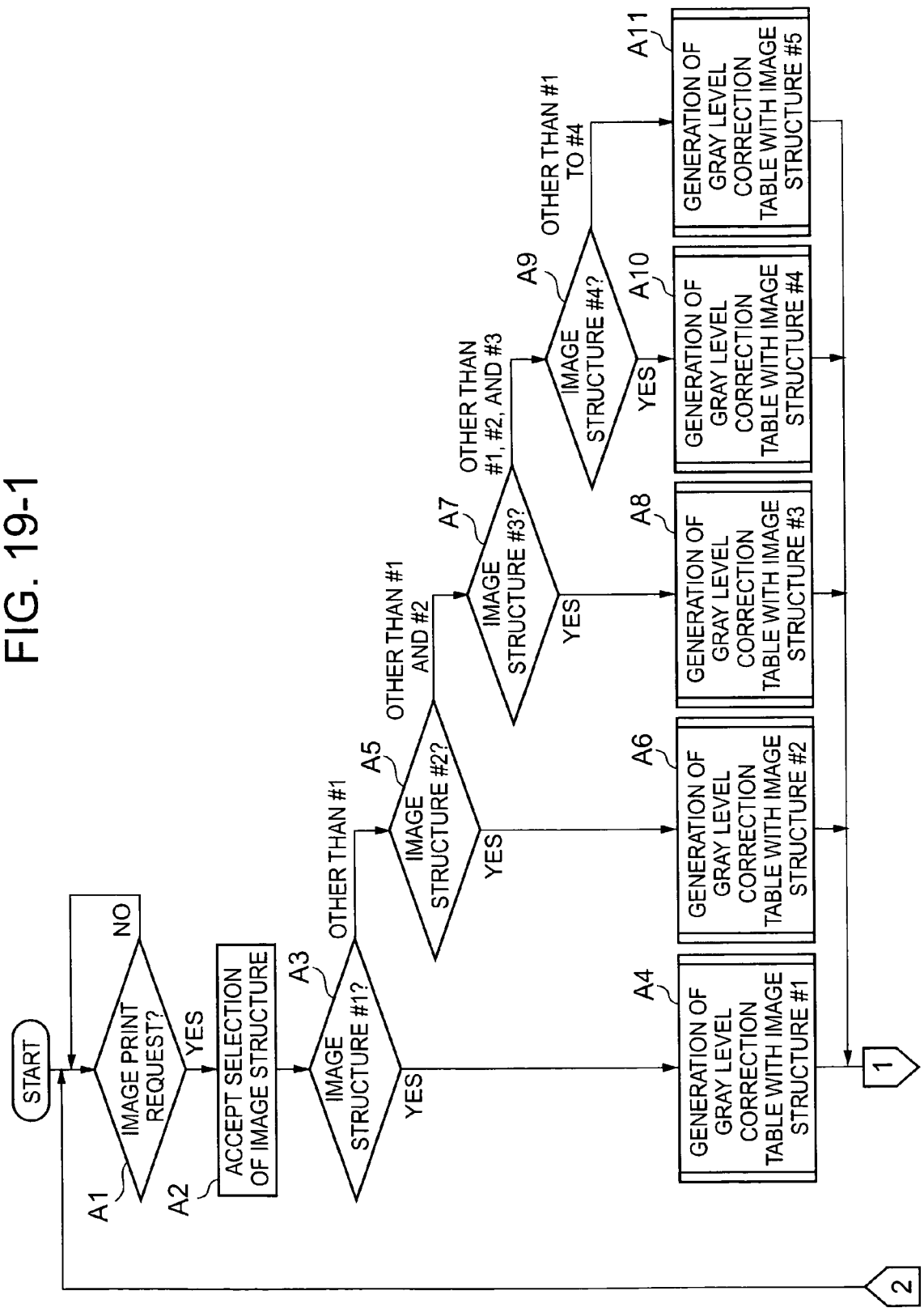
Figures 2, 19:
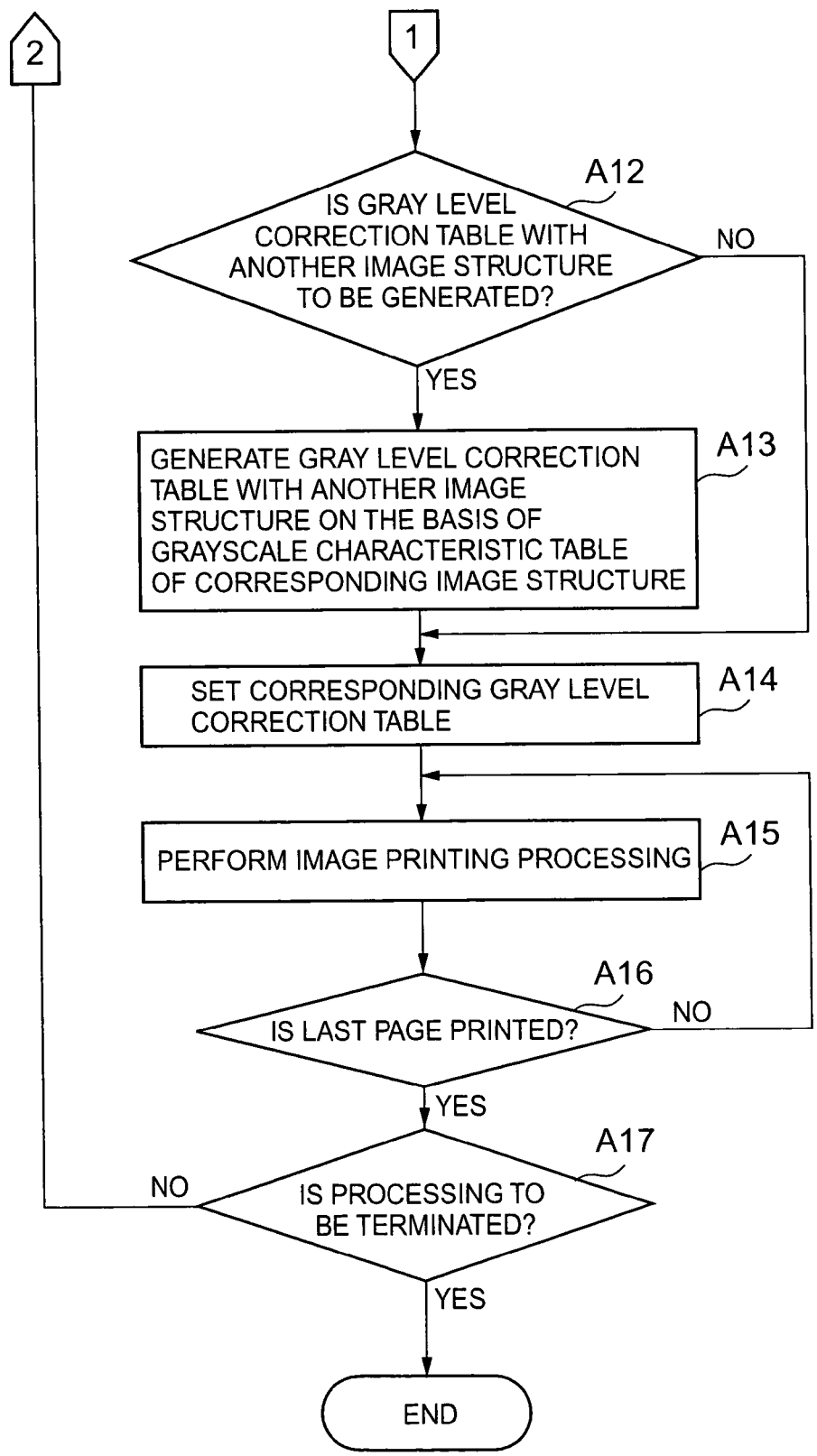
Figure 20:
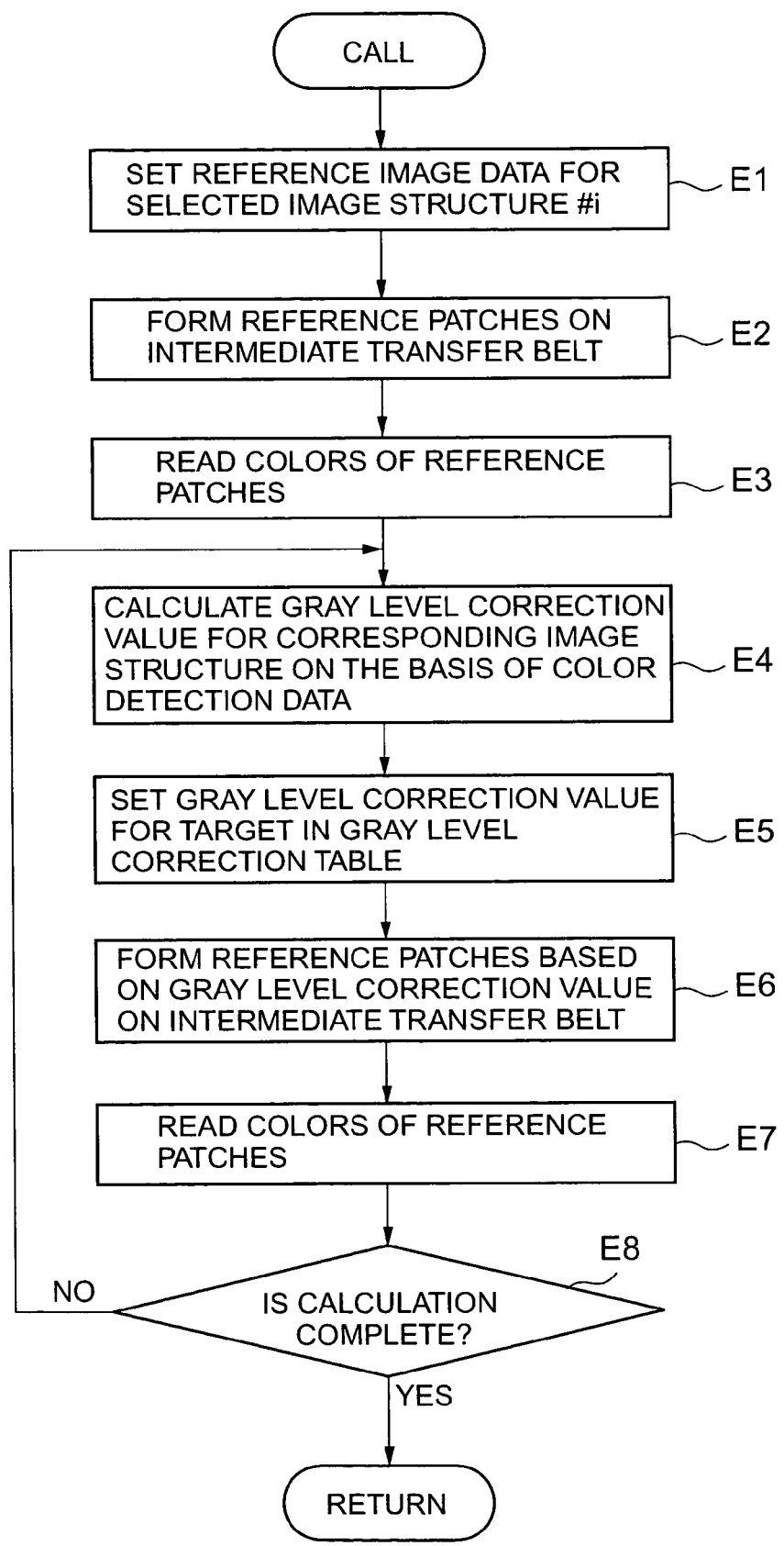
FIG. 20 is a flowchart (subroutine) showing an example of how a gray level correction table is generated in the embodiment shown in FIG. 3.
Figure 21:
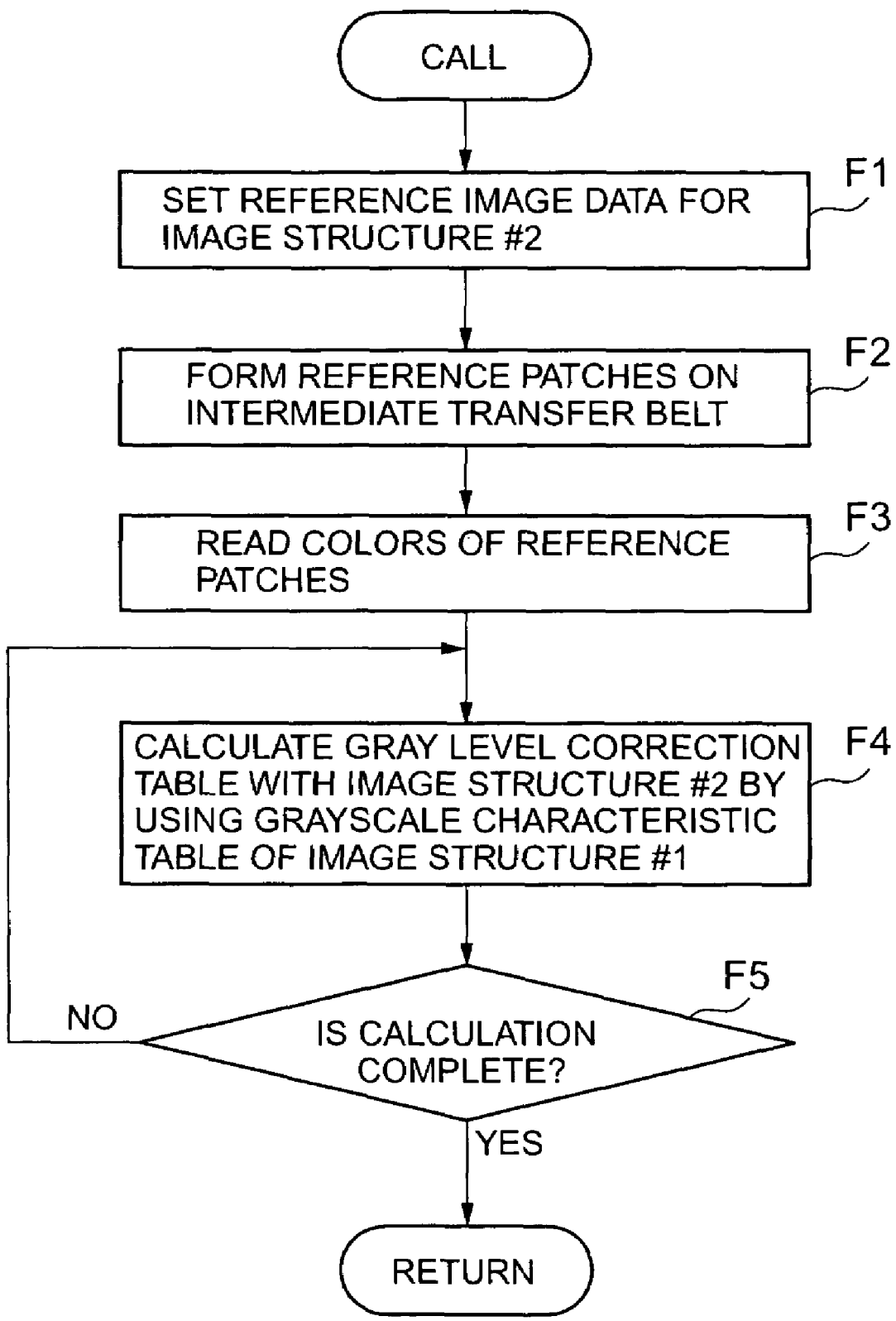
FIG. 21 is a flowchart (subroutine) showing an example of how gray level correction tables of other image structures are generated in the embodiment shown in FIG. 3.

FIG. 19-1 is a flowchart showing an example of image forming operation in the color printer 100 as an embodiment of the image forming apparatus of the present invention. FIG. 19-2 is a flowchart showing an example of the generation of a gray level correction table in the image structure in the printer 100. FIG. 20 is a flowchart showing an example of the generation of gray level correction tables in the remaining image structures in the printer 100.

This embodiment is associated with a gray level correction table calculation method for a printer having a plurality of types of image structures (line/dot/error diffusion) #i (i=1 to 5) on the assumption that color images with desired image structure #i are formed on the intermediate transfer belt 6 through the photosensitive drums 1Y, 1M, 1C, and 1K by superimposing colors on the basis of arbitrary image information. In this embodiment, by referring to the gray level correction result of one type of image structure, gray level correction tables TR of other image structures are calculated. In this example, a gray level correction value for image structure #1 is predicted from the grayscale characteristic acquisition unit and table calculation unit, and a gray level correction table TR is calculated from the grayscale characteristic acquisition unit corresponding to each of remaining image structures #2 to #5 so as to match the predicted gray level correction value.

Under the above conditions as image forming conditions, the flow waits for an image print request in step A1 in the flowchart of FIG. 19-1. If an image print request is input, the flow shifts to step A2. The user selects one image structure #i from five types of image structures #1 to #5 and sets it in the control unit 15 in association with color images to be formed on the intermediate transfer belt 6 through the photosensitive drums 1Y, 1M, 1C, and 1K. The control unit 15 accepts the selection of image structure #i in step A2, and branches the control on the basis of this selection.

In step A3, the control unit 15 determines whether image structure #1 is selected by the user. If image structure #1 is selected, the flow shifts to step A4 to generate a gray level correction table TR with image structure #1. For example, the subroutine shown in FIG. 19-2 is called, and the control unit 15 sets the reference image data Dy', Dm', Dc', and Dk' of selected image structure #i in step E1 in the flowchart. In this example, the reference image data Dy', Dm', Dc', and Dk' are data for forming a plurality of reference patches PR with image structure #1 and different densities. The reference image data Dy', Dm', Dc', and Dk' are read out from a patch table by referring to a patch table (slew gray level values) (not shown), and are set in the image structure generating matrix units 63Y, 63M, 63C, and 63K.

In step E2, the image forming units 10Y, 10M, 10C, and 10K form reference patches PR of the colors Y, M, C, and 10K of the respective colors Y, M, C, and K as shown in FIG. 16. At this time, the image forming unit 10Y supplies, to the laser writing unit 3Y, an image structure signal Sy generated on the basis of the reference image data Dy' of image structure #1. The image forming unit 10M supplies, to the laser writing unit 3M, an image structure signal Sm generated on the basis of the image structure signal Dm' of image structure #1. The image forming unit 10C supplies, to the laser writing unit 3C, an image structure signal Sc generated on the basis of the image structure signal Dc' of image structure #1. The image forming unit 10K supplies, to the laser writing unit 3K, an image structure signal Sk generated on the basis of the image structure signal Dk' of image structure #1.

The laser writing units 3Y, 3M, 3C, and 3K form electrostatic latent images for reference patches on the photosensitive drums 1Y, 1M, 1C, and 1K. These electrostatic latent images are developed by the developing units 4Y, 4M, 4C, and 4K. In this case, reversal development is performed by applying a developing bias which is obtained by superimposing an AC voltage on a DC voltage having the same polarity (negative polarity in this embodiment) as that of toner to be used.

The image forming unit 10Y prints a Y color toner image serving as a reference patch PR. The image forming unit 10M prints an M color toner image serving as a reference patch PR. The image forming unit 10C prints a C color toner image serving as a reference patch PR. The image forming unit 10K prints a BK color toner image serving as a reference patch PR. The toner images for reference patches which are formed on the photosensitive drums 1Y, 1M, 1C, and 1K are transferred onto the intermediate transfer belt 6 (primary transfer). With this operation, reference patches PR like those shown in FIGS. 12A to 12D can be formed on the intermediate transfer belt 6. Note that in the color correction mode, no color images are actually printed on the image recording sheet P.

Subsequently, in step E3, the colorimetric unit 12 reads the colors of the reference patches PR of image structure #1 (detects densities) and outputs a color detection signal S1 to the control unit 15. The control unit 15 analog/digital-converts the color detection signal S1 and outputs color detection data (input gray level values of 256 gray levels) D1 to the processor 61. The processor 61 calculates gray level correction values for image structure #1 on the basis of the color detection data D1 in step E4. At this time, the processor 61 linearly interpolates the minimum and maximum values of the color detection data D1 to generate a 256-gray-level target table TP like that shown in FIG. 17A. Thereafter, the processor 61 obtains a grayscale characteristic value for reproducing a target from the color detection data D1 on the basis of the target table TP. At this time, the processor 61 retrieves the grayscale characteristic value of the target on the basis of the color detection data D1.

In the example shown in FIG. 17A, the grayscale characteristic value of the target corresponding to the color detection data D1 of the input gray level value "20" is 75%, and a gray level correction value is obtained from the grayscale characteristic table TQ shown in FIG. 17B on the basis of the grayscale characteristic value. For example, two points near 75% are retrieved from the grayscale characteristic values of the grayscale characteristic table TQ. When the grayscale characteristic value of the target corresponding to the color detection data D1 of the input gray level value "30" is 74%, and the grayscale characteristic value of the target corresponding to the color detection data D1 of the input gray level value "31" is 78%, a gray level correction value for correcting the target is given by $$\text{gray level correction value for target} = \{(78-75) \times 30 + (75-74) \times 31\}/(78-74) = 30.25 \quad (5)$$

In this example, since the number of bits of the gray level correction table TR that can be set in the memories 62Y, 62M,

62C, and 62K is eight, the gray level correction value for the target is "30" upon rounding off to the nearest whole number.

The gray level correction value for the target is set in the gray level correction table TR in step E5. In step E6, the reference patch PR based on the gray level correction value for image structure #1 is formed on the intermediate transfer belt 6. In step E7, the colorimetric unit 12 reads the color of the reference patch PR and outputs the color detection signal S1 to the control unit 15. The color detection signal S1 is A/D-converted into color detection data (patch data) D1. The flow then shifts to step E8, in which the control unit 15 determines whether gray level correction values for all the gray levels are calculated by the processor 61. The control unit 15 detects a calculation end notification from the processor 61 and determines the end of the calculation.

If gray level correction values for all the gray levels are not completely calculated, the flow returns to step E4, in which the control unit 15 controls the processor 61 to calculate a gray level correction value for the target. Subsequently, steps E4 to E8 are sequentially repeated. If it is determined in step E8 that gray level correction values for all the gray levels are completely calculated, a gray level correction table TR of image structure #1 like that shown in FIG. 17C can be generated. The flow then returns to step A4 in the flowchart shown in FIG. 19-1, and then shifts to step A12.

In step A12, the processor 61 determines whether or not gray level correction tables TR of other image structures #2 to #5 are to be generated. The user uses the operation selection unit 14b to give the control unit 15 an instruction as to whether or not to generate gray level correction tables TR of image structures #2 to #5. The control unit 15 recognizes, on the basis of operation data D3 from the operation selection unit 14b, whether or not to generate tables, and notifies the processor 61 of the recognition result.

The processor 61 determines whether or not to generate gray level correction tables TR of image structures #2 to #5 on the basis of the notification from the control unit 15. When gray level correction tables TR of image structures #2 to #5 are to be generated, the flow shifts to step A13 to generate gray level correction tables TR for other image structures #2 to #5 with reference to the grayscale characteristic table TQ of image structure #1. Note that the color detection data D1 for calculating a gray level correction value for image structure #2 is different from the color detection data D1 of the target which is used when a gray level correction table of image structure #1 is calculated.

When, for example, a gray level correction table TR of image structure #2 as another image structure #i is to be generated, the control unit 15 calls the subroutine shown in FIG. 20. The control unit 15 then reads out the reference image data Dy', Dm', Dc', and Dk' for forming a plurality of reference patches PR with image structure #2 and different densities in step F1 in the flowchart, and sets them in the image structure generating matrix units 63Y, 63M, 63C, and 63K. For the reference image data Dy', Dm', Dc', and Dk', a patch table (slew gray level values) (not shown) is looked up.

In step F2, the image forming units 10Y, 10M, 10C, and 10K form reference patches PR like those shown in FIG. 16 on the intermediate transfer belt 6. In this case, the image forming unit 10Y supplies, to the laser writing unit 3Y, the image structure signal Sy generated by the image structure generating matrix unit 63Y on the basis of the reference image data Dy' of image structure #2. The image forming unit 10M supplies, to the laser writing unit 3M, the image structure signal Sm generated by the image structure generating matrix unit 63M on the basis of the reference image data Dm' of image structure #2. The image forming unit 10C supplies, to the laser writing unit 3C, the image structure signal Sc generated by the image structure generating matrix unit 63C on the basis of the reference image data Dc' of image structure #2. The image forming unit 10K supplies, to the laser writing unit 3K, the image structure signal Sk generated by the image structure generating matrix unit 63K on the basis of the reference image data Dk' of image structure #2.

Subsequently, in step F3, the colorimetric unit 12 reads the color of the reference patch PR of image structure #2 (detects the density) and outputs the color detection signal S1 to the control unit 15. The control unit 15 analog/digital-converts the color detection signal S1 and outputs the color detection data (input gray level value of 256 gray levels) D1 to the processor 61.

The processor 61 inputs the color detection data D1 and calculates a gray level correction value for image structure #2 by using the grayscale characteristic table TQ of image structure #1 in step F4. At this time, the processor 61 linearly interpolates the minimum and maximum values of the color detection data D1 and generates a 256-gray-level target table TP like that shown in FIG. 18A. The processor 61 then obtains a grayscale characteristic value for reproducing a target from the color detection data D1 on the basis of the target table TP. At this time, the processor 61 retrieves the grayscale characteristic value of the target on the basis of the color detection data D1.

In the example shown in FIG. 18A, when the grayscale characteristic values of the whitest portion and darkest portion in the gray level correction table TR are 95% and 15%, respectively, and the input gray value based on the color detection data D1 of the target is "20", the grayscale characteristic value of the target is 80%. In addition, the control unit 15 controls the processor 61 to obtain a gray level correction value corresponding to the grayscale characteristic value of the target based on the color detection data D1 of image structure #2 by using the grayscale characteristic table TQ of image structure #1 which is shown in FIG. 17B. In this example, since the grayscale characteristic value of the target is 80%, for example, "28" is obtained as a gray level correction value for the target.

The processor 61 then generates the gray level correction table TR of image structure #2 which is shown in FIG. 18B. In this case, in the gray level correction table TR shown in FIG. 18B, when the input gray value based on the color detection data D1 of the target is "20", the gray level correction value for the target is "28". The flow then shifts to step F5, in which the control unit 15 determines whether the processor 61 has calculated gray level correction values for all the gray levels. The control unit 15 detects a calculation end notification from the processor 61 and determines the end of the calculation.

If gray level correction values for all the gray levels are not completely calculated, the flow returns to step F4, in which the control unit 15 controls the processor 61 to calculate a gray level correction value for the target. With this processing, gray level correction values for the remaining targets are obtained in the same manner as described above. If it is determined in step F5 that gray level correction values for all the gray levels are completely calculated, a gray level correction table TR of image structure #2 like that shown in FIG. 18B can be generated. With the gray level correction table TR, gray levels between the whitest portion and the darkest portion of a color image in image structure #2 can be optimally interpolated. The flow then shifts to step A14. Note that processing in steps E5 to E7 can be omitted as compared with the case of image structure #1.

If an image structure other than image structure #1 is selected in step A3 in the flowchart shown in FIG. 19-1, the flow shifts to step A5 to check whether image structure #2 is selected by the user. If image structure #2 is selected, the flow shifts to step A6 to generate the gray level correction table TR of image structure #2. At this time, the image forming units 10Y, 10M, 10C, and 10K form a plurality of reference patches PR with selected image structure #2 and different densities on the intermediate transfer belt 6 through the photosensitive drums 1Y, 1M, 1C, and 1K. The colorimetric unit 12 detects the densities of the reference patches PR formed on the intermediate transfer belt 6 through the photosensitive drums 1Y, 1M, 1C, and 1K and acquires the color detection data D1 of image structure #2.

The processor 61 calculates a grayscale characteristic table TQ of image structure #2 from the acquired color detection data D1. The processor 61 generates a gray level correction table TR of image structure #1 from the calculated grayscale characteristic table TQ. The flow then shifts to step A12. In step A12, the processor 61 determines whether or not to generate gray level correction tables TR for other image structures #1, #3, #4, and #5 with reference to the generated grayscale characteristic table TQ of image structure #2. When the gray level correction tables TR for other image structures #1, #3, #4, and #5 are to be generated, the flow shifts to step A13 to generate the gray level correction tables TR for other image structures #1, #3, #4, and #5. Thereafter, the flow shifts to step A14.

If an image structure other than image structures #1 and #2 is selected in step A5, the flow shifts to step A7 to check whether image structure #3 is selected by the user. If image structure #3 is selected, the flow shifts to step A8 to generate a gray level correction table TR with image structure #3. At this time, the image forming units 10Y, 10M, 10C, and 10K form a plurality of reference patches PR with selected image structure #3 and different densities on the intermediate transfer belt 6 through the photosensitive drums 1Y, 1M, 1C, and 1K. The colorimetric unit 12 detects the densities of the reference patches PR formed on the intermediate transfer belt 6 through the photosensitive drums 1Y, 1M, 1C, and 1K and acquires the color detection data D1 with image structure #3.

The processor 61 calculates a grayscale characteristic table TQ of image structure #3 from the acquired color detection data D1. The processor 61 generates a gray level correction table TR of image structure #3 from the calculated grayscale characteristic table TQ. The flow then shifts to step A12. In step A12, the processor 61 determines whether or not to generate gray level correction tables TR of other image structures #1, #2, #4, and #5 with reference to the generated grayscale characteristic table TQ of image structure #3. When the gray level correction tables TR of other image structures #1, #2, #4, and #5 are to be generated, the flow shifts to step A13 to generate the gray level correction tables TR of other image structures #1, #2, #4, and #5. Thereafter, the flow shifts to step A14.

If an image structure other than image structures #1, #2, and #3 is selected in step A7, the flow shifts to step A9 to check whether image structure #4 is selected by the user. If image structure #4 is selected, the flow shifts to step A10 to generate a gray level correction table TR with image structure #4. At this time, the image forming units 10Y, 10M, 10C, and 10K form a plurality of reference patches PR with different densities and with selected image structure #4 on the intermediate transfer belt 6 through the photosensitive drums 1Y, 1M, 1C, and 1K. The colorimetric unit 12 detects the densities of the reference patches PR formed on the intermediate transfer belt 6 through the photosensitive drums 1Y, 1M, 1C, and 1K and acquires color detection data D1 of image structure #4.

The processor 61 calculates a grayscale characteristic table TQ of image structure #4 from the acquired color detection data D1. The processor 61 generates a gray level correction table TR of image structure #4 from the calculated grayscale characteristic table TQ. The flow then shifts to step A12. In step A12, the processor 61 determines whether or not to generate gray level correction tables TR of other image structures #1, #2, #3, and #5 with reference to the generated grayscale characteristic table TQ of image structure #4. When the gray level correction tables TR of other image structures #1, #2, #3, and #5 are to be generated, the flow shifts to step A13 to generate the gray level correction tables TR of other image structures #1, #2, #3, and #5. Thereafter, the flow shifts to step A14.

If an image structure other than image structures #1, #2, #3, and #4 is selected in step A9, the flow shits to step A11 to generate a gray level correction table TR with image structure #5. At this time, the image forming units 10Y, 10M, 10C, and 10K form a plurality of reference patches PR with selected image structure #5 and different densities on the intermediate transfer belt 6 through the photosensitive drums 1Y, 1M, 1C, and 1K. The colorimetric unit 12 detects the densities of the reference patches PR formed on the intermediate transfer belt 6 through the photosensitive drums 1Y, 1M, 1C, and 1K and acquires color detection data D1 of image structure #5.

The processor 61 calculates a grayscale characteristic table TQ of image structure #5 from the acquired color detection data D1. The processor 61 generates a gray level correction table TR of image structure #4 from the calculated grayscale characteristic table TQ. The flow then shifts to step A12. In step A12, the processor 61 determines whether or not to generate gray level correction tables TR of other image structures #1 to #4 with reference to the generated grayscale characteristic table TQ of image structure #5. When the gray level correction tables TR of other image structures #1 to #4 are to be generated, the flow shifts to step A13 to generate the gray level correction tables TR of other image structures #1 to #4. Thereafter, the flow shifts to step A14.

In step A14, the control unit 15 sets the gray level correction tables TR generated by the processor 61 in the memories 62Y, 62M, 62C, and 62K. The flow then shifts to step A15 to perform image forming processing of printing color images by correcting arbitrary image data Dy, Dm, Dc, and Dk using the gray level correction tables TR set in the memories 62Y, 62M, 62C, and 62K as in the conventional scheme.

At this time, the control unit 15 performs paper feed control. For example, the image recording sheets P stored in the paper feed cassettes 20A, 20B, and 20C shown in FIG. 3 are fed by the pickup rollers 21 and feed rollers 22A and conveyed to the secondary transfer roller 7A via the convey rollers 22B, 22C, and 22D, the registration rollers 23, and the like.

The image forming unit 10Y supplies, to the laser writing unit 3Y, the image structure signal Sy generated on the basis of the image data Dy of image structure #i. The laser writing unit 3Y forms a Y color image associated with Y color on the intermediate transfer belt 6 through the photosensitive drum 1Y on the basis of the corrected image structure signal Sy. The image forming unit 10M supplies, to the laser writing unit 3M, the image structure signal Sm generated on the basis of the image data Dm of image structure #i. The laser writing unit 3M forms an M color image associated with M color on the intermediate transfer belt 6 through the photosensitive drum 1M on the basis of the corrected image structure signal Sm.

The image forming unit 10C supplies, to the laser writing unit 3C, the image structure signal Sc generated on the basis of the image data Dc of image structure #i. The laser writing unit 3C forms a C color image associated with C color on the intermediate transfer belt 6 through the photosensitive drum 1C on the basis of the corrected image structure signal Sc. The image forming unit 10K supplies, to the laser writing unit 3K, the image structure signal Sk generated on the basis of the image data Dk of image structure #i. The laser writing unit 3K forms a K color image associated with K color on the intermediate transfer belt 6 through the photosensitive drum 1K on the basis of the corrected image structure signal Sk. With this operation, color images can be formed by superimposing C, M, Y, and K colors (primary transfer).

The color toner images are then transferred and fixed onto a predetermined image recording sheet P, and the sheet is delivered. At this time, the color images formed on the intermediate transfer belt 6 are transferred in block onto one surface of the image recording sheet P. The image recording sheet P onto which the color images are transferred is subjected to fixing processing by the fixing device 17, and is clamped by delivery rollers 24 to be placed on the delivery tray 25 located outside the apparatus. The residual transfer toner left on the outer surfaces of the photosensitive drums 1Y, 1M, 1C, and 1K after the transfer is cleaned by the cleaning units 8Y, 8M, 8C, and 8K. The next image forming cycle is then started.

In step A16, the control unit 15 determines whether the printing operation is complete. Whether printing operation is complete is determined by making the CPU 53 check whether the last page is printed. Whether a given page is the last page is determined by making the CPU 53 detect an end flag. If the last page is not printed, the flow returns to step A15 to continue image data correction processing. If the last page is printed, the flow shifts to step A17 to check whether or not to terminate the image forming processing. For example, when power-off information is detected, the image forming processing is terminated. If no power-off information is detected, the flow returns to step A1 to wait for an image print request.

As described above, according to the color printer and image forming method according to the embodiment of the present invention, when a color image is to be printed by superimposing colors on the basis of arbitrary image data Dy, Dm, Dc, and Dk, the control unit 15 controls the processor 61 and the image forming units 10Y, 10M, 10C, and 10K to generate gray level correction tables TR of image structures #2 to #5 with reference to the grayscale characteristic table TQ of image structure #1 generated by the processor 61.

The gray level correction tables TR can therefore easily be generated, with the color detection data D1 of other image structures #2 to #5 matching the grayscale characteristic table TQ of image structure #1 or the like which is arbitrarily selected and serves as a reference. This makes it possible to perform hue matching among five types of image structures #1 to #5. When image structure #1 was set as a target in the above embodiment, the following C, M, and Y color adjustment results could be obtained.

|  | C color (%) | M color (%) | Y color (%) |  |
|---|---|---|---|---|
| Image Structure #1 | 60 | 60 | 60 | normal |
| Image Structure #2 | 60 | 60 | 60 | normal |
| Image Structure #3 | 60 | 60 | 60 | normal |

-continued

|  | C color (%) | M color (%) | Y color (%) |  |
|---|---|---|---|---|
| Image Structure #4 | 60 | 60 | 60 | normal |
| Image Structure #5 | 60 | 60 | 60 | normal |

Setting most difficult image structure #1 (small line screen) for the gray levels of image structure #i in this manner makes it easy to make the grayscale characteristics among image structures #i uniform. This makes it possible to uniformly express grayscale characteristics among image structures #i. This, in turn, makes it possible to eliminate visual changes associated with the gray levels among image structures #1 to #5 and eliminate changes in gray balance regardless of which one of image structures #1 to #5 is selected.

Third Gray Level Correction Process:

As the third gray level correction process of the present invention, gray level correction processing to be executed for each of operation (printing) modes including "grayscale-characteristic-oriented", "gray-oriented", and "reproducibility-oriented" will be described.

Figure 22B:
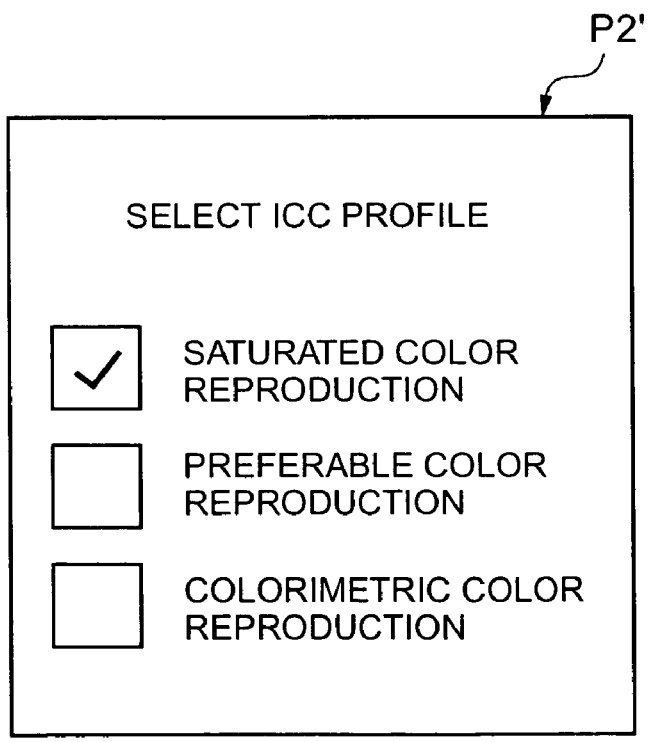

FIGS. 22A and 22B are views showing examples of the arrangements of gray level correction method selection windows P2 and P2'. The gray level correction method selection window P2 shown in FIG. 22A is displayed on the display unit 18 of the operation panel 48. The message "select gray level correction method" is displayed in the gray level correction method selection window P2. The three modes (optional items) "grayscale-characteristic-oriented", "gray-oriented", and "reproducibility-oriented" are displayed in a lower portion of this display area, with rectangular spaces for check marks being provided in the start areas of the pieces of character information.

In this example, in the gray level correction method selection window P2, one of the three modes is selected. The user checks an optional item in association with a gray level correction method. When, for example, the user is to select "grayscale-characteristic-oriented", he/she makes a check mark in the rectangular space in the start area of "grayscale-characteristic-oriented" by using the cursor function of the operation setting unit 14a or the like.

Note that when the "grayscale-characteristic-oriented" mode is selected, the image processing unit 60 calculates gray level correction tables which smoothly express the dynamic ranges of C color, M color, and Y color. When the "gray-oriented" mode is selected, the processor 61 calculates gray level correction tables which make the ratios in grayscale characteristics between C color, M color, and Y color equal to preset ratios throughout the gray levels. When the "reproducibility-oriented" mode is selected, the processor 61 calculates gray level correction tables which make the densities of C color, M color, and Y color equal to preset densities.

This makes it possible to accept the selection of one of the "grayscale-characteristic-oriented", "gray-oriented", and "reproducibility-oriented" modes and generate gray level correction tables corresponding to the selected mode, thereby correcting the image data Dy, Dm, Dc, and Dk on the basis of the generated gray level correction tables and forming color images on the intermediate transfer belt 6 on the basis of the corrected image data Dy, Dm, Dc, and Dk.

In this example, the modes selected by the operation setting unit 14a comply with the color conversion method based on the ICC (Integrated Communication Controller) profile. As indicated by the gray level correction method selection window P2' shown in FIG. 22B, "gray-oriented", "reproducibility-oriented", and "grayscale-characteristic-oriented" are respectively made to correspond to "preferable color reproduction", "saturated color reproduction", and "colorimetric color reproduction". Any type of display method can be used for the three modes.

Figure 23A:
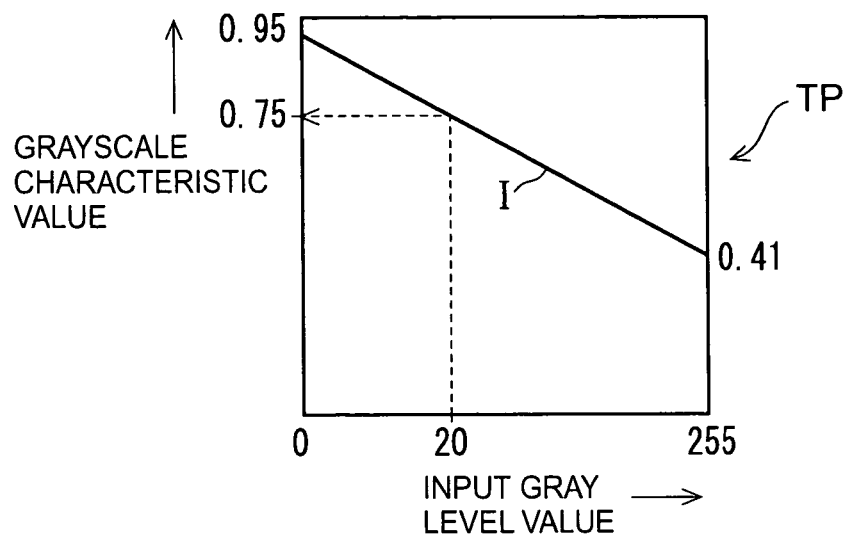
FIGS. 23A to 23C are graphs showing examples of how tables are calculated by a processor when a "grayscale-characteristic-oriented" mode is selected.
Figure 23B:
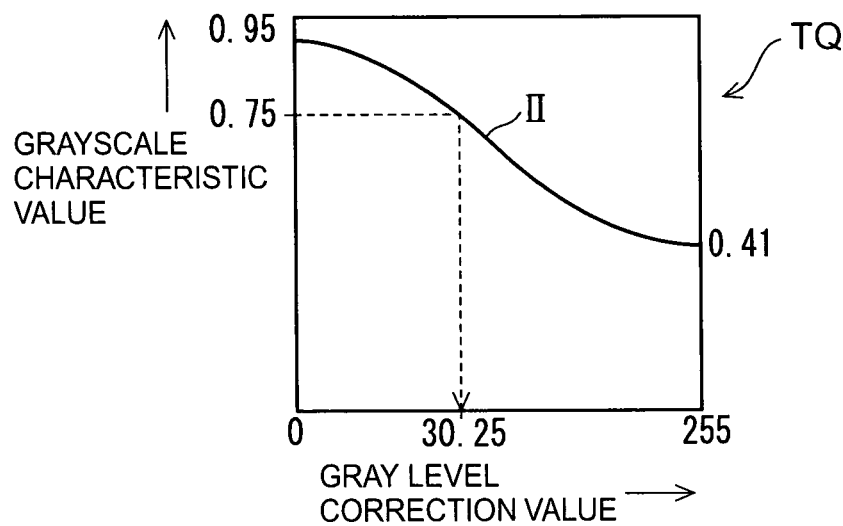
Figure 23C:
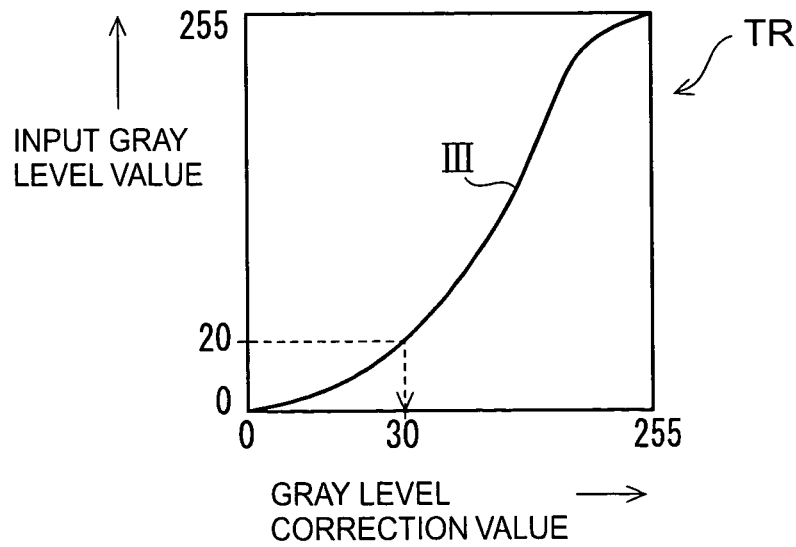

An example of processing performed by the processor 61 under the control of the control unit 15 when the "grayscale-characteristic-oriented" mode is selected will be described next. FIGS. 23A to 23C are views showing examples of how tables are calculated by the processor 61 when the "grayscale-characteristic-oriented" mode is selected. FIGS. 23A, 23B, and 23C are graphs showing examples of characteristics in a target table TP, grayscale characteristic table TQ, and gray level correction table TR, respectively. The respective tables shown in these graphs respectively correspond to FIGS. 17A to 17C described in the description of the second gray level correction process except for the display of grayscale characteristic values (one unit display in this case) and numerical values, and hence a detailed description of the tables will be omitted.

The example shown in FIG. 23A indicates that when the grayscale characteristic values of the whitest portion and darkest portion in the gray level correction table TR for a preset image structure are 0.95 and 0.41, respectively, and the input gray level value based on the color detection data D1 of a target is "20", the grayscale characteristic value of the target is 0.75.

The example shown in FIG. 23B indicates that when the grayscale characteristic values of the whitest portion and darkest portion in the gray level correction table TR for a preset image structure are 0.95 and 0.41, respectively, and the grayscale characteristic value of a target is "0.75", the gray level correction value of the target is 30.25.

FIG. 23C is a graph showing a gray level correction table TR for an arbitrary image structure.

A method of calculating a gray level correction table when the "grayscale-characteristic-oriented" mode is selected is the same as that represented by equation (5). More specifically, the processor 61 retrieves a grayscale characteristic value for reproducing a 256-gray-level target from the target table TP shown in FIG. 23A. In the example shown in FIG. 23A, the grayscale characteristic value of the target corresponding to the color detection data D1 of the input gray value "20" is 0.75, and a gray level correction value is obtained from the grayscale characteristic table TQ shown in FIG. 23B on the basis of this grayscale characteristic value. For example, two points near 0.75 are retrieved from the grayscale characteristic values of the grayscale characteristic table TQ. When the grayscale characteristic value of the target corresponding to the color detection data D1 of the input gray level value "30" is 0.74, and the grayscale characteristic value of the target corresponding to the color detection data D1 of the input gray level value "31" is 0.78, a gray level correction value for correcting the target is 30.25 according to equation (5). In this example, since the number of bits of the gray level correction table TR that can be set in the memories 62Y, 62M, 62C, and 62K is eight, the gray level correction value for the target is "30" upon rounding off to the nearest whole number.

The gray level correction table TR like that shown in FIG. 23C can be acquired by sequentially repeating such calculations and repeating calculations for each color. Referring to FIG. 23C, the gray level correction table TR is a curve (Y correction curve III) that smoothly connects the minimum value and the maximum value. The Y correction curve III is used to interpolate the input gray level value based on the color detection data D1 in an arbitrary image structure. With this gray level correction table TR, gray levels between the whitest portion and the darkest portion of a color image with this image structure can be optimally interpolated. Note that the method of calculating the gray level correction table TR differs depending on the mode set by the operation unit 14.

Figure 24:
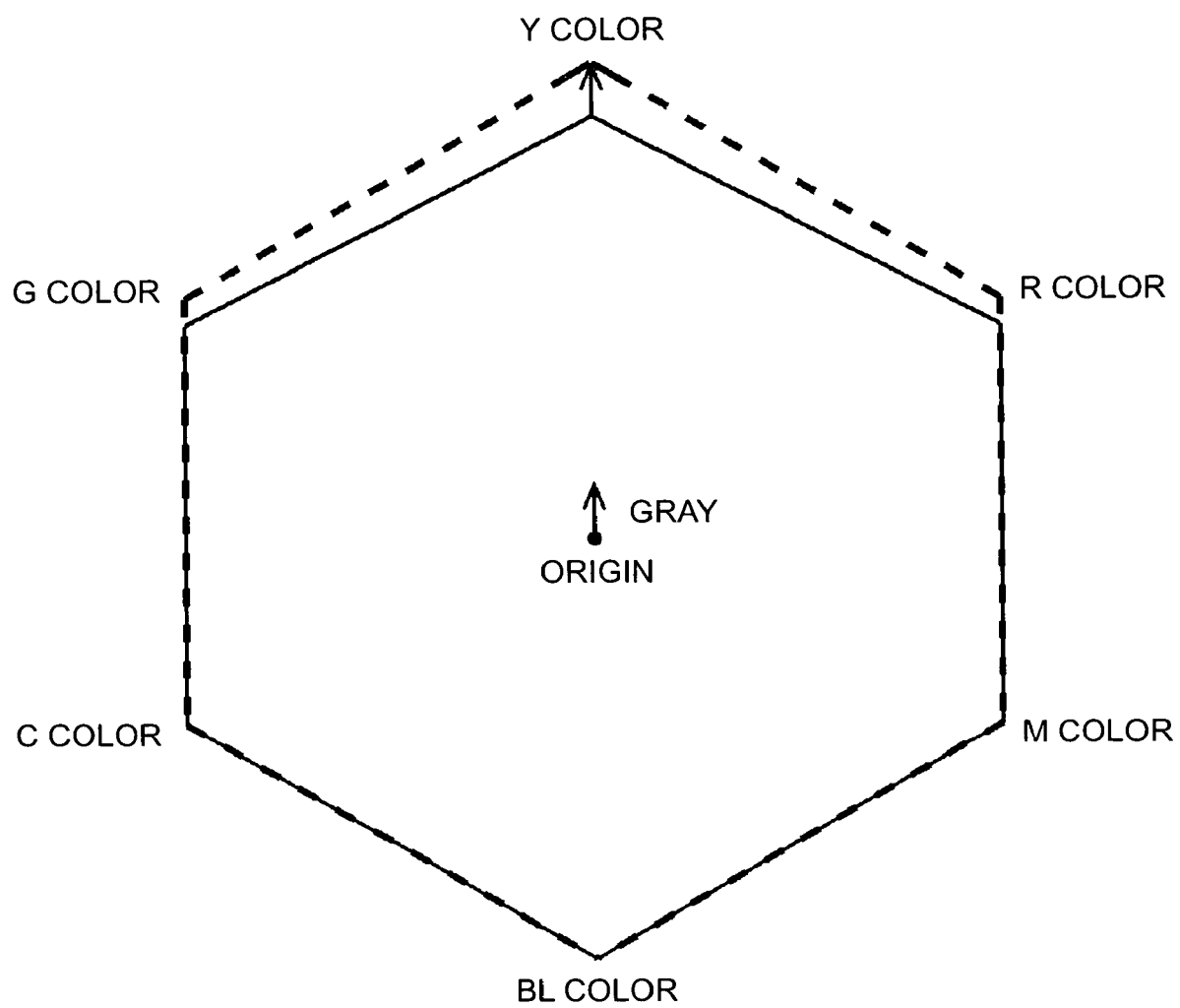
FIG. 24 is a view showing an example of gray hue deviation.

FIG. 24 is view showing an example of gray hue deviation. According to the example of gray hue deviation shown in FIG. 24, when the dynamic range of each of C, M, and Y colors changes, the gray balance expressed by the three colors C, M, and Y moves, for example, in the Y color direction.

Referring to FIG. 24, when the gray balance expressed by the three colors C, M, and Y is to be evaluated, Y color, G color, C color, BL color, M color, and R color are arranged at the respective vertices of the regular hexagon. G color is obtained by superimposing Y color and C color. BL color is obtained by superimposing C color and M color. R color is obtained by superimposing Y color and M color. The center of the hexagon is the gray balance origin. The solid line represents a state wherein gray balance is achieved. In this state, Y color, G color, C color, BL color, M color, and R color are at equal distances to the balance origin.

The dotted line represents a state wherein the gray balance deviates in the Y color direction. Although C color, BL color, and M color are at equal distances from the balance origin, Y color, G color, and R color are at longer distances from the balance origin than C color, BL color, and M color. Y color is at the longest distance from the balance origin as compared with G color and R color. In such a case, the gray balance is off with respect to Y color.

An example of processing performed by the processor 61 when the "gray-oriented" mode is selected will be described next. FIGS. 25A to 28B are graphs showing an example of how C, M, Y, and K color tables are calculated by the processor 61 when the "gray-oriented" mode is selected.

In this example, when the "gray-oriented" mode is selected, the processor 61 sets in advance the brightnesses of the densest portions corresponding to the dynamic ranges of the respective colors with reference to a C color gray level correction table TRc, and calculates the grayscale characteristic values of a Y color target, M color target, and BK color target in ratio (%) to the set brightnesses of the densest portions.

First of all, the processor 61 calculates the grayscale characteristic value of a C color target so as to set the C color gray level correction table TRc as a reference.

Figure 25A:
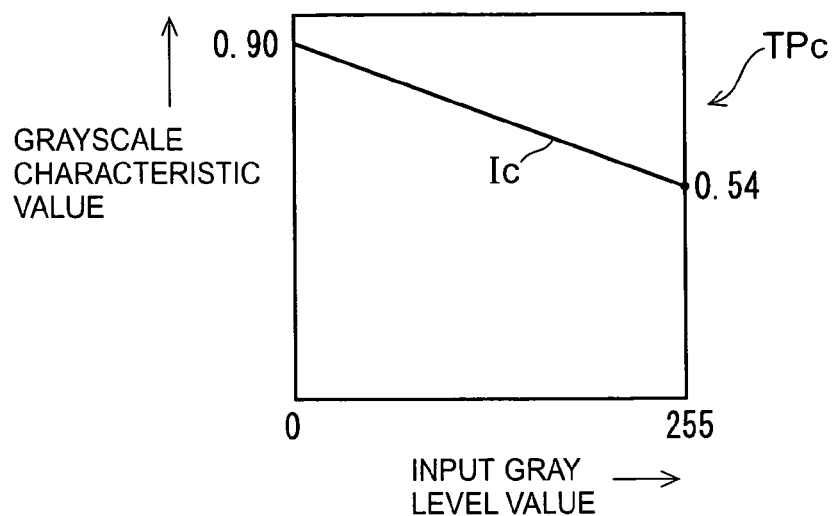
FIGS. 25A and 25B are graphs showing examples of how a target table TPc and gray level correction table TRc for C color are generated when a "gray-oriented" mode is selected.

FIG. 25A is a graph showing an example of how a C color target table TPc is generated. Referring to FIG. 25A, the ordinate represents the grayscale characteristic value (one unit display) of the C color target; and the abscissa, the input gray values 0 to 255 based on the color detection data D1. A solid line Ic is a characteristic straight line for linearly interpolating grayscale characteristic values.

In this example, with regard to the grayscale characteristic value of the C color target, the grayscale characteristic value of the whitest portion in the C color gray level correction table TRc is 0.90, and the grayscale characteristic value of the darkest portion in the table is 0.54. In this example, since gray balance is achieved with reference to the C color gray level correction table TRc, the grayscale characteristic value (characteristic data) of the darkest portion=0.54 is directly set as a calculation value.

Figure 25B:
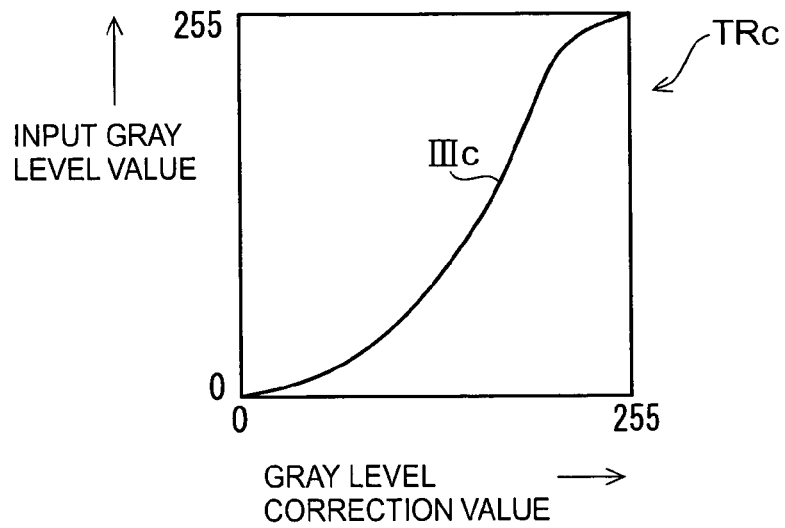

FIG. 25B is a graph showing an example of how the C color gray level correction table TRc is generated. Referring to FIG. 25B, the ordinate represents the input gray level value based on the color detection data D1; and the abscissa, the gray level correction value (output gray level value) for the C color target after Y correction. A solid line IIIc is a Y correction curve for interpolating C color grayscale characteristic values.

Likewise, the processor 61 calculates the grayscale characteristic value of the Y color target with reference to the C color gray level correction table TRc. A Y color gray level correction table TRy is calculated by the processor 61.

Figure 26A:
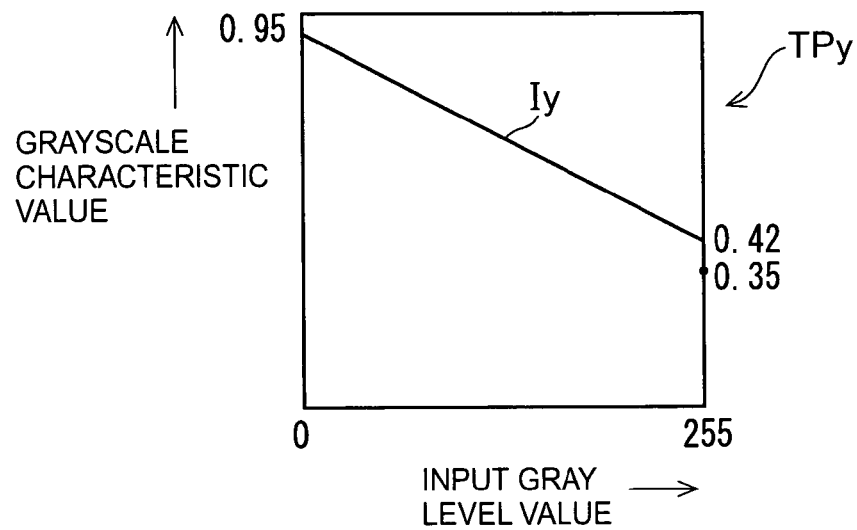
FIGS. 26A and 26B are graphs showing examples of how a target table TPy and gray level correction table TRy for Y color are generated when the "gray-oriented" mode is selected.

FIG. 26A is a graph showing an example of how a Y color target table TPy is generated. Referring to FIG. 26A, the ordinate represents the grayscale characteristic value (one unit display); and abscissa, the input gray level values 0 to 255 based on the color detection data D1. A solid line 1y is a characteristic straight line for linearly interpolating grayscale characteristic values.

In this example, with regard to the grayscale characteristic value of the Y color target, the grayscale characteristic value of the whitest portion in the Y color gray level correction table TRy is 0.95, and the grayscale characteristic value of the darkest portion in the table is 0.42 (calculation value). In this example, the processor 61 achieves gray balance with reference to the C color gray level correction table TRc, and the grayscale characteristic value of the darkest portion is, for example, 0.35.

Figure 26B:
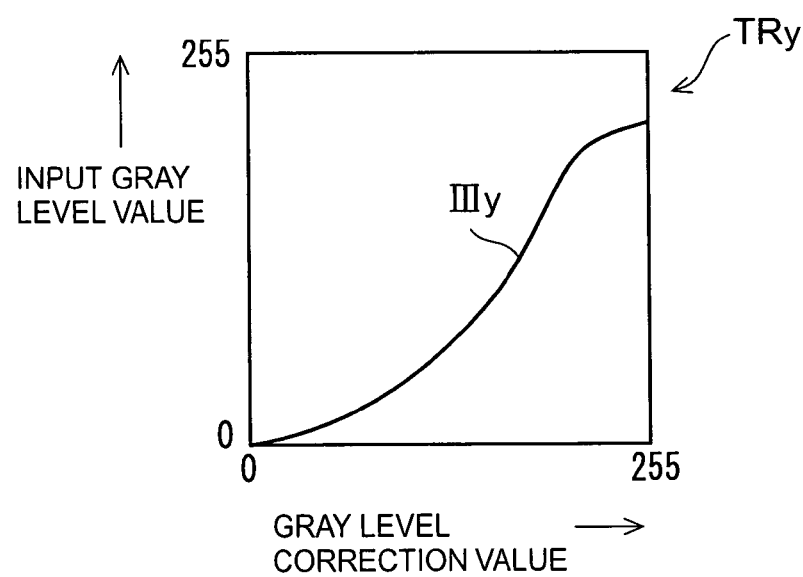

FIG. 26B is a graph showing a Y color gray level correction table TRy. Referring to FIG. 26B, the ordinate represents the input gray level value based on the color detection data D1; and the abscissa, the gray level correction value (output gray level value) for the Y target after Y correction. A solid line IIIy is a Y correction curve for interpolating the grayscale characteristic value of Y color.

Likewise, the processor 61 calculates the grayscale characteristic value of the M target with reference to the C color gray level correction table TRc. An M color gray level correction table TRm is calculated by the processor 61.

Figure 27A:
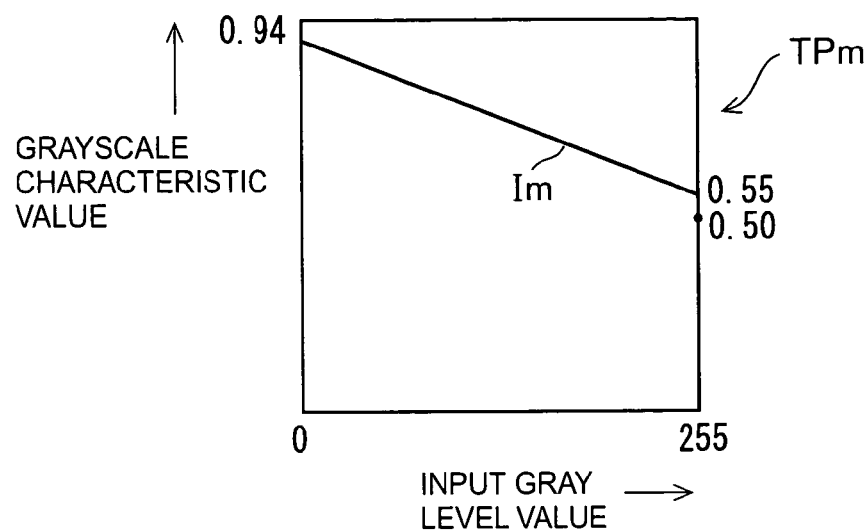
FIGS. 27A and 27B are graphs showing examples of how a target table TPm and gray level correction table TRm for M color are generated when the "gray-oriented" mode is selected.

FIG. 27A is a graph showing an example of how an M color target table TPm is generated. Referring to FIG. 27A, the ordinate represents the grayscale characteristic value (one unit display) of the M target; and the abscissa, the input gray level values 0 to 255 based on the color detection data D1. A solid line 1m is a characteristic straight line for linearly interpolating grayscale characteristic values.

In this example, with regard to the grayscale characteristic value of the M color target, the grayscale characteristic value of the whitest portion in the M color gray level correction table TRm is 0.94, and the grayscale characteristic value of the darkest portion in the table is 0.55 (calculation value). In this example, the processor 61 achieves gray balance with reference to the C color gray level correction table TRc, and the grayscale characteristic value of the darkest portion is, for example, 0.50.

Figure 27B:
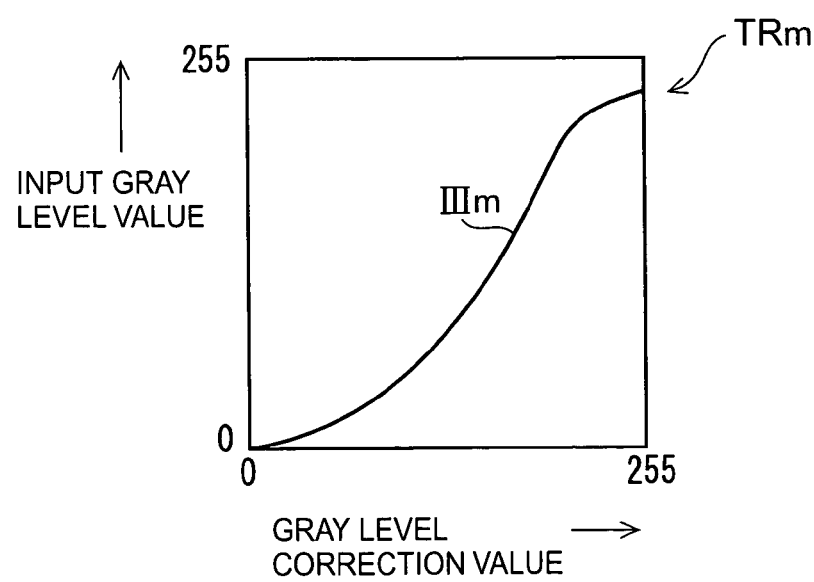

FIG. 27B is a graph showing an example of how the M color gray level correction table TRm is generated. Referring to FIG. 27B, the ordinate represents the input gray level value based on the color detection data D1; and the abscissa, the gray level correction value (output gray level value) for the M target after Y correction. A solid line IIIm is a Y correction curve for interpolating the grayscale characteristic value of M color.

Likewise, the processor 61 calculates the grayscale characteristic value of the BK target with reference to the C color gray level correction table TRc. A BK color gray level correction table TRk is calculated by the processor 61.

Figure 28A:
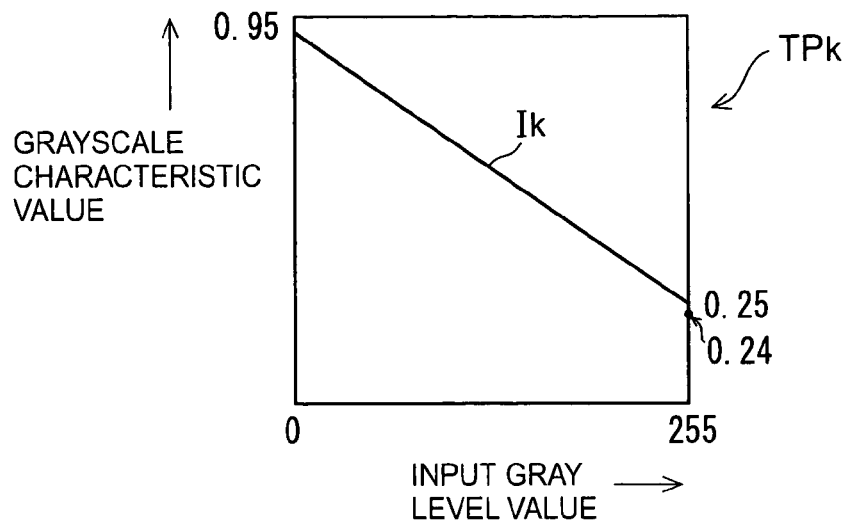
FIGS. 28A and 28B are graphs showing examples of how a target table TPk and gray level correction table TRk for BK color are generated when the "gray-oriented" mode is selected.

FIG. 28A is a graph showing an example of how the BK color target table TPk is generated. Referring to FIG. 28A, the ordinate represents the grayscale characteristic value (one unit display) of the BK target; and the abscissa, the input gray level values 0 to 255 based on the color detection data D1. A solid line 1k is a characteristic straight line for linearly interpolating grayscale characteristic values.

In this example, with regard to the grayscale characteristic value of the BK color target, the grayscale characteristic value of the whitest portion in the BK color gray level correction table TRk is 0.95, and the grayscale characteristic value of the darkest portion in the table is 0.25 (calculation value). The processor 61 achieves gray balance with reference to the C color gray level correction table TRc, and the grayscale characteristic value of the darkest portion is, for example, 0.24.

Figure 28B:
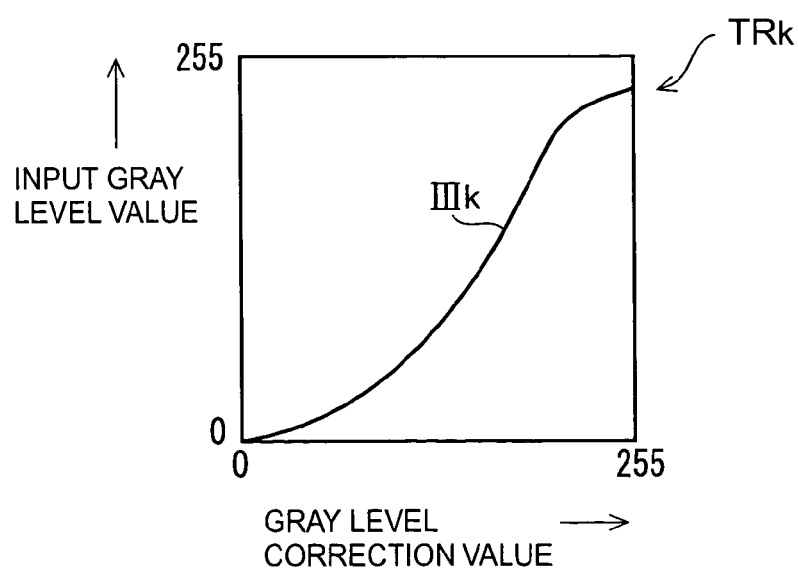

FIG. 28B is a graph showing an example of how the BK color gray level correction table TRk is generated. Referring to FIG. 28B, the ordinate represents the input gray level value based on the color detection data D1; and the abscissa, the gray level correction value (output gray level value) for the BK target after Y correction. A solid line IIIk is a Y correction curve for interpolating the grayscale characteristic value of BK color.

According to the method of calculating the C, M, Y, and K color gray level correction tables TRc, TRm, TRy, and TRk when the "gray-oriented" mode is selected, the brightnesses of the densest portions corresponding to the dynamic ranges of the respective colors are set in advance with reference to the C color gray level correction table TRc, and the grayscale characteristic values of the Y, M, and BK color targets are calculated in ratio (%) to the set brightnesses of the densest portions. These calculates are executed by the processor 61.

In this example, when a grayscale characteristic value arbitrarily set in advance takes the following value, a % grayscale characteristic value which expresses a grayscale characteristic value for the evaluation of gray balance in percent can be obtained. In calculating brightnesses, when pieces of color (luminance) information obtained from the color detection data D1 are represented by an X value, Y value, and Z value, the 0.4th power of the X value is used for C color, the 0.4th power of the Y value is used for M color, and the 0.4th power of the Z value is used for Y color.

With regard to an arbitrarily set grayscale characteristic value, the grayscale characteristic value of the darkest portion in the Y color target table TPy is 0.41. With this value set as an original (org), the grayscale characteristic value of the darkest portion in the M color target table TPm is 0.53. With this value set as an original (org), the grayscale characteristic value of the darkest portion in the C color target table TPc is 0.52. With this value set as an original (org), the grayscale characteristic value of the darkest portion in the BK color target table TPk is 0.24. This value is then set as an original (org). The grayscale characteristic values arbitrarily set in the above manner, i.e., Y=0.41, M=0.53, C=0.52, and K=0.24, are set as denominators (org).

Likewise, when the grayscale characteristic value of the darkest portion in the C color gray level correction table TRc is 0.54 (calculation value=characteristic data), the grayscale characteristic value, 0.35, of the densest portion in the Y color target table TPy shown in FIG. 26A is set. With this value set as characteristic data (data), the grayscale characteristic value, 0.50, of the densest portion in the M color target table TPm is set. With this value set as characteristic data (data), the grayscale characteristic value, 0.24, of the densest portion in the BK color target table TPk is set. This value is then set as characteristic data (data).

When characteristic data Y=0.35, M=0.50, C=0.54, and K=0.24 set in the above manner are set as numerator (data), a % grayscale characteristic value for the evaluation of gray balance is obtained by % grayscale characteristic value=(data/org)×100[%]  (6)

In this example, with regard to the % grayscale characteristic values of Y, M, C, and K colors, Y=85%, M=93%, C=103%, and K=100% are obtained. In this case, C color whose % grayscale characteristic value is as large as 103% corresponds to the lightest color. Note that as the % grayscale characteristic value decreases, the color becomes darker, and vice versa.

In this example, by using the % grayscale characteristic value=103% of C color, which is obtained by equation (2), the maximum densities of the remaining colors Y, M, and K are calculated. For example, the processor 61 obtains the maximum density values of the respective colors Y, M, and K according to equation (7) such that they become equal to % grayscale characteristic value=103% of C color.

maximum density value=preset calculation value (org)×% grayscale characteristic value of lightest color/100 (7)

In this example, with regard to the maximum density values of the respective colors Y, M, C, and K, Y=0.42, M=0.55, C=0.54, and K=0.25 are obtained. Values for correcting these maximum density values are obtained in accordance with C color which is the lightest color. In the example shown in FIG. 26A, maximum density value Y=0.42 is set as the maximum value of the target table TPy, the minimum value remains 0.95 (unchanged). Likewise, values for reproducing the target tables TPm and TPk are sequentially calculated.

In the example shown in FIG. 27A, maximum density value M=0.55 is set as the maximum value of the target table TPm, the minimum value remains 0.94 (unchanged). In the example shown in FIG. 28A, maximum density value K=0.25 is set as the maximum value of the target table TPk, the minimum value remains 0.95 (unchanged). The densities between the minimum value and the maximum value of each of the target tables TPy, TPm, TPc, and TPk are linearly interpolated in the same manner as in the "grayscale-characteristic-oriented" mode. Increasing the grayscale characteristic value can suppress the maximum density value of each color.

In this example, the gray level correction table TRc like that shown in FIG. 25B is generated from the color target table TPc in the processing sequence shown in FIGS. 23A to 23C. Likewise, the M color gray level correction table TRm like that shown in FIG. 26B is generated from the M color target table TPm in the same processing sequence. The gray level correction table TRy like that shown in FIG. 27B is generated from the target table TPy in the same processing sequence. The gray level correction table TRk like that shown in FIG. 28B is generated from the target table TPk in the same processing sequence.

Figure 29:
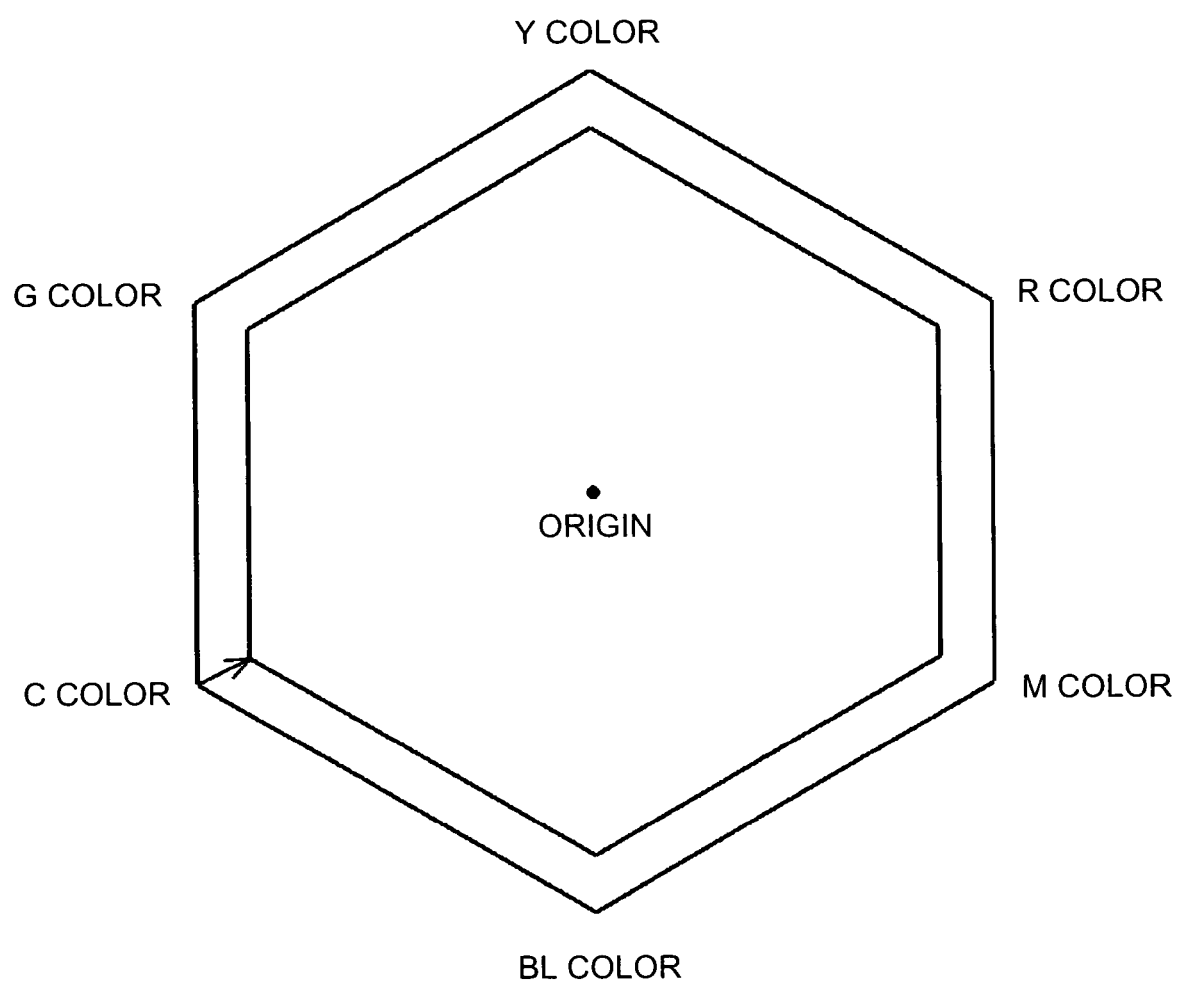
FIG. 29 is a view showing an example of gray balance associated with the "gray-oriented" mode after correction.

In this example, grayscale characteristic tables for colors other than C color use no maximum density values. As shown in FIG. 29, since the relative positional relationship between C, M, and Y colors is held, gray obtained by superimposing C, M, and Y colors can be prevented from being moved. In addition, no maximum density values are used in the image forming units 10Y, 10M, 10C, and 10K, a γ correction curve IIIc having smoothness like that shown in FIG. 25B can be obtained as the gray level correction table TRc. Similarly, as the gray level correction tables TRy, TRm, and TRk, γ correction curves IIIy, IIIm, and IIIk like those shown in FIGS. 26B, 27B, and 28B can be obtained.

FIG. 29 is a view showing an example of gray balance after correction associated with the "gray-oriented" mode. Referring to FIG. 29, the outer hexagon is an example in which Y color, G color, C color, BL color, M color, and R color reproduced by the maximum density values are arranged at the respective vertices. In this example, the gray balance origin is located in the center of the hexagon. The inner hexagon is an example in which Y color, G color, C color, BL color, M color, and R color reproduced by densities lower than the maximum densities are arranged at the respective vertices. Although the size of the hexagon is smaller than that based on the maximum density values, the gray balance origin is located in the center of the hexagon.

According to the example of gray balance after correction, which is shown in FIG. 29, correction calculation processing like that described with reference to FIGS. 25A to 28B is performed for the outer hexagon based on Y color, G color, C color, BL color, M color, and R color reproduced by the maximum density values, i.e., the densities of M, Y, and K colors are corrected to match with the maximum density of C color as the lightest color in the color target table TPc. This makes it possible to hold the relative positional relationship between C, M, and Y colors at the gray balance origin, gray obtained by superimposing C, M, and Y colors can be prevented from being moved. As shown in FIG. 29, this can correct gray hue deviation like that shown in FIG. 24. The gray balance shown in FIG. 29 does not suffer from any gray hue deviation like that shown in FIG. 24.

An example of processing performed by the processor 61 when the "reproducibility-oriented" mode is selected will be described next. FIGS. 30A to 33B are graphs showing an example of how C, M, Y, and K color tables are calculated by the processor 61 when the "reproducibility-oriented" mode is selected.

In this example, low- and intermediate-density grayscale characteristics and gray balance are kept constant at the sacrifice of grayscale characteristics and the gray balance of a high-density portion. This makes it possible to eliminate the drawbacks in the "grayscale-characteristic-oriented" and "gray-oriented" modes, and the output result can be kept most constant as an overall impression. In addition, the maximum density values in the target table TP of the respective colors are calculated from the values obtained by the colorimetric unit 12 in the "grayscale-characteristic-oriented" and "gray-oriented" modes and the like. In contrast, in the "reproducibility-oriented" mode, a maximum density value is set in advance. For a lightest reference patch PR of each color, the value obtained by the colorimetric unit 12 is used.

Figure 30A:
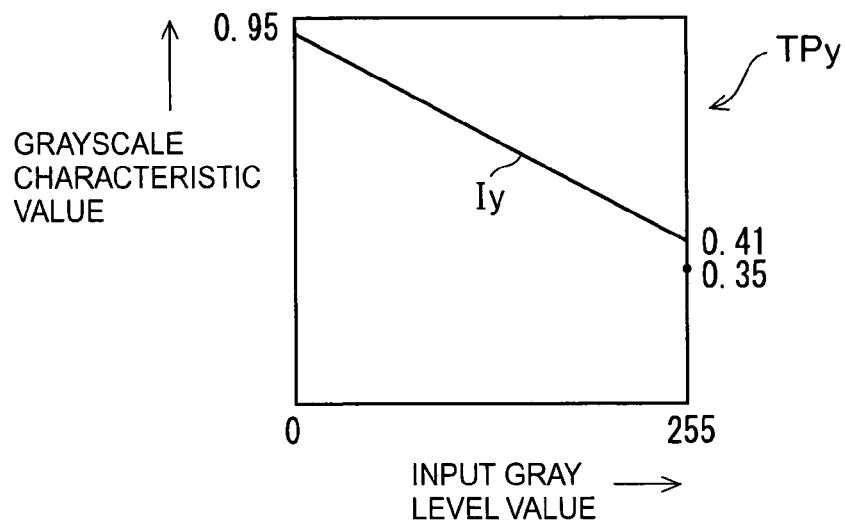
FIGS. 30A and 30B are graphs showing examples of how a target table TPy and gray level correction table TRy for Y color are generated when a "reproducibility-oriented" mode is selected.

FIG. 30A is a graph showing an example of how a Y color target table TPy is generated. Referring to FIG. 30A, the ordinate represents the grayscale characteristic value (one unit display) of the Y color target; and the abscissa, the input gray level values 0 to 255 based on the color detection data D1. A solid line Iy is a characteristic straight line for linearly interpolating grayscale characteristic values.

In this example, with regard to the grayscale characteristic value of the Y color target, 0.95 is set as the grayscale characteristic value of the whitest portion in the Y color gray level correction table TRy, and 0.41 (org) is set as the grayscale characteristic value of the darkest portion. The grayscale characteristic value of the Y color target is calculated by the processor 61 shown in FIG. 4. The processor 61 sets, for example, 0.35 (characteristic data) as the grayscale characteristic value of the darkest portion in the Y color target table TPy.

Figure 30B:
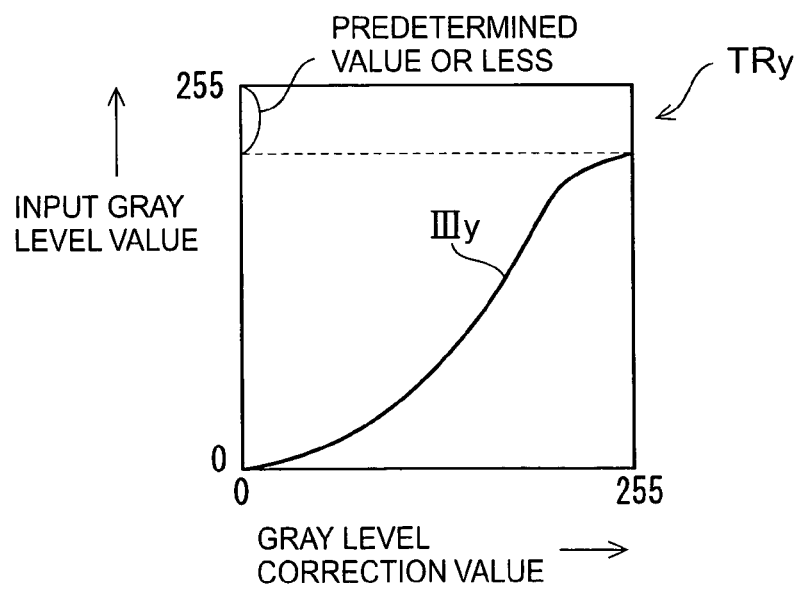

FIG. 30B is a graph showing the Y color gray level correction table TRy. Referring to FIG. 30B, the ordinate represents the input gray level value based on the color detection data D1; and the abscissa, the gray level correction value (output gray level value) of the Y color target after γ correction. A solid line IIIy is a γ correction curve for interpolating Y color grayscale characteristic values. The gray level correction table TRc is calculated by the processor 61. In this example, according to the Y color γ correction curve indicated by the solid line IIIy, γ conversion of the high gray-level portion of an input gray level value can be suppressed to a constant value or less.

Figure 31A:
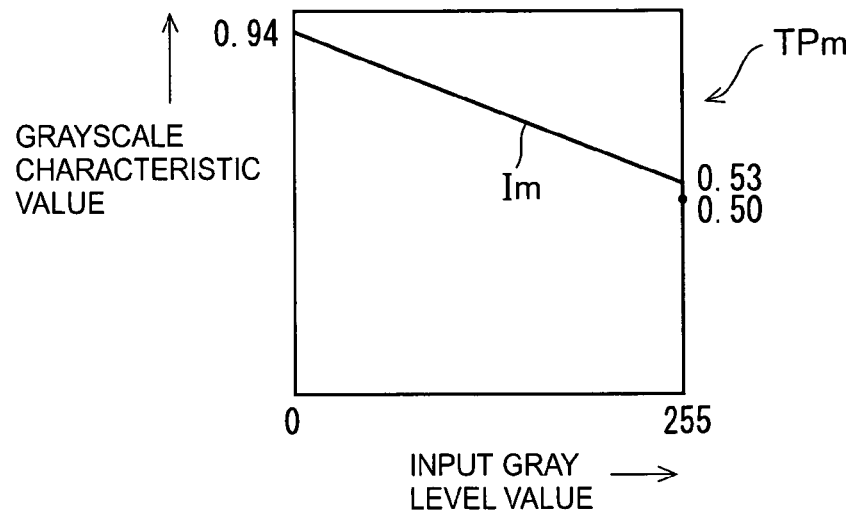
FIGS. 31A and 31B are graphs showing examples of how a target table TPm and gray level correction table TRm for M color are generated when the "reproducibility-oriented" mode is selected.

Likewise, the processor 61 calculates the grayscale characteristic value of the M color target and an M color gray level correction table TRm. FIG. 31A is a graph showing an example of how the M color target table TPm is generated. Referring to FIG. 31A, the ordinate represents the grayscale characteristic value (one unit display) of the M color target; and the abscissa, the input gray level values 0 to 255 based on the color detection data D1. A solid line Im is a characteristic straight line for linearly interpolating grayscale characteristic values.

In this example, with regard to the grayscale characteristic value of the M color target, 0.94 is set as the grayscale characteristic value of the whitest portion in the M color gray level correction table TRm, and 0.53 (org) is set as the grayscale characteristic value of the darkest portion. The grayscale characteristic value of the M color target is calculated by the processor 61. The processor 61 sets 0.50 (characteristic data) as the grayscale characteristic value of the darkest portion in the M color target table TPm.

Figure 31B:
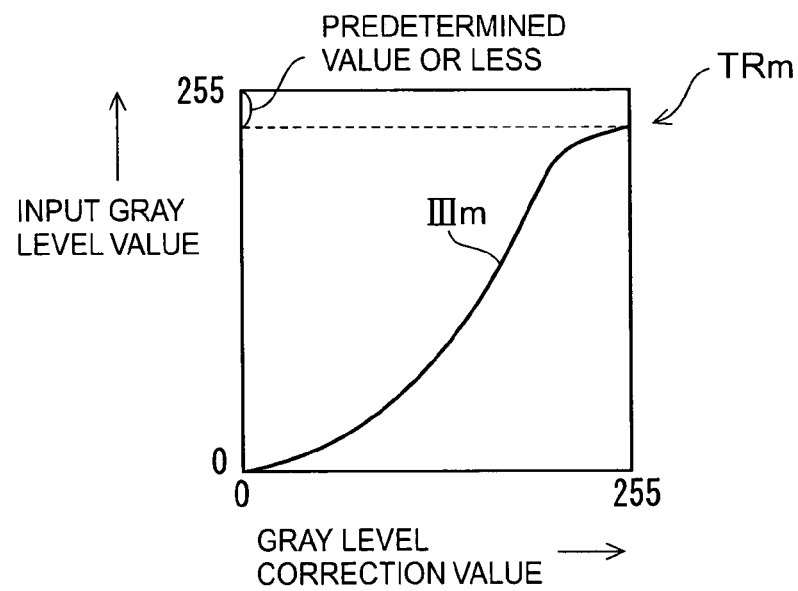

FIG. 31B is a graph showing the M color gray level correction table TRm. Referring to FIG. 31B, the ordinate represents the input gray level value based on the color detection data D1; and the abscissa, the gray level correction value (output gray level value) of the M color target after γ correction. A solid line IIIm is a γ correction curve for interpolating M color grayscale characteristic values. In this example, according to the Y color γ correction curve indicated by the solid line IIIm, γ conversion of the high gray-level portion of an input gray level value can be suppressed to a constant value or less. The gray level range in which γ conversion is suppressed to the constant value or less is smaller than that for Y color.

Figure 32A:
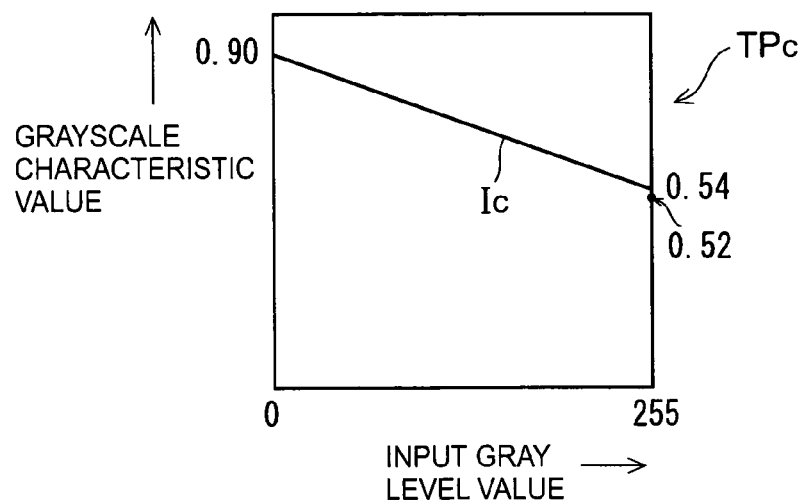
FIGS. 32A and 32B are graphs showing examples of how a target table TPc and gray level correction table TRc for C color are generated when the "reproducibility-oriented" mode is selected.

FIG. 32A is a graph showing an example of how the C color target table TPc is generated. Referring to FIG. 32A, the ordinate represents the grayscale characteristic value (one unit display) of the C color target; and the abscissa, the input gray level values 0 to 255 based on the color detection data D1. A solid line Ic is a characteristic straight line for linearly interpolating grayscale characteristic values.

In this example, with regard to the grayscale characteristic value of the C color target, 0.90 is set as the grayscale characteristic value of the whitest portion in the C color gray level correction table TRc, and 0.52 (org) is set as the grayscale characteristic value of the darkest portion. The grayscale characteristic value of the C color target is calculated by the processor 61. The processor 61 sets, for example, 0.54 (characteristic data) as the grayscale characteristic value of the darkest portion in the C color target table TPc.

Figure 32B:
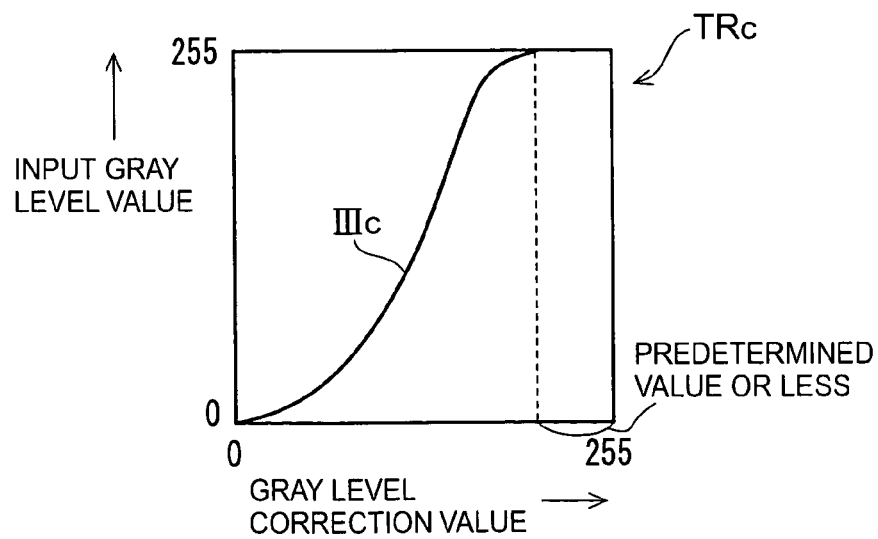

FIG. 32B is a graph showing the C color gray level correction table TRc. Referring to FIG. 32B, the ordinate represents the input gray level value based on the color detection data D1; and the abscissa, the gray level correction value (output gray level value) of the C color target after γ correction. A solid line IIIc is a γ correction curve for interpolating C color grayscale characteristic values. In this example, according to the C color γ correction curve indicated by the solid line IIIc, γ conversion of the high gray-level portion of a gray level correction value (output gray level value) can be suppressed to a constant value or less.

Figure 33A:
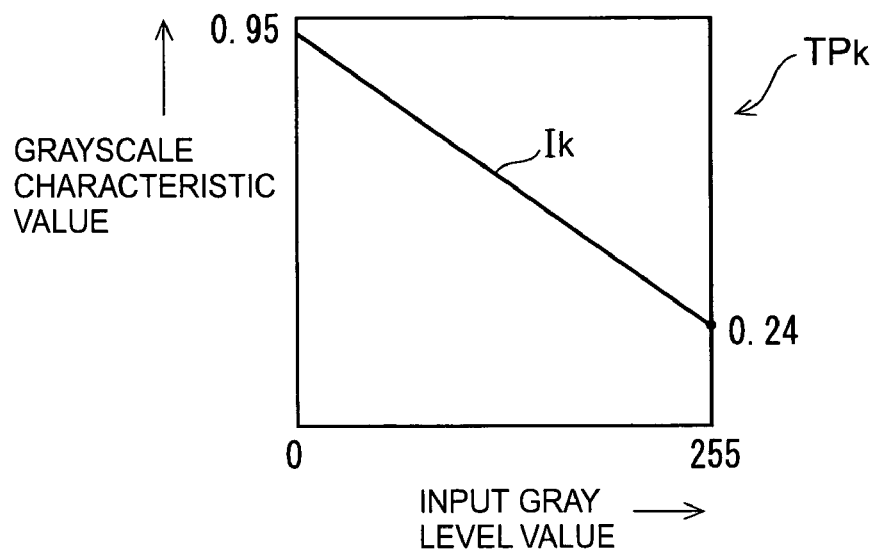
FIGS. 33A and 33B are graphs showing examples of how a target table TPk and gray level correction table TRk for BK color are generated when the "reproducibility-oriented" mode is selected.

Likewise the processor 61 calculates the grayscale characteristic value of the BK color target, and then generates the BK color gray level correction table TRk. FIG. 33A is a graph showing an example of how the BK color target table TPk is generated. Referring to FIG. 33A, the ordinate represents the grayscale characteristic value (one unit display) of the BL color target; and the abscissa, the input gray level values 0 to 255 based on the color detection data D1. A solid line Ik is a characteristic straight line for linearly interpolating grayscale characteristic values.

In this example, with regard to the grayscale characteristic value of the BK color target, 0.95 is set as the grayscale characteristic value of the whitest portion in the BK color gray level correction table TRk, and 0.24 (org) is set as the grayscale characteristic value of the darkest portion. The processor 61 sets 0.24 as characteristic data without any change as the grayscale characteristic value of the darkest portion with reference to the BK color gray level correction table TRk.

Figure 33B:
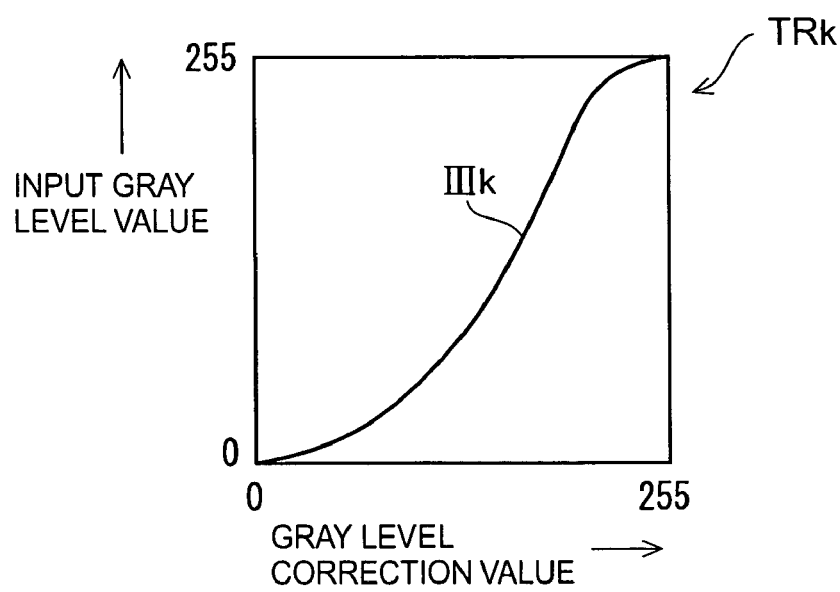

FIG. 33B is a graph showing the BK color gray level correction table TRk. Referring to FIG. 33B, the ordinate represents the input gray level value based on the color detection data D1; and the abscissa, the gray level correction value (output gray level value) of the BK color target after γ correction. A solid line IIIk is a γ correction curve for interpolating BK color grayscale characteristic values.

According to the method of calculating the C, M, Y, and K color gray level correction tables TRc, TRm, TRy, and TRk when the "grayscale-characteristic-oriented" mode is selected, the brightnesses of the densest portions corresponding to the dynamic ranges of the respective colors are set in advance with reference to the BK color gray level correction table TRk, and the grayscale characteristic values of the Y, M, and C color targets are calculated in ratio (%) to the set brightnesses of the densest portions. These calculations are executed by the processor 61 as in the case of the "gray-oriented" mode, and a description thereof will be omitted.

When characteristic data Y=0.35, M=0.50, C=0.54, and K=0.24 set in the above manner are set as numerators (data), % grayscale characteristic values are obtained by equation (2). By using the % grayscale characteristic value of BK color, the maximum densities of other colors Y, M, and C are calculated. Thereafter, the maximum density values are obtained by inequalities (3).

In this example, the gray level correction table TRy like that shown in FIG. 30B is generated from the target table TPy in the processing sequence shown in FIGS. 23A to 23C. Likewise, the gray level correction table TRm like that shown in FIG. 31B is generated from the target table TPm in a similar processing sequence. The gray level correction table TRc like that shown in FIG. 32B is generated from the target table TPc in a similar processing sequence. The gray level correction table TRk like that shown in FIG. 33B is generated from the target table TPk in a similar processing sequence.

According to the "reproducibility-oriented" mode, since the density ratios among C, M, and Y colors are kept constant at low/intermediate densities, gray balance is ensured. In addition, since absolute densities are kept constant, excellent reproducibility can be realized. Although densities in the image forming units 10Y, 10M, 10C, and 10K are limited to the maximum density values or less, a γ correction curve IIIy having smoothness like that shown in FIG. 30B can be obtained as the gray level correction table TRy. Likewise, as the gray level correction tables TRm, TRc, and TRk, γ correction curves IIIm, IIIc, and IIIk having smoothness like those shown in FIGS. 31B, 32B, and 33B can be obtained.

Figure 34:
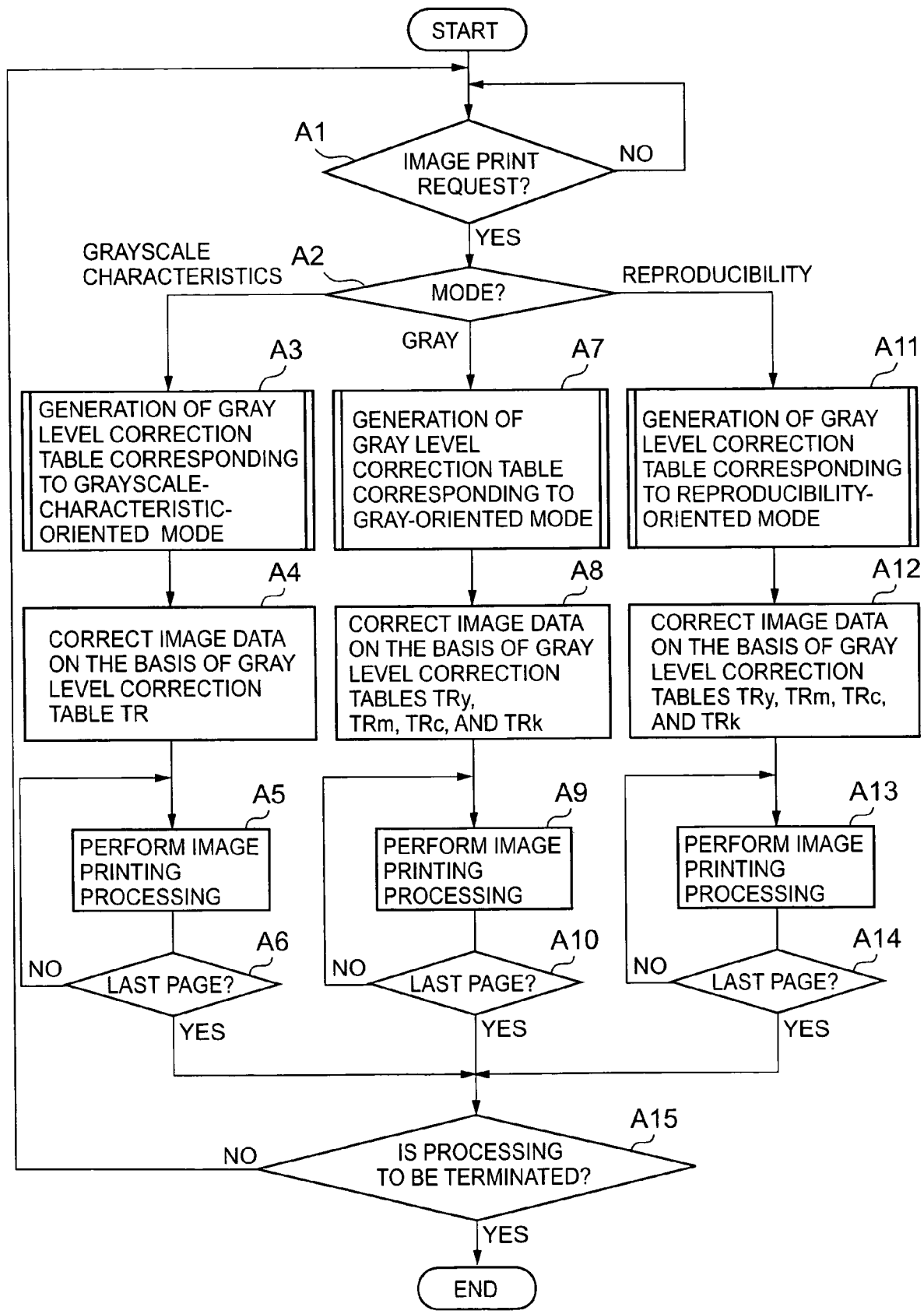
FIG. 34 is a flowchart (main routine) showing an example of image forming operation in the embodiment shown in FIG. 3.

The third image forming method according to the present invention will be described next with reference to FIGS. 34 and 35. FIG. 34 is a flowchart (main routine) showing an example of image forming operation in the color printer 100.

Figure 35:
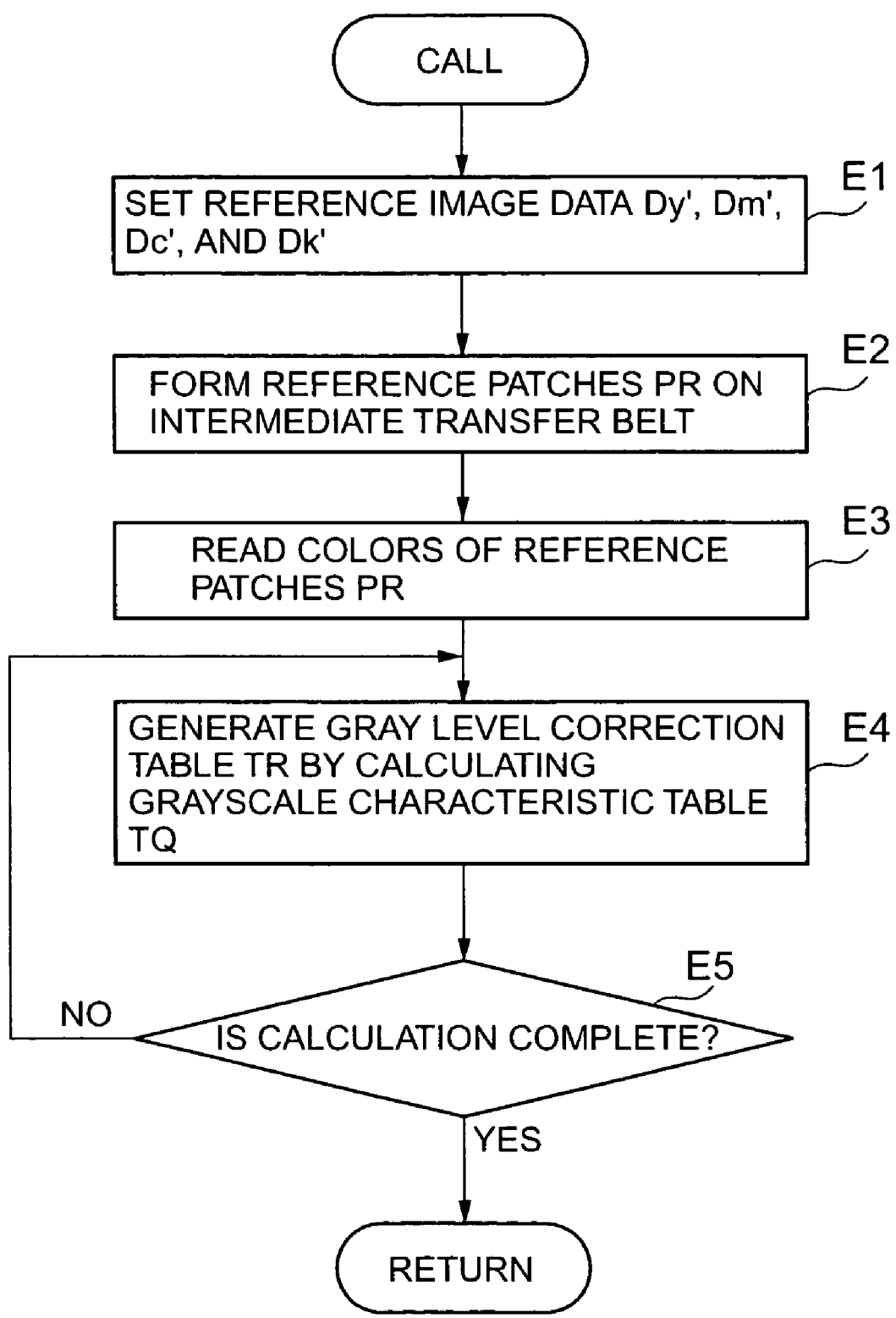
FIG. 35 is a flowchart (subroutine) showing an example of how a gray level correction table is generated in the embodiment shown in FIG. 3.

FIG. 35 is a flowchart (subroutine) showing an example of how gray level correction tables are generated in the corresponding mode.

In this embodiment, on the assumption that color images are printed by superimposing colors on the basis of arbitrary image data Dy, Dm, Dc, and Dk, the printer incorporates the colorimetric unit 12, a plurality of reference patches PR with different gray levels are formed on the intermediate transfer belt 6 by combining C, M, Y, and K colors through the photosensitive drums 1Y, 1M, 1C, and 1K, and the colors of the reference patches PR are measured, thereby performing desired gray level correction (color correction mode).

In this example, it is assumed that one of the "grayscale-characteristic-oriented" mode, "gray-oriented" mode, and "reproducibility-oriented" mode is selected with respect to gray level correction tables. In the normal operation mode, for example, 8-bit image data Dy, Dm, Dc, and Dk are input from an external device.

Under these conditions as image forming conditions, an image print request is accepted in step A1 in the flowchart shown in FIG. 34. As an image print request, for example, the image data Dy, Dm, Dc, and Dk filed on a page basis are input. An end flag is added to the last page. Whether or not an image print request is input is determined by detecting, for example, the input of the image data Dy, Dm, Dc, and Dk.

If an image print request is input, the flow shifts to step A2 to accept the selection of one of the "grayscale-characteristic-oriented" mode, "gray-oriented" mode, and "reproducibility-oriented" mode. At this time, the user displays the gray level correction method selection window P2 shown in FIGS. 22A and 5B on the display unit 18 of the operation panel 48. The user checks optional items in association with a gray level correction method in the gray level correction method selection window P2. When, for example, "grayscale-characteristic-oriented" is to be selected, the user makes a check mark in the rectangular space in the start area of "grayscale-characteristic-oriented" by using the cursor function of the operation unit 14 or the like.

Control branches on the basis of this mode selection. In this example, if the "grayscale-characteristic-oriented" mode is selected, the flow shifts to step A3 to generate gray level correction tables TR corresponding to the "grayscale-characteristic-oriented" mode. At this time, the processor 61 for image processing calculates gray level correction tables TR for smoothly expressing the dynamic ranges of C color, M color, and Y color in accordance with the "grayscale-characteristic-oriented" mode.

Before this calculation is performed, for example, the subroutine shown in FIG. 35 is called, and the reference image data Dy', Dm', Dc', and Dk' for forming a plurality of reference patches PR with different densities are read out and set in the image structure generating matrix units 63Y, 63M, 63C, and 63K in step E1 in the flowchart. For the reference image data Dy', Dm', Dc', and Dk', a patch table (slew gray level values) (not shown) is looked up.

In step E2, the image forming units 10Y, 10M, 10C, and 10K form reference patches PR like those shown in FIG. 4 on the intermediate transfer belt 6. At this time, the image forming unit 10Y supplies, to the laser writing unit 3Y, the image structure signal Sy generated by the image structure generating matrix unit 63Y on the basis of the reference image data Dy'. The image forming unit 10M supplies, to the laser writing unit 3M, the image structure signal Sm generated by the image structure generating matrix unit 63M on the basis of the reference image data Dm'. The image forming unit 10C supplies, to the laser writing unit 3C, the image structure signal Sc generated by the image structure generating matrix unit 63C on the basis of the reference image data Dc'. The image forming unit 10K supplies, to the laser writing unit 3K, the image structure signal Sk generated by the image structure generating matrix unit 63K on the basis of the reference image data Dk'.

In the units 3Y, 3M, 3C, and 3K, electrostatic latent, images for reference patches are formed on the respective photosensitive drums 1Y, 1M, 1C, and 1K. These electrostatic latent images are developed by the developing units 4Y, 4M, 4C, and 4K. In this case, reversal development is performed by applying a developing bias which is obtained by superimposing an AC voltage on a DC voltage having the same polarity (negative polarity in this embodiment) as that of toner to be used.

The image forming unit 10Y prints a Y color toner image serving as a reference patch PR. The image forming unit 10M prints an M color toner image serving as a reference patch PR. The image forming unit 10C prints a C color toner image serving as a reference patch PR. The image forming unit 10K prints a BK color toner image serving as a reference patch PR. The toner images as reference patches formed on the photosensitive drums 1Y, 1M, 1C, and 1K are transferred onto the intermediate transfer belt 6 (primary transfer). With this operation, reference patches PR like those shown in FIG. 4 can be formed on the intermediate transfer belt 6. Note that in the color correction mode, no color image is actually printed on the image recording sheet P.

A plurality of colors based on the reference patches PR formed on the intermediate transfer belt 6 are measured by the colorimetric unit 12 in step E3. The colorimetric unit 12 outputs, to the control unit 15, the color detection signal S1 obtained by reading the colors of the reference patches PR (detecting the densities). The control unit 15 analog/digital-converts the color detection signal S1 and outputs the color detection data (an input gray level value of 256) D1 to the processor 61.

The processor 61 receives the color detection data D1 and generates a gray level correction table TR by calculating a grayscale characteristic table TQ in step E4. At this time, the processor 61 linearly interpolates the minimum value and the maximum value of the color detection data D1. Thereafter, the processor 61 generates a 256-gray-level target table TP like that shown in FIG. 23A. The processor 61 then obtains a grayscale characteristic value for reproducing a target from the color detection data D1 on the basis of the target table TP. At this time, the processor 61 retrieves the grayscale characteristic value of the target on the basis of the color detection data D1.

In the example shown in FIG. 23A, two points near 0.75 are retrieved from the grayscale characteristic values of the grayscale characteristic table TQ. The gray level correction value "30" is obtained from the grayscale characteristic value, 0.74, of the target corresponding to the color detection data D1 of the input gray level value "30" and the grayscale characteristic value, 0.78, of the target corresponding to the color detection data D1 of the input gray level value "31" according to equation (1).

The gray level correction table TR like that shown in FIG. 23C is generated by sequentially repeating the above calculations and repeating them for each color. The flow then shifts to step E5, in which the control unit 15 determines whether or not gray level correction values for all the gray levels are completely calculated by the processor 61. The control unit 15 determines the end of the calculation upon detecting a calculation end notification from the processor 61.

If gray level correction values for all the gray levels are not completely calculated, the flow returns to step E4, in which the control unit 15 controls the processor 61 to calculate a gray level correction value for the target. With this processing, gray level correction values for the remaining targets are obtained in the same manner as described above. If it is determined in step E5 that gray level correction values for all the gray levels are completely calculated, the control unit 15 performs control to commonly set the gray level correction table TR in the memories 62Y, 62M, 62C, and 62K. With the gray level correction table TR, gray levels between the whitest portion and the darkest portion in an arbitrary color image can be optimally interpolated. The flow then returns to step A3 in the flowchart shown in FIG. 35.

Subsequently, the flow shifts to step A4 to correct the image data Dy, Dm, Dc, and Dk on the basis of the generated gray level correction table TR. At this time, the memories 62Y, 62M, 62C, and 62K execute γ conversion processing of converting the input gray level values of the image data Dy, Dm, Dc, and Dk into gray level correction values (output gray level values).

In step A5, image forming processing is executed on the basis of the corrected image data Dy, Dm, Dc, and Dk. The control unit 15 performs paper feed control. For example, the image recording sheets P stored in the paper feed cassettes 20A, 20B, and 20C shown in FIG. 3 are fed by the pickup rollers 21 and feed rollers 22A and conveyed to the secondary transfer roller 7A via the convey rollers 22B, 22C, and 22D, the registration rollers 23, and the like.

Meanwhile, in the image forming unit 10Y, the laser writing unit 3Y forms a Y color image associated with Y color on the intermediate transfer belt 6 through the photosensitive drum 1Y on the basis of the corrected image structure signal Sy. For example, the laser writing unit 3Y forms an electrostatic latent image on the photosensitive drum 1Y on the basis of the "grayscale-characteristic-oriented" mode. This electrostatic latent image is developed by the developing unit 4Y. In this case, reversal development is performed by applying a developing bias which is obtained by superimposing an AC voltage on a DC voltage having the same polarity (negative polarity) as that of toner to be used.

Likewise, the laser writing units 3M, 3C, and 3K form color images obtained by superimposing C, M, Y, and K colors, based on the "grayscale-characteristic-oriented" mode, on the intermediate transfer belt 6 through the photosensitive drums 1M, 1C, and 1K on the basis of the corrected image structure signals Sm, Sc, and Sk (primary transfer).

Subsequently, the color toner images are transferred and fixed on a predetermined image recording sheet P, and the sheet is delivered. At this time, the color images formed on the intermediate transfer belt 6 are transferred in block onto one surface of the image recording sheet P (secondary transfer). The image recording sheet P onto which the color images are transferred is subjected to fixing processing by the fixing device 17, and is clamped between the delivery rollers 24 to be placed on the delivery tray 25 located outside the apparatus. The transfer residual toner on the outer surfaces of the photosensitive drums 1Y, 1M, 1C, and 1K after the transfer is cleaned by the cleaning units 8Y, 8M, 8C, and 8K, and the next image forming cycle is started.

The flow then shifts to step A6, in which the control unit 15 determines whether the printing operation is complete. Whether printing operation is complete is determined by making the CPU 53 check whether the last page is printed. Whether a given page is the last page is determined by making the CPU 53 detect an end flag. If the last page is not printed, the flow returns to step A5 to continue image data correction processing. If the last page is printed, the flow shifts to step A15.

If the "gray-oriented" mode is selected in step A2 described above, the flow shifts to step A7, in which the control unit 15 controls the processor 61 for image processing to generate Y, M, C, and K gray level correction tables TRy, TRm, TRc, and TRk corresponding to the "gray-oriented" mode. At this time, in accordance with the selection of the "gray-oriented" mode, the processor 61 calculates the gray level correction tables TRy, TRm, TRc, and TRk which make the ratios in grayscale characteristics between C color, M color, and Y color equal to preset ratios throughout the gray levels.

Before this calculation is performed, as in the "grayscale-characteristic-oriented" mode, the image forming units 10Y, 10M, 10C, and 10K form reference patches PR based on the color correction reference image data Dy', Dm', Dc', and Dk' on the intermediate transfer belt 6 through the photosensitive drums 1Y, 1M, 1C, and 1K. A plurality of colors based on the reference patches PR formed on the intermediate transfer belt 6 are measured by the colorimetric unit 12 to obtain a color detection signal S1. The color detection signal S1 is A/D-converted by the control unit 15 into color detection data (patch data) D1 in the printer 100. The color detection data D1 is transferred to the image processing unit 60.

The image processing unit 60 sets in advance the brightnesses of the densest portions corresponding to the dynamic ranges of the respective colors with reference to the C color gray level correction table TRc, and calculates the grayscale characteristic values of a Y color target, M color target, and BK color target in ratio (%) to the set brightnesses of the densest portions. These calculations are executed by the processor 61 to generate target tables TPy, TPm, TPc, and TPk. In this example, by using the % grayscale characteristic value of C color obtained by equation (2), the maximum densities of other colors Y, M, and K are calculated.

The densities between the minimum value and the maximum value of each of the target tables TPy, TPm, TPc, and TPk are linearly interpolated in the same manner as in the "grayscale-characteristic-oriented" mode. Increasing the grayscale characteristic value can suppress the maximum density value of each color. In this example, the gray level correction table TRc like that shown in FIG. 25B is generated from the color target table TPc in the processing sequence shown in FIGS. 23A to 23C. Likewise, the gray level correction table TRm like that shown in FIG. 26B is generated from the target table TPm in the same processing sequence. The gray level correction table TRy like that shown in FIG. 27B is generated from the target table TPy in the same processing sequence. The gray level correction table TRk like that shown in FIG. 28B is generated from the target table TPk in the same processing sequence.

The Y color gray level correction table TRy is set in the memory 62Y. The M color gray level correction table TRm is set in the memory 62M. The C color gray level correction table TRc is set in the memory 62C. The BK color gray level correction table TRk is set in the memory 62K. Thereafter, the flow shifts to step A8 to correct the image data Dy, Dm, Dc, and Dk on the basis of the generated C, M, Y, and K gray level correction tables TRy, TRm, TRc, and TRk. At this time, γ conversion processing of converting the input gray level values of the image data Dy, Dm, Dc, and Dk into gray level correction values (output gray level values) is executed.

In step A9, image forming processing is executed on the basis of the corrected image data Dy, Dm, Dc, and Dk. At this time, the control unit 15 performs paper feed control in the same manner as in the "gray-scale-characteristic-oriented" mode. Meanwhile, in the image forming unit 10Y, the laser writing unit 3Y forms a Y color image associated with Y color on the intermediate transfer belt 6 through the photosensitive drum 1Y on the basis of the corrected image structure signal Sy. Likewise, the laser writing units 3M, 3C, and 3K form color images obtained by superimposing C, M, Y, and K colors, based on the "gray-oriented" mode, on the intermediate transfer belt 6 through the photosensitive drums 1M, 1C, and 1K on the basis of the corrected image structure signals Sm, Sc, and Sk (primary transfer). Thereafter, the color toner images are transferred and fixed on a predetermined image recording sheet P, and the sheet is delivered. The transfer residual toner on the outer surfaces of the photosensitive drums 1Y, 1M, 1C, and 1K after the transfer is cleaned by the cleaning units 8Y, 8M, 8C, and 8K, and the next image forming cycle is started.

The flow then shifts to step A10, in which the control unit 15 determines whether the printing operation is complete. Whether printing operation is complete is determined by making the CPU 53 check whether the last page is printed. Whether a given page is the last page is determined by making the CPU 53 detect an end flag. If the last page is not printed, the flow returns to step A9 to continue image forming processing. If the last page is printed, the flow shifts to step A15.

In addition, if the "reproducibility-oriented" mode is selected in step A2 described above, the flow shifts to step A11, in which the control unit 15 controls the processor 61 to generate Y, M, C, and K gray level correction tables TRy, TRm, TRc, and TRk corresponding to the "reproducibility-oriented" mode. At this time, in accordance with the selection of the "repro-ducibility-oriented" mode, the processor 61 calculates gray level correction tables TRy, TRm, TRc, and TRk which make the densities of C color, M color, and Y color equal to preset densities.

Before this calculation is performed, as in the "grayscale-characteristic-oriented" mode, the image forming units 10Y, 10M, 10C, and 10K form reference patches PR based on the color correction reference image data Dy', Dm', Dc', and Dk' on the intermediate transfer belt 6 through the photosensitive drums 1Y, 1M, 1C, and 1K. A plurality of colors based on the reference patches PR formed on the intermediate transfer belt 6 are measured by the colorimetric unit 12 to acquire a color detection signal S1. The color detection signal S1 is, for example, A/D-converted by the control unit 15 into color detection data D1 in the printer 100 and transferred to the image processing unit 60.

The image processing unit 60 sets in advance the brightnesses of the densest portions corresponding to the dynamic ranges of the respective colors with reference to the BK color gray level correction table TRk, and calculates the grayscale characteristic values of a Y color target, M color target, and C color target in ratio (%) to the set brightnesses of the densest portions. These calculations are executed by the processor 61 to generate target tables TPy, TPm, TPc, and TPk as in the same manner in the "gray-oriented" mode. Values between the minimum value and the maximum value of each of the target tables TPy, TPm, TPc, and TPk are linearly interpolated in the same manner as in the "gray-oriented" mode.

The processor 61 further generates a gray level correction table TRy like that shown in FIG. 30B from the target table TPy in the processing sequence shown in FIGS. 23A to 23C. Likewise, the processor 61 generates a gray level correction table TRm like that shown in FIG. 31B from the target table TPm in a similar processing sequence. The processor 61 generates a gray level correction table TRc like that shown in FIG. 32B from the target table TPc in a similar processing sequence. The processor 61 generates a gray level correction table TRk like that shown in FIG. 33B from the target table TPk in a similar processing sequence. The Y color gray level correction table TRy is set in the memory 62Y. The M color gray level correction table TRm is set in the memory 62M. The C color gray level correction table TRc is set in the memory 62C. The BK color gray level correction table TRk is set in the memory 62K.

Subsequently, the flow shifts to step A12 to correct the image data Dy, Dm, Dc, and Dk on the basis of the generated C, M, Y, and K gray level correction tables TRy, TRm, TRc, and TRk. At this time, γ conversion processing of converting the input gray level values of the image data Dy, Dm, Dc, and Dk into gray level correction values (output gray level values) is executed.

In step A13, image forming processing is executed on the basis of the corrected image data Dy, Dm, Dc, and Dk. At this time, the control unit 15 performs paper feed control in the same manner as in the "grayscale-characteristic-oriented" mode. Meanwhile, in the image forming unit 10Y, the laser writing unit 3Y forms a Y color image associated with Y color on the intermediate transfer belt 6 through the photosensitive drum 1Y on the basis of the corrected image structure signal Sy. Likewise, the laser writing units 3M, 3C, and 3K form color images obtained by superimposing C, M, Y, and K colors, based on the "reproducibility-oriented" mode, on the intermediate transfer belt 6 through the photosensitive drums 1M, 1C, and 1K on the basis of the corrected image structure signals Sm, Sc, and Sk (primary transfer).

Subsequently, the color toner images are transferred and fixed on a predetermined image recording sheet P, and the sheet is delivered. The transfer residual toner on the outer surfaces of the photosensitive drums 1Y, 1M, 1C, and 1K after the transfer is cleaned by the cleaning units 8Y, 8M, 8C, and 8K, and the next image forming cycle is started.

The flow then shifts to step A14, in which the control unit 15 determines whether the printing operation is complete. Whether printing operation is complete is determined by making the CPU 53 check whether the last page is printed. Whether a given page is the last page is determined by making the CPU 53 detect an end flag. If the last page is not printed, the flow returns to step A13 to continue image forming processing. If the last page is printed, the flow shifts to step A15 to check whether or not to terminate the image forming processing. For example, when power-off information is detected, the image forming processing is terminated. If no power-off information is detected, the flow returns to step A1 to wait for an image print request.

According to the color printer and image forming method as an embodiment of the present invention, the operation selection unit 14 is provided, which is operated to select one of the "grayscale-characteristic-oriented", "gray-oriented", and "reproducibility-oriented" modes is provided, and the control unit 15 controls the processor 61 to generate color correction tables corresponding to the mode selected by the operation selection unit 14.

If the "grayscale-characteristic-oriented" mode is selected, the processor 61 calculates gray level correction tables TR for smoothly expressing the dynamic ranges of C color, M color, and Y color. If the "gray-oriented" mode is selected, the processor 61 generates gray level correction tables TRy, TRm, TRc, and TRk which make the ratios in grayscale characteristics between C color, M color, and Y color equal to preset ratios throughout the gray levels. If the "reproducibility-oriented" mode is selected, the processor 61 generates gray level correction tables TRy, TRm, TRc, and TRk which make the densities of C color, M color, and Y color equal to preset densities.

The control unit 15 corrects the image data Dy, Dm, Dc, and Dk on the basis of the gray level correction tables TRy, TRm, TRc, and TRk generated by the processor 61, and controls the image forming units 10Y, 10M, 10C, and 10K to form color images on the intermediate transfer belt 6 by superimposing colors through the photosensitive drums 1Y, 1M, 1C, and 1K.

Therefore, one of the "grayscale-characteristic-oriented", "grey-oriented ", and "reproducibility-oriented" modes which are gray level correction methods matching the intention of the user can be set on an operation window of the printer 100 or personal computer. In addition, the image forming units 10Y, 10M, 10C, and 10K print color images on the basis of the corrected image data Dy, Dm, Dc, and Dk by the gray level correction method based on the "grayscale-characteristic-oriented", "gray-oriented", or "repro-ducibility-oriented" mode arbitrarily selected in advance by the user. This makes it possible to obtain stable color images even if the densities of C color, M color, Y color, and BK color change over time in association with the gray level correction function of the color printer or the like.

The above calculation methods may be selectively used depending on whether three colors C, M, and Y or four colors C, M, Y, and K are used. For example, the gray level correction method selection window P2 shown in FIGS. 22A and 5B may be designed to allow the user to select one of the "grayscale-characteristic-oriented", "gray-oriented", and "repro-ducibility-oriented" modes on a color basis. This makes it possible to selectively set the "reproducibility-oriented" mode for three colors C, M, and Y and the "grayscale-characteristic-oriented" mode for BK color when the image data Dy, Dm, Dc, and Dk contain graphic pattern information and much black character information. Selecting such modes in this manner can print graphic patterns with good reproducibility and always output black characters with the maximum density, thereby obtaining a sharp (clear) image printout result.

If the image data Dy, Dm, Dc, and Dk represent images constituted by only graphic patterns, a printout result with good gray balance and good grayscale characteristics can always be obtained by selecting the "gray-oriented" mode for all the four colors C, M, Y, and K. In addition, if the image data Dy, Dm, Dc, and Dk represent only characters or computer graphic (CG) images, all the four colors C, M, Y, and K are assigned to the "grayscale-characteristic-oriented" mode. By selecting this mode and outputting black characters with the maximum density, a sharp image printout result can be obtained. The method of selecting all the four colors C, M, Y, and K and executing the "grayscale-characteristic-oriented" mode is, in particular, suitable for a case wherein smoothness like that of CG images is required.

What is claimed is:

1. An image forming apparatus which forms a color image on an image forming member on the basis of image information, comprising:

image forming unit for forming a color reference image on the image forming member on the basis of reference image information for color correction;

colorimetric unit for measuring a color of the color reference image formed by said image forming unit and outputting color information;

image processing unit for generating a gray level correction table on the basis of the color information output from said colorimetric unit; and control unit for correcting the image information on the basis of the gray level correction table generated by said image processing unit and controlling said image forming unit so as to form a color image on the image forming member on the basis of the corrected image information;

operation unit which is so operated as to select one of a plurality of image structures in association with a color image to be formed on the image forming member, the color reference image comprising a plurality of color reference images with different densities and the image structure selected by said operation unit; and correction control unit for controlling said image processing unit and said image forming unit to generate gray level correction tables of other image structures with reference to a grayscale characteristic table of the image structure generated by said image processing unit; and wherein when n gray level correction tables each identical to the gray level correction table are to be generated, in a case of generating the gray level correction table of a first image structure, said correction control unit controls said image forming unit so as to form a plurality of color reference images with a first image structure and different densities on the image forming member, controls said colorimetric unit so as to detect densities of the color reference images formed by said image forming unit, controls said image processing unit to acquire grayscale characteristic information detected by said colorimetric unit and calculate a grayscale characteristic table of the first image structure, and controls said image processing unit so as to read out image information for forming a color reference image of the image structure from the grayscale characteristic table, controls said image forming unit so as to form a color reference image again on the basis of the image information read out from said image processing unit, controls said colorimetric unit so as to detect a density of the color reference image formed again by said image forming unit, controls said image processing unit so as to generate a gray level correction table of the first image structure by acquiring the gray level correction information detected by said colorimetric unit, and in a case of generating the gray level correction table of a second image structure, said correction control unit controls said image forming unit so as to form a plurality of color reference images with the second image structure and different densities on the image forming member, controls said colorimetric unit so as to detect densities of the color reference images formed by said image forming unit, and controls said image processing unit so as to input grayscale characteristic information of the second image structure and gray level correction information of the first image structure which are detected by said colorimetric unit, and controls said image processing unit so as to calculate a gray level correction table of the second image structure having a relationship in which the gray level correction information of the second image structure becomes identical to the gray level correction information of the first image structure.

2. The apparatus according to claim 1, wherein in generating the gray level correction table of a third image structure, said correction control unit controls said image forming unit so as to form a plurality of color reference images with the third image structure and different densities on the image forming member, controls said colorimetric unit so as to detect densities of the color reference images formed by said image forming unit, and controls said image processing unit so as to input grayscale characteristic information of the third image structure and gray level correction information of the first image structure which are detected by said colorimetric unit, and controls said image processing unit so as to calculate a gray level correction table of the third image structure having a relationship in which the gray level correction information of the third image structure becomes identical to the gray level correction information of the first image structure.

3. The apparatus according to claim 1, wherein said correction control unit sets a gray level correction table corresponding to an image structure selected by said operation unit in said image forming unit.

4. The apparatus according to claim 1, wherein color information detected by said colorimetric unit includes at least one of density information, luminance information, and lightness information of the color reference image.

5. The apparatus according to claim 1, wherein said operation unit can select whether or not to perform color matching between the plurality of image structures.

* * * * *

UNITED STATES PATENT AND TRADEMARK OFFICE
CERTIFICATE OF CORRECTION

PATENT NO. : 7,633,646 B2  Page 1 of 1
APPLICATION NO. : 10/918185
DATED : December 15, 2009
INVENTOR(S) : Shuji Ichitani It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1460 days.

Signed and Sealed this

Ninth Day of November, 2010

David J. Kappos
*Director of the United States Patent and Trademark Office*